United States Patent
Yokomakura et al.

(10) Patent No.: US 12,058,633 B2
(45) Date of Patent: Aug. 6, 2024

(54) MUTING OF SIGNALING FOR INTEGRATED ACCESS AND BACKHAUL NETWORKS

(71) Applicant: SHARP KABUSHIKI KAISHA, Sakai (JP)

(72) Inventors: Kazunari Yokomakura, Osaka (JP); John Michael Kowalski, Vancouver, WA (US); Tatsushi Aiba, Osaka (JP); Atsushi Ishii, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 316 days.

(21) Appl. No.: 17/607,767

(22) PCT Filed: Apr. 8, 2020

(86) PCT No.: PCT/JP2020/015812
§ 371 (c)(1),
(2) Date: Oct. 29, 2021

(87) PCT Pub. No.: WO2020/222293
PCT Pub. Date: Nov. 5, 2020

(65) Prior Publication Data
US 2022/0217661 A1    Jul. 7, 2022

Related U.S. Application Data

(60) Provisional application No. 62/842,415, filed on May 2, 2019.

(51) Int. Cl.
*H04W 56/00*    (2009.01)

(52) U.S. Cl.
CPC ............................ *H04W 56/001* (2013.01)

(58) Field of Classification Search
CPC ........................ H04W 56/001; H04B 7/155
See application file for complete search history.

(56) References Cited

U.S. PATENT DOCUMENTS

| | | | |
|---|---|---|---|
| 9,693,338 B2 | 6/2017 | Zhao et al. | |
| 2017/0230996 A1 | 8/2017 | Li et al. | |
| 2020/0145912 A1* | 5/2020 | You .................... | H04W 48/16 |

(Continued)

OTHER PUBLICATIONS

AT&T, "TP for 38.874 on PHY Enhancements for NR IAB", R1-1814190, 3GPP TSG RAN WG1 Meeting #95, Spokane, USA, Nov. 12-16, 2018.

(Continued)

*Primary Examiner* — Afshawn M Towfighi
(74) *Attorney, Agent, or Firm* — ScienBiziP, P.C.

(57) ABSTRACT

An IAB node comprises processor circuitry and interface circuitry. The processor circuitry is to generate a synchronization signal (SS)/primary broadcast channel (PBCH) Block Measurement time Configuration (SMTC) and to use an STC muting indication to moot STC(s) in the SMTC which is/are not to be transmitted. The SMTC comprises plural synchronization signal (SS)/primary broadcast channel (PBCH) Block Transmission Configurations (STCs), each STC comprising plural synchronization signal (SS)/primary broadcast channel (PBCH) blocks (SS/PBCHs). The interface circuitry is configured to transmit the SMTC as muted in accordance with the STC muting indication.

3 Claims, 26 Drawing Sheets

(56) References Cited

U.S. PATENT DOCUMENTS

| | | | |
|---|---|---|---|
| 2020/0229115 A1* | 7/2020 | Qi | H04W 80/08 |
| 2020/0229271 A1* | 7/2020 | You | H04W 72/23 |
| 2020/0305102 A1* | 9/2020 | Jia | H04L 5/0094 |
| 2020/0314738 A1* | 10/2020 | Qi | H04W 56/0015 |

OTHER PUBLICATIONS

"3rd Generation Partnership Project; Technical Specification Group Radio Access Network; NR; NR and NG-RAN Overall Description; Stage 2(Release 15)", 3GPP TS 38.300 V15.4.0 (Dec. 2018).

Ericsson, "SSB-based IAB node discovery and measurement", R1-1904832, 3GPP TSG-RAM WG1 #96-Bis, Xi'an, China, Apr. 8-Apr. 12, 2019.

* cited by examiner

GENERATE AN IAB RESOURCE CONFIGURATION SCHEME INDICATOR FOR PROVIDING A CODED DESCRIPTION OF HOW PLURAL IAB RADIO RESOURCES ARE TO BE CONFIGURED AT THE AT LEAST ONE OTHER IAB NODE OF THE NETWORK — 8-1

TRANSMITTING THE IAB RESOURCE CONFIGURATION SCHEME INDICATOR OVER A RADIO INTERFACE TO THE AT LEAST ONE OTHER IAB NODE — 8-2

*Fig. 8*

COMPRISES RECEIVING AN IAB RESOURCE CONFIGURATION SCHEME INDICATOR WHICH IS CONFIGURED TO PROVIDE A CODED DESCRIPTION OF HOW PLURAL IAB RADIO RESOURCES ARE TO BE CONFIGURED AT THE IAB NODE — 17-1

CONFIGURING THE RADIO RESOURCES OF THE IAB NODE ACCORDING TO THE INDICATION — 17-2

*Fig. 9*

| | OFDM SYMB 0 | OFDM SYMB 1 | OFDM SYMB 2 | OFDM SYMB 3 | OFDM SYMB 4 | OFDM SYMB 5 | OFDM SYMB 6 | OFDM SYMB 7 | OFDM SYMB 8 | OFDM SYMB 9 | OFDM SYMB 10 | OFDM SYMB 11 | OFDM SYMB 12 | OFDM SYMB 13 |
|---|---|---|---|---|---|---|---|---|---|---|---|---|---|---|
| SFI | D | D | D | D | D | D | D | D | D | D | F | F | U | U |
| TRI | 1 | 0 | 0 | 1 | 0 | 0 | 1 | 0 | 0 | 1 | 0 | 0 | 1 | 0 |

Fig. 18

```
MeasObjectNR ::=           SEQUENCE {
  ssbFrequency                ARFCN-ValueNR              OPTIONAL,  -- Cond SSBorAssociatedSSB
  ssbSubcarrierSpacing        SubcarrierSpacing          OPTIONAL,  -- Cond SSBorAssociatedSSB
  smtc1                       SSB-MTC                    OPTIONAL,  -- Cond SSBorAssociatedSSB
  smtc2                       SSB-MTC2                   OPTIONAL,  -- Cond IntraFreqConnected
  refFreqCSI-RS               ARFCN-ValueNR              OPTIONAL,  -- Cond CSI-RS
  referenceSignalConfig       ReferenceSignalConfig,
  absThreshSS-BlocksConsolidation   ThresholdNR          OPTIONAL,  -- Need R
  absThreshCSI-RS-Consolidation     ThresholdNR          OPTIONAL,  -- Need R
  nrofSS-BlocksToAverage      INTEGER (2..maxNrofSS-BlocksToAverage)       OPTIONAL,  -- Need R
  nrofCSI-RS-ResourcesToAverage  INTEGER (2..maxNrofCSI-RS-ResourcesToAverage)  OPTIONAL,  -- Need R
  quantityConfigIndex         INTEGER (1..maxNrofQuantityConfig),
  offsetMO                    Q-OffsetRangeList,
  cellsToRemoveList           PCI-List                                     OPTIONAL,  -- Need N
  cellsToAddModList           CellsToAddModList                            OPTIONAL,  -- Need N
  blackCellsToRemoveList      PCI-RangeIndexList                           OPTIONAL,  -- Need N
  blackCellsToAddModList      SEQUENCE (SIZE (1..maxNrofPCI-Ranges)) OF PCI-RangeElement   OPTIONAL,  -- Need N
  whiteCellsToRemoveList      PCI-RangeIndexList                           OPTIONAL,  -- Need N
  whiteCellsToAddModList      SEQUENCE (SIZE (1..maxNrofPCI-Ranges)) OF PCI-RangeElement   OPTIONAL,  -- Need N
  ...,
  [[
  freqBandIndicatorNR-v1530   FreqBandIndicatorNR                          OPTIONAL,  -- Need R
  measCycleSCell-v1530        ENUMERATED {sf160, sf256, sf320, sf512, sf640, sf1024, sf1280}  OPTIONAL  -- Need R
  ]]
}
```

Fig. 25

```
SSB-MTC ::=              SEQUENCE {
    periodicityAndOffset     CHOICE {
        sf5                      INTEGER (0..4),
        sf10                     INTEGER (0..9),
        sf20                     INTEGER (0..19),
        sf40                     INTEGER (0..39),
        sf80                     INTEGER (0..79),
        sf160                    INTEGER (0..159)
    },
    duration                 ENUMERATED { sf1, sf2, sf3, sf4, sf5 }
}
```

*Fig. 26*

MUTING OF SIGNALING FOR INTEGRATED ACCESS AND BACKHAUL NETWORKS

TECHNICAL FIELD

The technology relates to wireless communications, and particularly to radio configuration and use of on backhaul links of an Integrated Access and Backhaul (IAB) network.

BACKGROUND ART

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 30, and is also described in 3GPP TS 38.300. The 5G NR network is comprised of NG RAN (Next Generation Radio Access Network) and 5GC (5G Core Network). As shown, NGRAN is comprised of gNBs (e.g., 5G Base stations) and ng-eNBs (i.e. LTE base stations). An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. A NG interface exists between 5GC and the base stations (i.e. gNB & ng-eNB). A gNB node provides NR user plane and control plane protocol terminations towards the UE, and is connected via the NG interface to the 5GC. The 5G NR (New Radio) gNB is connected to AMF (Access and Mobility Management Function) and UPF (User Plane Function) in 5GC (5G Core Network).

In some cellular mobile communication systems and networks, such as Long-Term Evolution (LTE) and New Radio (NR), a service area is covered by one or more base stations, where each of such base stations may be connected to a core network by fixed-line backhaul links (e.g., optical fiber cables). In some instances, due to weak signals from the base station at the edge of the service area, users tend to experience performance issues, such as: reduced data rates, high probability of link failures, etc. A relay node concept has been introduced to expand the coverage area and increase the signal quality. As implemented, the relay node may be connected to the base station using a wireless backhaul link.

In 3rd Generation Partnership Project (3GPP), the relay node concept for the fifth generation (5G) cellular system has been discussed and standardized, where the relay nodes may utilize the same 5G radio access technologies (e.g., New Radio (NR)) for the operation of services to User Equipment (UE) (access link) and connections to the core network (backhaul link) simultaneously. These radio links may be multiplexed in time, frequency, and/or space. This system may be referred to as Integrated Access and Backhaul (IAB).

Some such cellular mobile communication systems and networks may comprise IAB-donors and IAB-nodes, where an IAB-donor may provide interface to a core network to UEs and wireless backhauling functionality to IAB-nodes; and additionally, an IAB-node may provide IAB functionality combined with wireless self-backhauling capabilities.

What is needed are methods, apparatus, and/or techniques to avoid cross interference between Integrated Access and Backhaul (IAB) nodes.

SUMMARY OF INVENTION

In one example, an Integrated Access and Backhaul (IAB) node comprising: processor circuitry configured: to generate a synchronization signal (SS)/primary broadcast channel (PBCH) Block Measurement time Configuration (SMTC), the SMTC comprising plural synchronization signal (SS)/primary broadcast channel (PBCH) Block Transmission Configurations (STCs), each STC comprising plural synchronization signal (SS)/primary broadcast channel (PBCH) blocks (SS/PBCHs); to use an STC muting indication to moot STC(s) in the SMTC which is/are not to be transmitted; interface circuitry configured to transmit the SMTC as muted in accordance with the STC muting indication.

In one example, a method in an Integrated Access and Backhaul (IAB) node comprising: generating a synchronization signal (SS)/primary broadcast channel (PBCH) Block Measurement time Configuration (SMTC), the SMTC comprising plural signal (SS)/primary broadcast channel (PBCH) Block Transmission Configurations (STCs), each STC comprising plural synchronization signal (SS)/primary broadcast channel (PBCH) blocks (SS/PBCHs); using an STC muting indication to moot STC(s) in the SMTC which is/are not to be transmitted; transmitting the SMTC as muted in accordance with the STC muting indication.

In one example, an Integrated Access and Backhaul (IAB) node comprising: interface circuitry configured to receive a transmission; processor circuitry configured to determine, from the transmission, a muted synchronization signal (SS)/primary broadcast channel (PBCH) Block Measurement time Configuration (SMTC), the SMTC comprising plural signal (SS)/primary broadcast channel (PBCH) Block Transmission Configurations (STCs), each STC comprising plural synchronization signal (SS)/primary broadcast channel (PBCH) blocks (SS/PBCHs), the SMTC having been muted in accordance with the STC muting indication.

In one example, a method in an Integrated Access and Backhaul (IAB) node comprising:

receiving a transmission over a radio interface; determining, from the transmission, a muted synchronization signal (SS)/primary broadcast channel (PBCH) Block Measurement time Configuration (SMTC), the SMTC comprising plural signal (SS)/primary broadcast channel (PBCH) Block Transmission Configurations (STCs), each STC comprising plural synchronization signal (SS)/primary broadcast channel (PBCH) blocks (SS/PBCHs), the SMTC having been muted in accordance with the STC muting indication.

BRIEF DESCRIPTION OF DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 8 is a flowchart showing example, non-limiting, basic acts or steps that may be performed by a donor IAB node of the example embodiment and mode of FIG. 5.

FIG. 9 is a flowchart showing example, non-limiting, basic acts or steps that may be performed by an IAB node of the example embodiment and mode of FIG. 5.

FIG. 13 is a diagrammatic view showing in more detail portions of an example embodiment and mode of a telecommunications system comprising representative donor IAB node which include an IAB resource configuration switch signal generator and a representative IAB node which includes an IAB resource configuration switch signal handler.

FIG. 18 is a diagrammatic view showing an example slot format indicator, SFI, and a time resource indicator, TRI, for an example slot.

FIG. 25 is a listing showing how STC and SMTC may be different configured.

FIG. 26 is a listing showing how STC and SMTC may be different configured.

DESCRIPTION OF EMBODIMENTS

Figure 1:
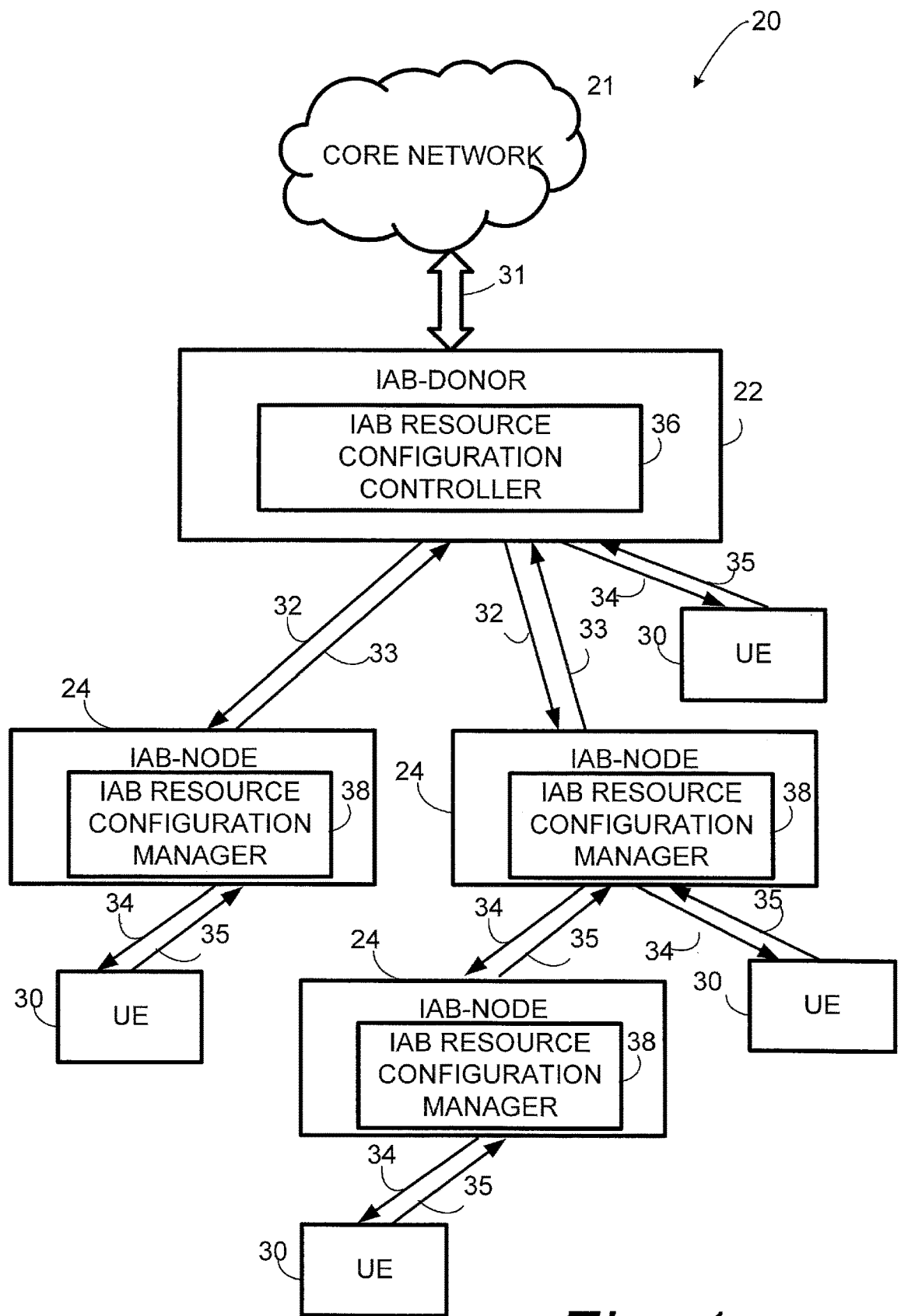
FIG. 1 is a diagrammatic view illustrating a mobile network infrastructure using 5G signals and 5G base stations, and particularly showing a donor IAB node comprising an IAB resource configuration controller and plural IAB nodes each comprising an IAB resource configuration manager.

In one of its example, non-limiting aspects, the technology disclosed herein concerns IAB node and methods of operation thereof. The IAB node comprises processor circuitry and interface circuitry. The processor circuitry is to generate a synchronization signal (SS)/primary broadcast channel (PBCH) Block Measurement time Configuration (SMTC) and to use an STC muting indication to moot STC(s) in the SMTC which is/are not to be transmitted. The SMTC comprises plural synchronization signal (SS)/primary broadcast channel (PBCH) Block Transmission Configurations (STCs), each STC comprising plural synchronization signal (SS)/primary broadcast channel (PBCH) blocks (SS/PBCHs). The interface circuitry is configured to transmit the SMTC as muted in accordance with the STC muting indication In another of its example, non-limiting aspects, the technology disclosed herein concerns an IAB node and methods of operation thereof. The IAB node comprises processor circuitry and interface circuitry. The interface circuitry is configured to receive a transmission. The processor circuitry is configured to determine, from the transmission, a muted synchronization signal (SS)/primary broadcast channel (PBCH) Block Measurement time Configuration (SMTC). The SMTC comprises plural signal (SS)/primary broadcast channel (PBCH) Block Transmission Configurations (STCs), each STC comprising plural synchronization signal (SS)/primary broadcast channel (PBCH) blocks (SS/PBCHs), the SMTC having been muted in accordance with the STC muting indication.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), or some other similar terminology.

As used herein, the term "telecommunication system" or "communications system" can refer to any network of devices used to transmit information. A non-limiting example of a telecommunication system is a cellular network or other wireless communication system. Furthermore, the "node" may comprise a portion of a gNB's architecture, in particular, a gNB-DU (gNB Distributed Unit), which would be a logical node hosting RLC, MAC and PHY layers of the gNB, under the control of a gNB-CU (gNB Central Unit), which would reside in a "donor node," and hosting RRC, SDAP and PDCP protocols of the gNB or RRC and PDCP protocols of the en-gNB that controls the operation of one or more gNB-DUs.

As used herein, the term "cellular network" or "cellular radio access network" can refer to a network distributed over cells, each cell served by at least one fixed-location transceiver, such as a base station. It should also be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN).

Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Any reference to a "resource" herein means "radio resource" unless otherwise clear from the context that another meaning is intended. In general, as used herein a radio resource ("resource") is a time-frequency unit that can carry information across a radio interface, e.g., either signal information or data information. An example of a radio resource occurs in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. An LTE subframe is divided into two slots (so that there are thus 20 slots in a frame). The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. A resource element (RE) is the smallest time-frequency unit for downlink transmission in the subframe. That is, one symbol on one sub-carrier in the sub-frame comprises a resource element (RE) which is uniquely defined by an index pair (k,l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix.

A mobile network used in wireless networks may be where the source and destination are interconnected by way of a plurality of nodes. In such a network, the source and destination may not be able to communicate with each other directly due to the distance between the source and destination being greater than the transmission range of the nodes. That is, a need exists for intermediate node(s) to relay communications and provide transmission of information. Accordingly, intermediate node(s) may be used to relay information signals in a relay network, having a network topology where the source and destination are interconnected by means of such intermediate nodes. In a hierarchical telecommunications network, the backhaul portion of the network may comprise the intermediate links between the core network and the small subnetworks of the entire hierarchical network. Integrated Access and Backhaul (IAB) Next generation NodeB use 5G New Radio communications such as transmitting and receiving NR User Plane (U-Plane) data traffic and NR Control Plane (C-Plane) data. Both, the UE and gNB may include addressable memory in electronic communication with a processor. In one embodiment, instructions may be stored in the memory and are executable to process received packets and/or transmit packets according to different protocols, for example, Medium Access Control (MAC) Protocol and/or Radio Link Control (RLC) Protocol.

A. Generic Architecture Description

FIG. 1 shows an example telecommunications system 20 comprising core network 21 and plural wireless access nodes including donor or parent IAB node 22 and other IAB nodes 24 which are not donor or parent IAB nodes; and plural user equipments (UE) 30 that are served by one or more of the access nodes. FIG. 1 further shows that the donor IAB node 22 may be connected to core network 21, e.g., by a wireline 31 or other suitable connection; and that wireless access links may connect the donor IAB node 22, the IAB nodes 24, and the user equipments (UEs) 30. FIG. 1 particularly shows, for example, that donor IAB node 22 is connected by downlink parent backhaul link 32 and uplink parent backhaul link 33 to one or more IAB nodes 24. FIG. 1 further shows that an IAB node 24 may be connected by downlink child backhaul link 34 and uplink child backhaul link 35 to one or more child nodes, e.g., to a user equipment (UE) 30 or to another IAB node 24. It should be understood that some parts of operations and behaviors that are performed by the donor IAB node may be able to be performed by a parent IAB node.

With reference to FIG. 1, the present embodiments include a mobile network infrastructure using 5G signals and 5G base stations (or cell stations). Depicted is a system diagram of a radio access network utilizing IAB nodes, where the radio access network may comprise, for example, one IAB-donor and multiple IAB-nodes. Different embodiments may comprise different number of IAB-donor and IAB-node ratios. Herein, the IAB nodes may be referred to as IAB relay nodes. The IAB-node may be a Radio Access Network (RAN) node that supports wireless access to UEs and wirelessly backhauls the access traffic. The IAB-donor may be a RAN node which may provide an interface to the core network to UEs and wireless backhauling functionality to IAB nodes. An IAB-node/donor may serve one or more IAB nodes using wireless backhaul links as well as UEs using wireless access links simultaneously. Accordingly, network backhaul traffic conditions may be implemented based on the wireless communication system to a plurality of IAB nodes and UEs.

With further reference to FIG. 1, plural UEs 30 are depicted as in communication with IAB nodes, for example, IAB nodes 24 and IAB donor node 22, via wireless access link(s). Additionally, the IAB-nodes (child nodes) may be in communication with other IAB-nodes and/or an IAB-donor (all of which may be considered IAB parent nodes) via wireless backhaul link. For example, a UE may be connected to an IAB-node which itself may be connected to a parent IAB-node in communication with an IAB-donor, thereby extending the backhaul resources to allow for the transmission of backhaul traffic within the network and between parent and child for integrated access. The embodiments of the system provide for capabilities needed to use the broadcast channel for carrying information bit(s) (on the physical channels) and provide access to the core network.

FIG. 1 further shows that the donor IAB node 22 comprises IAB resource configuration controller 36, and that the IAB nodes 24 each comprise IAB resource configuration manager 38. In certain example aspects of the technology disclosed herein, and as explained hereinafter in various differing example embodiments and modes, the IAB resource configuration controller 36 of donor IAB node 22, often working in conjunction with the IAB resource configuration managers 38 of the IAB nodes 24, facilitates enhanced and more efficient operation of the telecommunications system 20.

Figure 2:
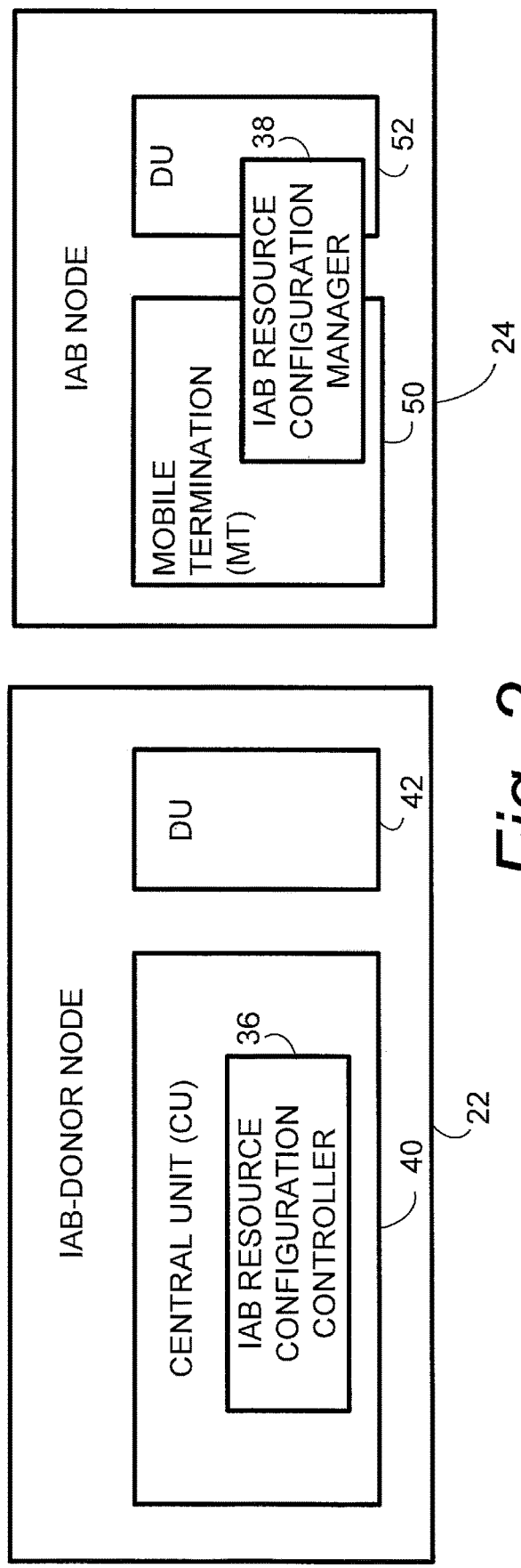
FIG. 2 is a diagrammatic view depicting an example of functional block diagrams for donor IAB node and a representative IAB node of FIG. 1.

FIG. 2 depicts an example of functional block diagrams for the donor IAB node 22 and the IAB node 24 (see FIG. 1). The donor IAB node 22 may comprise at least one Central Unit (CU) 40 and at least one Distributed Unit (DU) 42. The Central Unit (CU) 40 is a logical entity managing the DU collocated in the donor IAB node 22 as well as the remote DUs resident in the IAB-nodes. The Central Unit (CU) 40 may also be an interface to the core network 21, behaving as a RAN base station (e.g., eNB or gNB).

In some embodiments, the Distributed Unit (DU) 42 is a logical entity hosting a radio interface (backhaul/access) for other child IAB-nodes and/or UEs. In one configuration, under the control of Central Unit (CU) 40, the Distributed Unit (DU) 42 may offer a physical layer and Layer-2 (L2) protocols (e.g., Medium Access Control (MAC), Radio Link Control (RLC), etc.) while the Central Unit (CU) 40 may manage upper layer protocols (such as Packet Data Convergence Protocol (PDCP), Radio Resource Control (RRC), etc.). As shown in FIG. 2, the Central Unit (CU) 40 may host or comprise the IAB resource configuration controller 36, as hereinafter discussed.

As also shown in FIG. 2, an IAB node 24 may comprise Mobile-Termination (MT) 50 and Distributed Unit (DU) 52. In some example embodiments the Distributed Unit (DU) 52 may have the same functionality as the Distributed Unit (DU) 42 in the IAB-donor, whereas the Mobile-Termination (MT) 50 may be a UE-like function that terminates the radio interface layers. As an example, the Mobile-Termination (MT) 50 may function to perform at least one of: radio transmission and reception, encoding and decoding, error detection and correction, signaling, and access to a SIM. Either or both of the Mobile-Termination (MT) 50 and Distributed Unit (DU) 52 may comprise or host the IAB resource configuration manager 38.

The DU may have all or parts of functions of the base station 160 in FIG. 1 and The MT may have all or parts of functions of the UE in FIG. 1. In other words, the base station 160 may be rephrased by a CU and a DU, and the UE may be rephrased as a MT.

Embodiments include a mobile network infrastructure where a number of UEs are connected to a set of IAB-nodes and the IAB-nodes are in communication with each other for relay and/or an IAB-donor using the different aspects of the present embodiments. In some embodiments, the UE may communicate with the CU of the IAB-donor on the C-Plane using RRC protocol and in other embodiments, using Service Data Adaptation Protocol (SDAP) and/or Packet Data Convergence Protocol (PDCP) radio protocol architecture for data transport (U-Plane) through NR gNB. In some embodiments, the DU of the IAB-node may communicate with the CU of the IAB-donor using 5G radio network layer signaling protocol: F1 Application Protocol (F1-AP') which is a wireless backhaul protocol that provides signaling services between the DU of an IAB-node and the CU of an IAB-donor. That is, the protocol stack configuration may be interchangeable, and different mechanism may be used.

Figure 3:
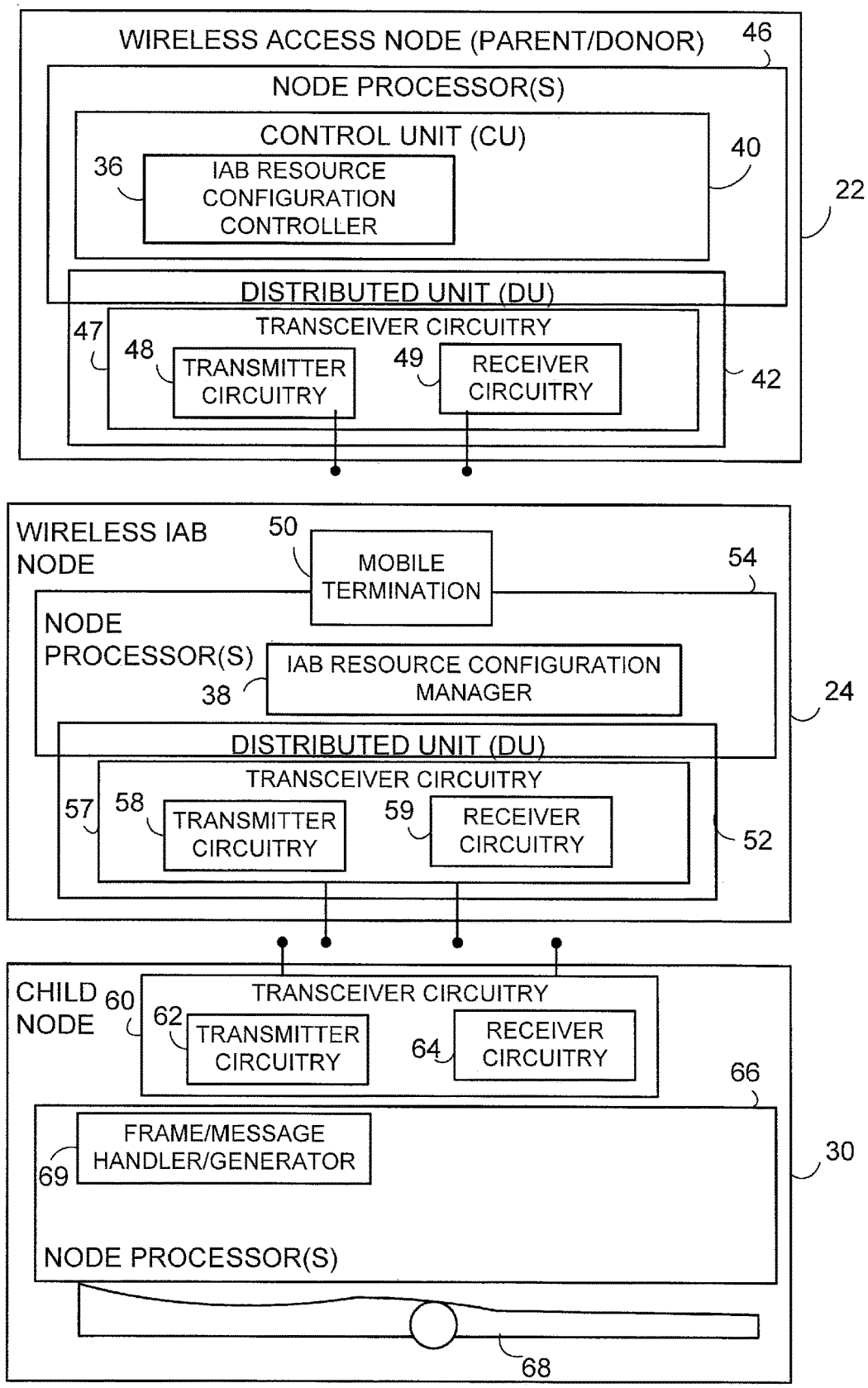
FIG. 3 is a diagrammatic view showing in more detail various functional units and components of a representative donor IAB node, a representative IAB node, and a representative user equipment (UE) according to an example embodiment and mode of FIG. 1.

FIG. 3 shows in more detail a generic example embodiment and mode of arrangement and composition of certain functionalities and components of donor IAB node 22; an example, representative IAB node 24; and an example, representative user equipment (UE) 30. It should be understood that each of the nodes of FIG. 3 comprise additional components and functionalities known to the person skilled in the art, and that primarily those pertinent to the technology disclosed herein are illustrated for sake of simplicity.

As understood from the foregoing, FIG. 3 shows that donor IAB node 22 comprises central unit (CU) 40 and distributed unit (DU) 42. The central unit (CU) 40 and distributed unit (DU) 42 may be realized by, e.g., be comprised of or include, one or more processor circuits, e.g., donor node processor(s) 46. The one or more node processor(s) 46 may be shared by central unit (CU) 40 and distributed unit (DU) 42, or each of central unit (CU) 40 and distributed unit (DU) 42 may comprise one or more node processor(s) 46. Moreover, central unit (CU) 40 and distributed unit (DU) 42 may be co-located at a same node site, or alternatively one or more distributed units may be located at sites remote from central unit (CU) 40 and connected thereto by a packet network. The distributed unit (DU) 42 of donor IAB node 22 may comprise transceiver circuitry 47, which in turn may comprise transmitter circuitry 48 and receiver circuitry 49. The transceiver circuitry 47 includes antenna(e) for the wireless transmission. Transmitter circuitry 48 includes, e.g., amplifier(s), modulation circuitry and other conventional transmission equipment. Receiver circuitry 49 comprises, e.g., amplifiers, demodulation circuitry, and other conventional receiver equipment.

As shown in FIG. 3 the IAB-node 24, also known as wireless relay node 24, in an example embodiment and mode comprises the IAB node mobile termination (MT) unit 50 and IAB node distributed unit (DU) 52. The IAB node mobile termination (MT) unit 50 and IAB node distributed unit (DU) 52 may be realized by, e.g., by comprised of or include, one or more processor circuits, e.g., IAB node processor(s) 54. The one or more IAB node processor(s) 54 may be shared by IAB node mobile termination (MT) unit 50 and IAB node distributed unit (DU) 52, or each of IAB node mobile termination (MT) unit 50 and IAB node distributed unit (DU) 52 may comprise one or more IAB node processor(s) 54. The IAB node distributed unit (DU) 52 may comprise IAB node transceiver circuitry 57, which in turn may comprise IAB node transmitter circuitry 58 and IAB node receiver circuitry 59. The IAB node transceiver circuitry 57 includes antenna(e) for the wireless transmission. IAB node transmitter circuitry 58 may include, e.g., amplifier(s), modulation circuitry and other conventional transmission equipment. IAB node receiver circuitry 59 may comprise, e.g., amplifiers, demodulation circuitry, and other conventional receiver equipment.

FIG. 3 shows child node 30, shown by way of example as user equipment (UE) 30, as comprising, in an example, non-limiting embodiment and mode, transceiver circuitry 60. The transceiver circuitry 60 in turn may comprise transmitter circuitry 62 and receiver circuitry 64. The transceiver circuitry 60 includes antenna(e) for the wireless transmission. Transmitter circuitry 62 may include, e.g., amplifier(s), modulation circuitry and other conventional transmission equipment. Receiver circuitry 64 may comprise, e.g., amplifiers, demodulation circuitry, and other conventional receiver equipment. FIG. 3 further shows child node 30, which (as indicated before) may be a user equipment or Integrated Access and Backhaul (IAB) node, as also comprising node processor circuitry, e.g., one or more node processor(s) 66, and interfaces 68, including one or more user interfaces. Such user interfaces may serve for both user input and output operations, and may comprise (for example) a screen such as a touch screen that can both display information to the user and receive information entered by the user. The user interface 68 may also include other types of devices, such as a speaker, a microphone, or a haptic feedback device, for example.

In an example, non-limiting embodiment and mode shown in FIG. 3, the child node 30 may include frame/message generator/handler 69. As is understood by those skilled in the art, in some telecommunications system messages, signals, and/or data are communicated over a radio or air interface using one or more "resources", e.g., "radio resource(s)". The frame/message generator/handler 69 serves to handle messages, signals, and data received from other nodes.

Various aspects of IAB networks and nodes, and in some cases the virtualization of such networks and nodes, are described in one or more of the following United States Patent Applications, all of which are incorporated herein by reference:

U.S. Provisional Patent Application 62/780,068, filed Dec. 14, 2018, entitled "METHODS AND APPARATUS FOR CELL BARRING IN WIRELESS RELAY NETWORKS".

U.S. Provisional Patent Application 62/753,699, filed Oct. 31, 2018, entitled "METHODS AND APPARATUS FOR USING CONDITIONAL HANDOVERS FOR WIRELESS";

U.S. Provisional Patent Application 62/758,020, filed Nov. 8, 2018, entitled "NETWORK AND METHODS TO SUPPORT INTERDOMAIN MOBILITY IN VIRTUALIZED RADIO ACCESS NETWORK";

U.S. Provisional Patent Application 62/748,359, filed Oct. 19, 2018, entitled "METHODS AND APPARATUS FOR CAPABILITY SIGNALING IN RADIO ACCESS NETWORK";

U.S. Provisional Patent Application 62/748,015, filed Oct. 19, 2018, entitled "RADIO ACCESS NETWORK AND METHODS FOR EXPEDITED NETWORK ACCESS".

U.S. Provisional Patent Application 62/790,922, filed Jan. 10, 2019, entitled "RESOURCE MANAGEMENT FOR WIRELESS BACKHAUL NETWORKS".

U.S. Provisional Patent Application 62/825,636, filed Mar. 28, 2019, entitled "RESOURCE MANAGEMENT FOR WIRELESS BACKHAUL NETWORKS".

B. General Description of Radio Resources

B.1 General Description of Radio Resources: Frequency Ranges

Two types of frequency ranges are defined in 3GPP. Sub 6 GHz range is called FR1, and millimeter wave range is called FR2. The exact frequency range for FR1 (sub 6 GHz) and FR2 (millimeter wave or above 6 GHz) may be defined as in Table 1.

TABLE 1

Frequency ranges

| Frequency Range Designation | Corresponding Frequency Range |
|---|---|
| FR1 | 450 MHz-6000 MHz |
| FR2 | 24,250 MHz-52,600 MHz |

B.2 General Description of Radio Resources: Channels

A UE and a gNB may use one or more channels to communicate with each other. For example, a UE may transmit information or data to the gNB using one or more uplink channels. Examples of uplink channels include a PUCCH (Physical Uplink Control Channel) and a PUSCH (Physical Uplink Shared Channel), PRACH (Physical Random Access Channel), etc. For example, uplink channels (e.g., PUSCH) may be used for transmitting UL data (i.e., Transport Block(s), MAC PDU, and/or UL-SCH (Uplink-Shared Channel)).

UL data may include URLLC data. The URLLC data may be UL-SCH data. URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs may also transmit information or data to the one or more UEs using one or more downlink channels, for instance. Examples of downlink channels include a PDCCH, a PDSCH, etc. Other kinds of channels may be used. The PDCCH may be used for transmitting Downlink Control Information (DCI).

For a radio link between a base station (gNB) and a first or second UE, the following physical channels may be used (downlink is a transmission direction from gNB to UE, and uplink is a transmission direction from UE to gNB: physical broadcast channel (PBCH); physical downlink control channel (PDCCH); physical downlink shared channel (PDSCH); physical uplink control channel (PUCCH); and/or physical uplink shared channel (PUSCH).

A PBCH may be used for broadcasting essential system information. A PBCH may include master information block (MIB) and some other information. A PDCCH may be used for transmitting control information in the downlink and the PDCCH may include downlink control information (DCI). A PDSCH may be used for transmitting remaining minimum system information (RMSI), other system information (OSI), paging, and downlink data (DL-SCH (downlink shared channel)). A PUCCH may be used for transmitting uplink control information (UCI). A PUSCH may be used for transmitting uplink data (UL-SCH (uplink shared channel) and the PUSCH may be used for transmitting UCI.

B.3 General Description of Radio Resources: Synchronization

For the radio link between a base station (gNB) and a first or second UE, the following physical signals may be used: primary synchronization signal (PSS); secondary synchronization signal (SSS); tracking reference signal (TRS); channel state information reference signal (CSI-RS); demodulation reference signal (DMRS); phase tracking reference signal (PTRS); and/or sounding reference signal (SRS).

A PSS and an SSS may be used for time/frequency synchronization and determination/detection of a physical cell identity (PCID). The PSS, the SSS, and the PBCH may be multiplexed as a SS/PBCH block, and one or more SS/PBCH blocks may be transmitted in a serving cell. A TRS may be used for channel tracking at a UE side and transmitted in the downlink, and the TRS may be one configuration of a CSI-RS resource. A CSI-RS may be used for measuring channel state information (CSI) and transmitted in the downlink and a CSI-RS includes non-zero power CSI-RS for channel measurement or interference measurement, zero-power CSI-RS (ZP CSI-RS) for interference measurement. A DMRS may be used for demodulation of physical channels, and the DMRS may be defined for each channel. A PTRS may be used for phase tracking to compensate phase noise and transmitted with DMRS and PDSCH/PUSCH. The PTRS may be configured in FR2. An SRS may be used for channel sounding in the uplink.

DCI may include scheduling information of a PDSCH or a PUSCH, the timing of HARQ-ACK (hybrid automatic repeat request—acknowledgement) bit(s), and modulation and coding schemes (MCS), DMRS port information, and so on. UCI may include HARQ-ACK bits and CSI. CSI may include one or more of CQI (channel quality indicator), PMI (precoding matrix indicator), RI (rank indicator), LI (layer indicator), and CRI (CSI-RS index).

B.4 GENERAL DESCRIPTION OF RADIO RESOURCES: NUMEROLOGIES

Numerologies, frame and slot structures, resource blocks (RBs), bandwidth parts (BWPs) are also described herein. In this disclosure, unless otherwise noted, the size of various fields in the time domain is expressed in time units $T_c=1/(\Delta f_{max} \cdot N_f)$ where $\Delta f_{max}=480 \cdot 10^3$ Hz and $N_f=4096$. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$.

Multiple OFDM numerologies are supported as given by Table 2 where μ and the cyclic prefix for a bandwidth part are obtained from the higher-layer parameter subcarierSpacing and cyclicPrefix, respectively.

TABLE 2

Multiple OFDM numerologies

| μ | Δf = $2^\mu$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Uplink-downlink timing relation and transition time between transmission and reception, and reception to transmission are described herein. Downlink and uplink transmissions may be organized into frames with $T_f=(\Delta f_{max} N_f/1000) \cdot T_c=10$ ms duration, each including ten subframes of $T_{sf}=(\Delta f_{max} N_f/1000) \cdot T_c=1$ ms duration. The number of consecutive OFDM symbols per subframe may be $N_{symb}^{subframe,\mu}=N_{symb}^{slot} N_{slot}^{subframe,\mu}$.

Figure 4:
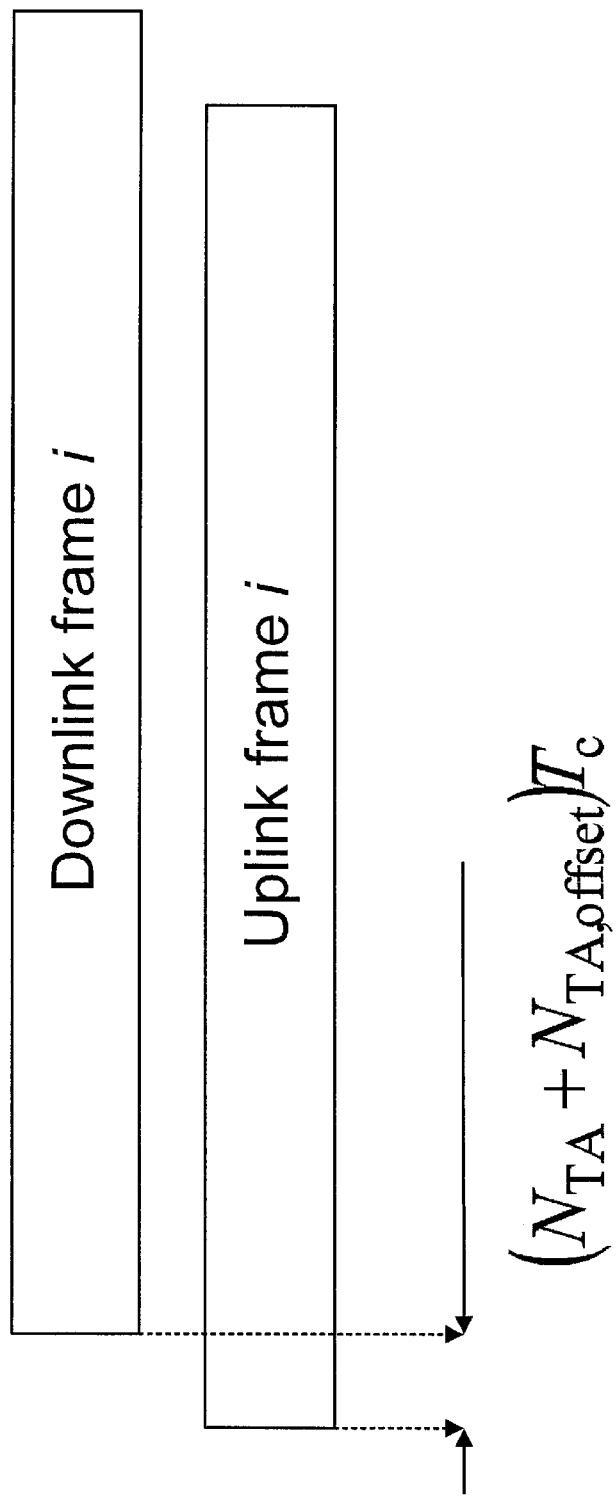
FIG. 4 is a diagrammatic view showing an uplink-downlink timing relation.

Each frame may be divided into two equally-sized half-frames of five subframes each with half-frame 0 including subframes 0-4 and half-frame 1 including subframes 5-9. There may be one set of frames in the uplink and one set of frames in the downlink on a carrier. FIG. 4 illustrates an uplink-downlink timing relation. Table 3 illustrates the transition time between transmission and reception ($N_{TX\_RX}$) and the transition time between reception and transmission ($N_{RX\_TX}$) for FR1 and FR2.

TABLE 3 the transition time between transmission
and reception ($N_{TX\_RX}$) and the transition time
between reception and transmission ($N_{RX\_TX}$)

| Transition Time | FR1 | FR2 |
|---|---|---|
| $N_{TX\_RX}$ | 25600 | 13792 |
| $N_{RX\_TX}$ | 25600 | 13792 |

Uplink frame number i for transmission from the UE may start $N_{TA}=(N_{TA}+N_{TA,offset})T_c$ before the start of the corresponding downlink frame at the UE. $N_{TA,offset}$ is given by Table 3.

For subcarrier spacing configuration μ, slots may be numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot, where $N_{symb}^{slot}$ depends on the cyclic prefix as given by Tables 4 and 5, respectively. The start of slot $n_s^\mu$ in a subframe is aligned in time with the start of OFDM symbol $n_s^\mu N_{symb}^{slot}$ in the same subframe. Tables 3 depicts the number of OFDM symbols per slot, slots per frame, and slots per subframe for normal cyclic prefix. Table 4 depicts the number of OFDM symbols per slot, slots per frame, and slots per subframe for extended cyclic prefix.

TABLE 4 the number of OFDM symbols per slot, slots per frame, and slots per
subframe for normal cyclic prefix

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 5 the number of OFDM symbols per slot, slots per frame, and slots per
subframe for extended cyclic prefix

| μ | $N_{symb}^{slot}$ | $N_{slot}^{frame,\mu}$ | $N_{slot}^{subframe,\mu}$ |
|---|---|---|---|
| 2 | 12 | 40 | 4 |

OFDM symbols in a slot can be classified as "downlink", "flexible", or "uplink". In a slot in a downlink frame, the UE may assume that downlink transmissions only occur in "downlink" or "flexible" symbols. In a slot in an uplink frame, the UE may only transmit in "uplink" or "flexible" symbols.

A UE not capable of full-duplex communication is not expected to transmit in the uplink earlier than $N_{Rx-Tx}T_c$ after the end of the last received downlink symbol in the same cell where $N_{Rx-Tx}$ is given by Table 3. A UE not capable of full-duplex communication is not expected to receive in the downlink earlier than $N_{Tx-Rx}T_c$ after the end of the last transmitted uplink symbol in the same cell where $N_{Tx-Rx}$ is given by Table 3.

An antenna port may be defined such that the channel over which a symbol on the antenna port is conveyed can be inferred from the channel over which another symbol on the same antenna port is conveyed. For DMRS associated with a PDSCH, the channel over which a PDSCH symbol on one antenna port is conveyed can be inferred from the channel over which a DMRS symbol on the same antenna port is conveyed only if the two symbols are within the same resource as the scheduled PDSCH, in the same slot, and in the same Physical resource block group (PRG).

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

B.5 General Description of Radio Resources: Resource Grid

For each numerology and carrier, a resource grid of $N_{grid,x}^{size,\mu} N_{sc}^{RB}$ subcarriers and $N_{symb}^{subframe,\mu}$ OFDM symbols may be defined, starting at common resource block $N_{grid,}^{start,\mu}$ indicated by higher-layer signalling. There may be one set of resource grids per transmission direction (uplink or downlink) with the subscript x set to DL and UL for downlink and uplink, respectively. When there is no risk for confusion, the subscript x may be dropped. There may be one resource grid for a given antenna port p, subcarrier spacing configuration μ, and transmission direction (downlink or uplink).

The carrier bandwidth $N_{grid}^{size,\mu}$ for subcarrier spacing configuration μ may be given by the higher-layer parameter carrierBandwidth in the SCS-SpecificCarrier IE (information element). The starting position $N_{grid}^{start,\mu}$ for subcarrier spacing configuration μ may be given by the higher-layer parameter offsetToCarrier in the SCS-SpecificCarrier IE.

The frequency location of a subcarrier refers to the center frequency of that subcarrier. For the downlink, the higher-layer parameter DirectCurrentLocation in the SCS-Specific-Carrier IE may indicate the location of the transmitter DC subcarrier in the downlink for each of the numerologies configured in the downlink. Values in the range 0-3299 represent the number of the DC subcarrier and the value 3300 indicates that the DC subcarrier is located outside the resource grid.

For the uplink, the higher-layer parameter DirectCurrentLocation in the UplinkTxDi-rectCurrentBWP IE may indicate the location of the transmitter DC subcarrier in the uplink for each of the configured bandwidth parts, including whether the DC subcarrier location is offset by 7.5 kHz relative to the center of the indicated subcarrier or not. Values in the range 0-3299 represent the number of the DC subcarrier, the value 3300 indicates that the DC subcarrier is located outside the resource grid, and the value 3301 indicates that the position of the DC subcarrier in the uplink is undetermined.

Each element in the resource grid for antenna port p and subcarrier spacing configuration μ it is called a resource element and is uniquely identified by $(k,l)_{p,\mu}$ where k is the index in the frequency domain and l refers to the symbol position in the time domain relative to some reference point. Resource element $(k,l)_{p,\mu}$ corresponds to a physical resource and the complex value $a_{k,l}^{(p,\mu)}$. When there is no risk for confusion, or no particular antenna port or subcarrier spacing is specified, the indices p and μ may be dropped, resulting in $a_{k,l}^{(p)}$ or $a_{k,l}$.

In the downlink, the OFDM access scheme with cyclic prefix (CP) may be employed, which may be also referred to as CP-OFDM. A downlink radio frame may include multiple pairs of downlink resource blocks (RBs), which is also referred to as physical resource blocks (PRBs). The downlink RB pair is a unit for assigning downlink radio resources, defined by a predetermined bandwidth (RB bandwidth) and a time slot. The downlink RB pair may include two downlink RBs that are continuous in the time domain. Additionally or alternatively, the downlink RB may include twelve sub-carriers in frequency domain and seven (for normal CP) or six (for extended CP) OFDM symbols in time domain. A region defined by one sub-carrier in frequency domain and one OFDM symbol in time domain may be referred to as a resource element (RE) and may be uniquely identified by the index pair (k,l), where k and l are indices in the frequency and time domains, respectively.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). An uplink radio frame may include multiple pairs of uplink resource blocks. The uplink RB pair is a unit for assigning uplink radio resources, defined by a predetermined bandwidth (RB bandwidth) and a time slot. The uplink RB pair may include two uplink RBs that are continuous in the time domain. The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain may be referred to as a resource element (RE) and may be uniquely identified by the index pair (k,l) in a slot, where k and l are indices in the frequency and time domains respectively. CP-OFDM may be defined as the case that transform precoding is not enabled/disabled. DFT-S-OFDM may be defined as the case that transform precoding is enabled.

Point A is also described herein. A resource block is defined as $N_{sc}^{RB}=12$ consecutive subcarriers in the frequency domain. Point A serves as a common reference point for resource block grids and may be obtained from the following. offsetToPointA for a PCell downlink represents the frequency offset between point A and the lowest subcarrier of the lowest resource block overlapping with the SS/PBCH block used by the UE for initial cell selection, expressed in units of resource blocks assuming 15 kHz subcarrier spacing for FR1 and 60 kHz subcarrier spacing for FR2. absoluteFrequencyPointA for all other cases where absoluteFrequencyPointA represents the frequency-location of point A expressed as in Common resource blocks are numbered from 0 and upwards in the frequency domain for subcarrier spacing configuration μ. The center of subcarrier 0 of common resource block 0 for subcarrier spacing configuration μ may coincide with point A. The relation between the common resource block number $n_{CRB}^{\mu}$ in the frequency domain and resource elements (k,l) for subcarrier spacing configuration μ may be given by $n_{CRB}^\mu = \lceil k/N_{sc}^{RB} \rceil$ where k is defined relative to point A such that k=0 corresponds to the subcarrier centered around point A.

Physical resource blocks may be defined within a bandwidth part and numbered from 0 to $N_{BWP,i}^{size}-1$ where i is the number of the bandwidth part. The relation between the physical resource block $n_{pRB}$ in bandwidth part i and the common resource block $n_{CRB}$ is given by $n_{CRB}=n_{PRB}+N_{BWP,i}^{start}$ where $N_{BWP,i}^{size}$ is the common resource block where bandwidth part starts relative to common resource block 0.

Virtual resource blocks may be defined within a bandwidth part and numbered from 0 to $N_{BWP,i}^{size}-1$. In this case, i is the number of the bandwidth part.

A bandwidth part is a subset of contiguous common resource blocks for a given numerology $\mu_i$ in bandwidth part i on a given carrier. The starting position $N_{BWP,i}^{start,\mu}$ and the number of resource blocks $N_{BWP,i}^{size,\mu}$ a bandwidth part may fulfil $N_{grid,x}^{start,\mu} \leq N_{BWP,i}^{start,\mu} < N_{grid,x}^{start,\mu} + N_{grid,x}^{size,\mu}$ and $N_{grid,x}^{start,\mu} < N_{BWP,i}^{size,\mu} + N_{BWP,i}^{start,\mu} \leq N_{grid,x}^{start,\mu} + N_{grid,x}^{size,\mu}$, respectively.

A UE can be configured with up to four bandwidth parts in the downlink with a single downlink bandwidth part being active at a given time. The UE is not expected to receive PDSCH, PDCCH, or CSI-RS (except for RRM) outside an active bandwidth part.

A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE may not transmit PUSCH or PUCCH outside an active bandwidth part. For an active cell, the UE may not transmit SRS outside an active bandwidth part. Unless otherwise noted, the description in this disclosure applies to each of the bandwidth parts.

Configuration of BWP is also described herein. A UE configured for operation in bandwidth parts (BWPs) of a serving cell, may be configured by higher layers for the serving cell with a set of at most four bandwidth parts (BWPs) for receptions by the UE (DL BWP set) in a DL bandwidth by parameter BWP-Downlink and a set of at most four BWPs for transmissions by the UE (UL BWP set) in an UL bandwidth by parameter BWP-Uplink.

If a UE is not provided higher layer parameter initialDownlinkBWP, an initial active DL BWP may be defined by a location and number of contiguous PRBs, starting from a PRB with the lowest index and ending at a PRB with the highest index among PRBs of a control resource set for Type0-PDCCH common search space, and a subcarrier spacing and a cyclic prefix for PDCCH reception in the control resource set for Type0-PDCCH common search space. Otherwise, the initial active DL BWP may be provided by higher layer parameter initialDownlinkBWP. For operation on the primary cell or on a secondary cell, a UE may be provided an initial active UL BWP by higher layer parameter initialuplinkBWP. If the UE is configured with a supplementary UL carrier, the UE may be provided an initial UL BWP on the supplementary UL carrier by higher layer parameter initialUplinkBWP in supplementaryUplink.

If a UE has a dedicated BWP configuration, the UE may be provided by higher layer parameter firstActiveDownlinkBWP-Id a first active DL BWP for receptions and by higher layer parameter firstActiveUplinkBWP-Id a first active UL BWP for transmissions on the primary cell.

For each DL BWP or UL BWP in a set of DL BWPs or UL BWPs, respectively, the UE may be provided the following parameters for the serving cell. A subcarrier spacing may be provided by higher layer parameter subcarrierSpacing. A cyclic prefix may be provided by higher layer parameter cyclicPrefix. A first PRB and a number of contiguous PRBs may be provided by higher layer parameter locationAndBandwidth that is interpreted as RIV, setting $N_{BWP}^{size}=275$, and the first PRB is a PRB offset relative to the PRB indicated by higher layer parameters offsetToCarrier and subcarrierSpacing. An index in the set of DL BWPs or UL BWPs may be provided by respective higher layer parameter bwp-Id. A set of BWP-common and a set of BWP-dedicated parameters may be provided by higher layer parameters bwp-Common and bwp-Dedicated.

For unpaired spectrum operation, a DL BWP from the set of configured DL BWPs with an index provided by higher layer parameter bwp-Id may be linked with an UL BWP from the set of configured UL BWPs with index provided by higher layer parameter bwp-Id when the DL BWP index and the UL BWP index are same. For unpaired spectrum operation, a UE does not expect to receive a configuration where the center frequency for a DL BWP is different than the center frequency for an UL BWP when the bwp-Id of the DL BWP is same as the bwp-Id of the UL BWP.

For each DL BWP in a set of DL BWPs on the primary cell, a UE may be configured with control resource sets for every type of common search space and for UE-specific search space. The UE does not expect to be configured without a common search space on the PCell, or on the PSCell, of the MCG in the active DL BWP.

For each UL BWP in a set of UL BWPs of the PCell or of the PUCCH-SCell, the UE may be provided configured resource sets for PUCCH transmissions. A UE may receive PDCCH and PDSCH in a DL BWP according to a configured subcarrier spacing and CP length for the DL BWP. A UE may transmit PUCCH and PUSCH in an UL BWP according to a configured subcarrier spacing and CP length for the UL BWP.

If a bandwidth part indicator field is configured in DCI format 1_1, the bandwidth part indicator field value indicates the active DL BWP, from the configured DL BWP set. If a bandwidth part indicator field is configured in DCI format 0_1, the bandwidth part indicator field value indicates the active UL BWP, from the configured UL BWP set.

If a bandwidth part indicator field is configured in DCI format 0_1 or DCI format 1_1 and indicates an UL BWP or a DL BWP different from the active UL BWP or DL BWP, respectively, the UE may, for each information field in the received DCI format 0_1 or DCI format 1_1 perform the following. If the size of the information field is smaller than the one required for the DCI format 0_1 or DCI format 1_1 interpretation for the UL BWP or DL BWP that is indicated by the bandwidth part indicator, respectively, the UE may prepend zeros to the information field until its size is the one required for the interpretation of the information field for the UL BWP or DL BWP prior to interpreting the DCI format 0_1 or DCI format 1_1 information fields, respectively. If the size of the information field is larger than the one required for the DCI format 0_1 or DCI format 1_1 interpretation for the UL BWP or DL BWP that is indicated by the bandwidth part indicator, respectively, the UE may use a number of least significant bits of DCI format 0_1 or DCI format 1_1 equal to the one required for the UL BWP or DL BWP indicated by a bandwidth part indicator prior to interpreting the DCI format 0_1 or DCI format 1_1 information fields, respectively. The UE may also set the active UL BWP or DL BWP to the UL BWP or DL BWP indicated by the bandwidth part indicator in the DCI format 0_1 or DCI format 1_1, respectively.

A UE does not expect to detect a DCI format 1_1 or a DCI format 0_1 indicating respectively an active DL BWP or an active UL BWP change with the corresponding time domain resource assignment field providing a slot offset value for a PDSCH reception or PUSCH transmission that is smaller than a value (e.g., delay) required by the UE for an active DL BWP change or UL BWP change.

If a UE detects a DCI format 1_1 indicating an active DL BWP change for a cell, the UE is not required to receive or transmit in the cell during a time duration from the end of the third symbol of a slot where the UE receives the PDCCH that includes the DCI format 1_1 in a scheduling cell until the beginning of a slot indicated by the slot offset value of the time domain resource assignment field in the DCI format 1_1.

If a UE detects a DCI format 0_1 indicating an active UL BWP change for a cell, the UE is not required to receive or transmit in the cell during a time duration from the end of the third symbol of a slot where the UE receives the PDCCH that includes the DCI format 0_1 in the scheduling cell until the beginning of a slot indicated by the slot offset value of the time domain resource assignment field in the DCI format 0_1.

A UE may expect to detect a DCI format 0_1 indicating active UL BWP change, or a DCI format 1_1 indicating active DL BWP change, only if a corresponding PDCCH is received within the first 3 symbols of a slot.

For the primary cell, a UE may be provided by higher layer parameter default-DownlinkBWP-Id with a default DL BWP among the configured DL BWPs. If a UE is not provided a default DL BWP by higher layer parameter defaultDownlinkBWP-Id, the default DL BWP is the initial active DL BWP.

If a UE is configured for a secondary cell with higher layer parameter default-DownlinkBWP-Id indicating a default DL BWP among the configured DL BWPs and the UE is configured with higher layer parameter bwp-InactivityTimer indicating a timer value, the UE procedures on the secondary cell may be the same as on the primary cell using the timer value for the secondary cell and the default DL BWP for the secondary cell.

If a UE is configured by higher layer parameter bwp-InactivityTimer with a timer value for the primary cell and the timer is running, the UE may increment the timer every interval of 1 millisecond for frequency range 1 or every 0.5 milliseconds for frequency range 2 if the restarting conditions are met during the interval.

If a UE is configured by higher layer parameter bwp-InactivityTimer with a timer value for a secondary cell and the timer is running, the UE may increment the timer every interval of 1 millisecond for frequency range 1 or every 0.5 milliseconds for frequency range 2 if the restarting conditions are not met during the interval.

For a cell where a UE changes an active DL BWP due to a BWP inactivity timer expiration and for accommodating a delay in the active DL BWP change or the active UL BWP change required by the UE, the UE is not required to receive or transmit in the cell during a time duration from the beginning of a subframe for frequency range 1, or of half of a subframe for frequency range 2, that is immediately after the BWP inactivity timer expires until the beginning of a slot where the UE can receive or transmit.

If a UE is configured by higher layer parameter firstActiveDownlinkBWP-Id with a first active DL BWP and by higher layer parameter firstActiveUplinkBWP-Id a first active UL BWP on a secondary cell or on a supplementary UL carrier, the UE may use the indicated DL BWP and the indicated UL BWP as the respective first active DL BWP on the secondary cell and the first active UL BWP on the secondary cell or the supplementary UL carrier.

For paired spectrum operation, a UE may not expect to transmit a PUCCH with HARQ-ACK information on a PUCCH resource indicated by a DCI format 1_0 or a DCI format 1_1 if the UE changes its active UL BWP on the PCell between a time of a detection of the DCI format 1_0 or the DCI format 1_1 and a time of a corresponding PUCCH transmission with HARQ-ACK information. A UE may not expect to monitor PDCCH when the UE performs RRM measurements over a bandwidth that is not within the active DL BWP for the UE.

B.6 General Description of Radio Resources: Slot Format Determination

A UE may be configured with a slot format including downlink symbols, uplink symbols, and flexible symbols. If a UE is provided TDD-UL-DL-ConfigurationCommon IE by a SIB1 (system information block 1) or a dedicated RRC signaling, the UE sets the slot format per slot over the number of slots as indicated by TDD-UL-DL-ConfigurationCommon. The higher layer parameter TDD-UL-DL-ConfigurationCommon provides a reference subcarrier spacing (SCS) configuration $\mu_{ref}$ by referenceSubcarrierSpacing IE and a pattern1. The pattern1 provides a slot configuration period of P msec by dl-UL-TransmissionPeriodicity, the number of slots $d_{slot}$ with only downlink symbols by nrofDownlinkSlots, the number of downlink symbols $d_{sym}$ by nrofDownlinkSymbols, the number of slots $u_{slot}$ with only uplink symbols by nrofUplinkSlots, and the number of uplink symbols $u_{sym}$ by nrofUplinkSymbols. A value P=0.625 msec is valid only for $\mu_{ref}$=3. A value P=1.25 msec is valid only for $\mu_{ref}$=2 or $\mu_{ref}$=3. A value P=2.5 msec is valid only for $\mu_{ref}$=1 or $\mu_{ref}$=2 or $\mu_{ref}$=3.

A slot configuration period of P msec includes $S=P \cdot 2^{\mu_{ref}}$ slots with SCS configuration $\mu_{ref}$. From the S slots, a first $d_{slot}$ slots include only downlink symbols and a last $u_{slot}$ slots include only uplink symbols. The $d_{sym}$ symbols after the first $d_{slot}$ slots are downlink symbols. The $u_{sym}$ symbols before the last $u_{slot}$ slots are uplink symbols. The remaining $(S-d_{slot}-u_{slot})N_{symb}^{slot}-d_{sym}-u_{sym}$ are flexible symbols. The first symbol every 20/P periods is a first symbol in an even frame.

If TDD-UL-DL-ConfigurationCommon provides both pattern1 and pattern2, the UE sets the slot format per slot over a first number of slots as indicated by pattern1 and the UE sets the slot format per slot over a second number of slots as indicated by pattern2. The pattern1 provides a slot configuration period of $P_2$ msec by dl-UL-TransmissionPeriodicity, the number of slots $d_{slot,2}$ with only downlink symbols by nrofDownlinkSlots, the number of downlink symbols $d_{sym,2}$ by nrofDownlinkSymbols, the number of slots $u_{slot,2}$ with only uplink symbols by nrofUplinkSlots, and the number of uplink symbols $u_{sym,2}$ by nrofUplinkSymbols. The applicable values of $P_2$ are same as the applicable values for P.

A slot configuration period of $P+P_2$ msec includes first $S=P \cdot 2^{\mu_{ref}}$ slots and second $S_2=P_2 \cdot 2^{\mu_{ref}}$ slots. From the $S_2$ slots, a first $d_{slot,2}$ slots include only downlink symbols and a last $u_{slot,2}$ slots include only uplink symbols. The $d_{sym,2}$ symbols after the first $d_{slot,2}$ slots are downlink symbols. The $u_{sym,2}$ symbols before the last $u_{slot,2}$ slots are uplink symbols. The remaining $(S_2-d_{slot,2}-u_{slot,2})N_{symb}^{slot}-d_{sym,2}-u_{sym,2}$ are flexible symbols. A UE expects that P+P$_2$ divides 20 msec. The first symbol every 20/(P+P$_2$) periods is a first symbol in an even frame.

A UE may expect that the reference SCS configuration μ$_{ref}$ is smaller than or equal to a SCS configuration μ for any configured DL BWP or UL BWP. Each slot provided by pattern1 or pattern2 is applicable to $2^{(\mu-\mu_{ref})}$ consecutive slots in the active DL BWP or the active UL BWP where the first slot starts at a same time as a first slot for the reference SCS configuration μ$_{ref}$ and each downlink or flexible or uplink symbol for the reference SCS configuration μ$_{ref}$ corresponds to $2^{(\mu-\mu_{ref})}$ consecutive downlink or flexible or uplink symbols for the SCS configuration μ.

If the UE is additionally provided TDD-UL-DL-ConfigDedicated IE by a dedicated RRC message (dedicated RRC signaling), the parameter TDD-UL-DL-ConfigDedicated may override only flexible symbols per slot over the number of slots as provided by TDD-UL-DL-ConfigurationCommon. The TDD-UL-DL-ConfigDedicated provides a set of slot configurations by slotSpecificConfigurationsToAddModList, for each slot configuration from the set of slot configurations, a slot index for a slot provided by a parameter slotIndex, a set of symbols for a slot by a parameter symbols.

If the parameter symbols indicates (is set to) allDownlink, all symbols in the slot are downlink. If the parameter symbols indicates (is set to) allUplink, all symbols in the slot are uplink. If the parameter symbols indicates (is set to) explicit, nrofDownlinkSymbols provides a number of downlink first symbols in the slot and nrofUplinkSymbols provides the number of uplink last symbols in the slot. If nrofDownlinkSymbols is not provided, there are no downlink first symbols in the slot and if nrofUplinkSymbols is not provided, there are no uplink last symbols in the slot. The remaining symbols in the slot may be flexible.

For each slot having a corresponding index provided by slotIndex, the UE may apply a format provided by corresponding symbol(s). The UE does not expect TDD-UL-DL-ConfigDedicated to indicate as uplink or as downlink a symbol that TDD-UL-DL-ConfigurationCommon indicates as a downlink or as an uplink symbol, respectively. For each slot configuration provided by TDD-UL-DL-ConfigDedicated, a reference SCS configuration is the reference SCS configuration μ$_{ref}$ provided by TDD-UL-DL-ConfigurationCommon. A slot configuration period and the number of downlink symbols, uplink symbols, and flexible symbols in each slot of the slot configuration period may be determined from TDD-UL-DL-ConfigurationCommonTDD and TDD-UL-DL-ConfigDedicated and may be common to each configured BWP.

A UE may consider symbols in a slot indicated as downlink by TDD-UL-DL-ConfigurationCommon, or TDD-UL-DL-ConfigDedicated to be available for receptions and considers symbols in a slot indicated as uplink by TDD-UL-DL-ConfigurationCommon, or by TDD-UL-DL-ConfigDedicated to be available for transmissions.

If a UE is not configured to monitor PDCCH for DCI format 2_0, for a set of symbols of a slot that may be indicated as flexible by TDD-UL-DL-ConfigurationCommon or TDD-UL-DL-ConfigDedicated, or when TDD-UL-DL-ConfigurationCommon and TDD-UL-DL-ConfigDedicated are not provided to the UE, the UE may receive PDSCH or CSI-RS in the set of symbols of the slot if the UE receives a corresponding indication by a DCI format 1_0, DCI format 1_1, or DCI format 0_1.

If a UE is not configured to monitor PDCCH for DCI format 2_0, for a set of symbols of a slot that may be indicated as flexible by TDD-UL-DL-ConfigurationCommon or TDD-UL-DL-ConfigDedicated, or when TDD-UL-DL-ConfigurationCommon and TDD-UL-DL-ConfigDedicated are not provided to the UE, the UE may transmit PUSCH, PUCCH, PRACH, or SRS in the set of symbols of the slot if the UE receives a corresponding indication by a DCI format 0_0, DCI format 0_1, DCI format 1_0, DCI format 1_1, or DCI format 2_3.

For a set of symbols of a slot that are indicated to a UE as uplink by TDD-UL-DL-ConfigurationCommon, or TDD-UL-DL-ConfigDedicated, the UE may not receive PDCCH, PDSCH, or CSI-RS in the set of symbols of the slot.

For a set of symbols of a slot that are indicated to a UE as downlink by TDD-UL-DL-ConfigurationCommon, or TDD-UL-DL-ConfigDedicated, the UE may not transmit PUSCH, PUCCH, PRACH, or SRS in the set of symbols of the slot.

For a set of symbols of a slot that are indicated to a UE as flexible by TDD-UL-DL-ConfigurationCommon, or TDD-UL-DL-ConfigDedicated, the UE may not expect to receive both dedicated configuring transmission from the UE in the set of symbols of the slot and dedicated configuring reception by the UE in the set of symbols of the slot.

For a set of symbols of a slot that are indicated to a UE by ssb-PositionsInBurst in SystemInformationBlockType1 or ssb-PositionsInBurst in ServingCellConfigCommon, for reception of SS/PBCH blocks, the UE may not transmit PUSCH, PUCCH, PRACH in the slot if a transmission would overlap with any symbol from the set of symbols and the UE does not transmit SRS in the set of symbols of the slot. The UE does not expect the set of symbols of the slot to be indicated as uplink by TDD-UL-DL-ConfigurationCommon, or TDD-UL-DL-ConfigDedicated, when provided to the UE.

For a set of symbols of a slot corresponding to a valid PRACH occasion and symbols before the valid PRACH occasion, the UE may not receive PDCCH for Type1-PDCCH CSS set, PDSCH, or CSI-RS in the slot if a reception would overlap with any symbol from the set of symbols. The UE may not expect the set of symbols of the slot to be indicated as downlink by TDD-UL-DL-ConfigurationCommon or TDD-UL-DL-ConfigDedicated.

For a set of symbols of a slot indicated to a UE by pdcch-ConfigSIB1 in MIB for a CORESET (control resource set) for Type0-PDCCH CSS set, the UE may not expect the set of symbols to be indicated as uplink by TDD-UL-DL-ConfigurationCommon, or TDD-UL-DL-ConfigDedicated.

If a UE is scheduled by a DCI format 1_1 to receive PDSCH over multiple slots, and if TDD-UL-DL-ConfigurationCommon, or TDD-UL-DL-ConfigDedicated, indicate that, for a slot from the multiple slots, at least one symbol from a set of symbols where the UE is scheduled PDSCH reception in the slot is an uplink symbol, the UE may not receive the PDSCH in the slot.

If a UE is scheduled by a DCI format 0_1 to transmit PUSCH over multiple slots, and if TDD-UL-DL-ConfigurationCommon, or TDD-UL-DL-ConfigDedicated, indicates that, for a slot from the multiple slots, at least one symbol from a set of symbols where the UE is scheduled PUSCH transmission in the slot is a downlink symbol, the UE may not transmit the PUSCH in the slot.

DCI format 2_0 is used for determining slot format. If a UE is configured by higher layers with parameter SlotFormatIndicator, the UE may be provided an SFI-RNTI by sfi-RNTI and with a payload size of DCI format 2_0 by dci-PayloadSize. The UE is also provided in one or more serving cells with a configuration for a search space set s and a corresponding CORESET p for monitoring $M_{p,s}^{(L_{SFI})}$ PDCCH candidates for DCI format 2_0 with a CCE (control channel element) aggregation level of $L_{SFI}$ CCEs. The $M_{p,s}^{(L_{SFI})}$ PDCCH candidates are the first $M_{p,s}^{(L_{SFI})}$ PDCCH candidates for CCE aggregation level $L_{SFI}$ for search space sets in CORESET p. The CRC bits of DCI format 2_0 may be scrambled by SFI-RNTI.

For each serving cell in the set of serving cells, an identity of the serving cell by servingCellId, and a location of a SFI-index field in DCI format 2_0 by positionInDCI, a set of slot format combinations by slotFormatCombinations, where each slot format combination in the set of slot format combinations includes one or more slot formats indicated by a respective slotFormats for the slot format combination and a mapping for the slot format combination provided by slotFormats to a corresponding SFI-index field value in DCI format 2_0 provided by slotFormatCombinationId may be provided.

For unpaired spectrum operation, a reference SCS configuration $\mu_{SFI}$ by subcarrierSpacing and, when a supplementary UL carrier is configured for the serving cell, a reference SCS configuration $\mu_{SFI,SUL}$ by subcarrierSpacing2 for the supplementary UL carrier. for paired spectrum operation, a reference SCS configuration $\mu_{SFI,DL}$ for a DL BWP by subcarrierSpacing and a reference SCS configuration $\mu_{SFI,UL}$ for an UL BWP by subcarrierSpacing2.

A mobile network used in wireless networks may be where the source and destination are interconnected by way of a plurality of nodes. In such a network, the source and destination may not be able to communicate with each other directly due to the distance between the source and destination being greater than the transmission range of the nodes. That is, a need exists for intermediate node(s) to relay communications and provide transmission of information. Accordingly, intermediate node(s) may be used to relay information signals in a relay network, having a network topology where the source and destination are interconnected by means of such intermediate nodes. In a hierarchical telecommunications network, the backhaul portion of the network may comprise the intermediate links between the core network and the small subnetworks of the entire hierarchical network. Integrated Access and Backhaul (IAB) Next generation NodeB use 5G New Radio communications such as transmitting and receiving NR User Plane (U-Plane) data traffic and NR Control Plane (C-Plane) data. Both, the UE and gNB may include addressable memory in electronic communication with a processor. In one embodiment, instructions may be stored in the memory and are executable to process received packets and/or transmit packets according to different protocols, for example, Medium Access Control (MAC) Protocol and/or Radio Link Control (RLC) Protocol.

C. IAB Resource Configuration: Overview

The IAB resource configuration controller 36 of donor IAB node 22 performs various functions related to resource configuration and utilization by the donor IAB node 22 and IAB nodes 24. In one example embodiment and mode, described herein with reference to FIG. 5-FIG. 9, the IAB resource configuration controller 36 generates, communicates, and/or utilizes one or more resource configuration scheme indicator(s) which conveniently and compactly informs an IAB node as to which one of plural possible resource configuration schemes the plural radio resources available to the IAB node are to be configured and/or operated. The resource configuration scheme indicator may configure collectively configure radio resources of an IAB node 24, and thus avoids the necessity for the donor IAB node 22 to individually configure separate radio resources for the IAB node 24.

In another example embodiment and mode, described herein with reference to FIG. 10-FIG. 13, the IAB resource configuration controller 36, although having configured certain radio resources as being potentially available for a IAB node mobile termination (MT) unit 50 when the IAB node distributed unit (DU) 52 is in a "soft configuration", overrides such potential availability by generating and sending a mobile termination (MT) resource utilization override signal. The mobile termination (MT) resource utilization override signal may be generated at a time when, although potentially available for the IAB node mobile termination (MT) unit 50, the donor IAB node 22 determines for one or more reasons that the IAB node mobile termination (MT) unit 50 should not transmit or act upon transmissions which the IAB node mobile termination (MT) unit 50 receives.

In another example embodiment and mode, described herein with reference to FIG. 14-FIG. 20, the IAB resource configuration controller 36 expediently informs an IAB node 24, using a time resource indicator, TRI, which resources/symbols of a slot may be regarded as "hard" resources and which may be regarded as "soft" resources.

It should be understood that, unless otherwise indicate or apparent from context, one or more of the features of the example embodiments and modes of FIG. 5-FIG. 9, FIG. 10-FIG. 13, and FIG. 14-FIG. 20 may be utilized in conjunction with features from other one or more of such example embodiments and modes.

C.1. IAB Resource Configuration: Resource Configuration Scheme Indicator(s)

Figure 5:
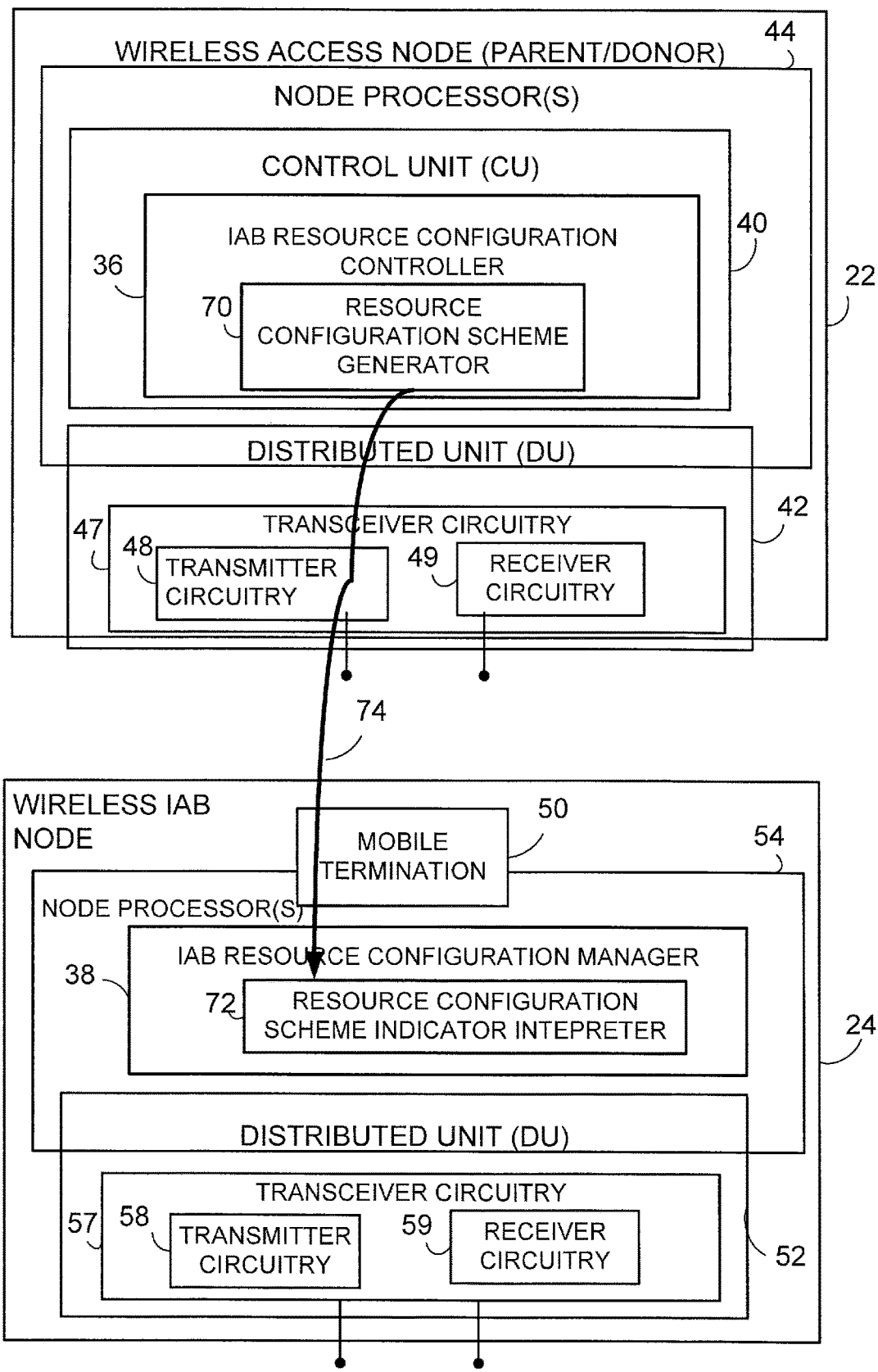
FIG. 5 is a diagrammatic view showing in more detail portions of an example embodiment and mode of a telecommunications system comprising representative donor IAB node which include a resource configuration scheme indicator generator and a representative IAB node which includes a resource configuration scheme indicator handler.

As mentioned above, radio resources that are utilized by nodes of a radio access network are configured and utilized, or at least expressed, with respect to a multi-dimensional resource grid. The dimensions of the grid may be described in terms of two or more of time, frequency, and space. FIG. 5 shows portions of a telecommunications system 20 wherein the IAB resource configuration controller 36 of donor IAB node 22 uses a resource configuration scheme indicator to express to nodes of the telecommunications system 20, e.g., to IAB nodes 24, which and how radio resources of the grid are to be configured for the IAB node 24. For the example embodiment and mode of FIG. 5, the IAB resource configuration controller 36 may comprise resource configuration scheme indicator generator 70. As explained below, resource configuration scheme indicator generator 70 generates one or more resource configuration scheme indicator(s) which are transmitted by transmitter circuitry 48 of distributed unit (DU) 42 to IAB node 24. At the IAB node 24 the one or more resource configuration scheme indicator(s) are received by IAB node mobile termination (MT) unit 50, and are processed by resource configuration scheme indicator handler 72 of IAB node 24. The resource configuration scheme handler 72 may comprise or be realized by IAB node processor(s) 54. In an example embodiment and mode, the one or more resource configuration scheme indicator(s) are transmitted over a Physical Downlink Control Channel (PDCCH) of the resource configuration scheme is signaled on the Physical Layer (or alternatively a Physical Downlink Shared Channel if the resource configuration scheme is transmitted via RRC Configuration signaling), which is shown in FIG. 5 as being scheme indicator signal 74.

Figure 6A:
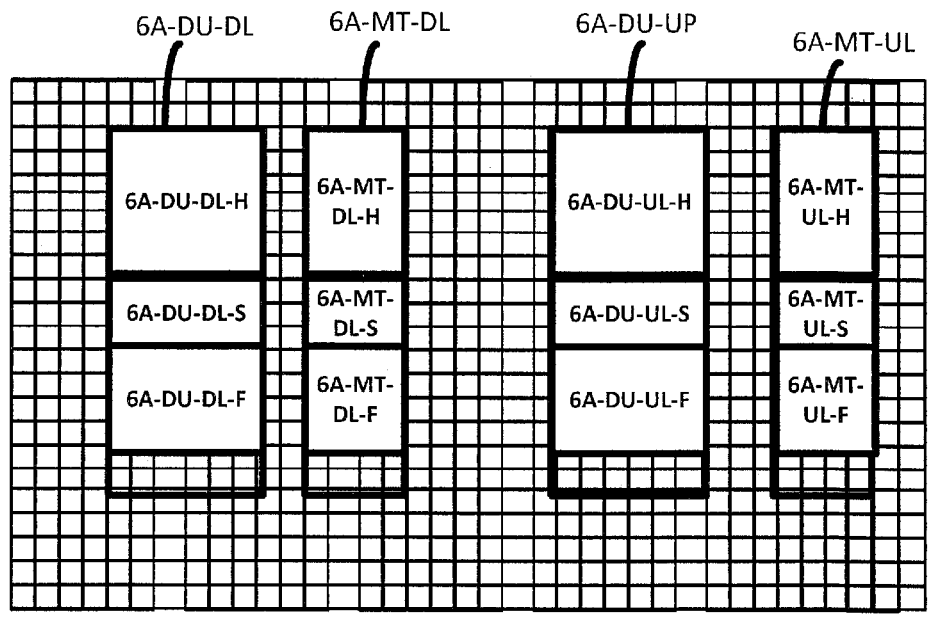
FIG. 6A is a diagrammatic view of differing example grid schemes for IAB resource configuration.

FIG. 6A shows an example of a first grid scheme for IAB resource configuration. FIG. 6A, and other comparably depicted grid illustrations described herein, are simplified with respect to the number of dimensions utilized and the numbers of columns and rows that comprise the grid. It should be understood that any number of columns and rows may be utilized, and typically a far greater number of columns and rows comprise the grids that is shown. As indicated above, the dimensions of the grid may be any of time, frequency, and space. For sake of simplicity, two dimensional grids are illustrated, with the horizontal dimension or axis being time, and the vertical dimension or axis being frequency. The grid may also be conceptualized as a frame. The frame may be divided, e.g., on the horizontal axis, into subframes, and subframes in turn may be divided into slots. Each square of the grid may represent a resource block (RB). In a time/frequency grid, each resource block may comprise plural number of slots on the horizontal axis, e.g., a number of symbols, and a plural number of subcarriers, e.g., 12 subcarriers, along the vertical axis.

For a IAB network, radio resources may be configured for the IAB node distributed unit (DU) 52 of the IAB node 24 as being any one or downlink hard (DL-H), downlink soft (DL-S), uplink hard (UL-H), uplink soft (DL-S), flexible hard (F-H), flexible soft (F-S), and not available (NA). The configuration of the IAB node mobile termination (MT) unit 50 for the IAB node 24 is dependent upon the configuration of the IAB node distributed unit (DU) 52.

Each of the downlink, uplink and flexible time-resource types of the DU can belong to one of two categories: Hard: The corresponding time resource is always available for the DU child link; Soft: The availability of the corresponding time resource for the DU child link is explicitly and/or implicitly controlled by the parent node.

Certain combinations of resource configuration/behavior for combinations of IAB node distributed unit (DU) 52 and IAB node mobile termination (MT) unit 50 have already been agreed in 3GPP, as reflected by Table 6 and Table 7 below. Table 6 and Table 7 are excerpted from (1) R1-1814190, TP for 38.874 on PHY Enhancements for NR IAB, AT&T, RANI #95, and (2) Chair's Notes, RANI #95. Table 6 applies in case of time division multiplexing (TDM) operation, where there can be no simultaneous transmission in the DU and the MT, nor any simultaneous reception in the DU and the MT. how is Vinnie doing? Give him my love. Warren Charlie: thank you for your email and for your faithfulness to our client. I paid the auto insurance premium with Geico today by debit card, and delivered checks this morning both to Verizon and to these storage facility. Both conveniently here in Virginia. Table 7 applies in case of space division multiplexing (SDM) operation, where there can be simultaneous transmission in the DU and the MT, alternatively simultaneous reception in the DU and the MT. The definitions/nomenclature/assumption(s) of Table 8 are applicable for Table 6 and Table 7.

TABLE 6

TDM Operation (Half Duplex)

| DU Configuration | MT configuration | | |
|---|---|---|---|
| | DL | UL | F |
| DL-H | DU: Tx<br>MT: NULL | DU: Tx<br>MT: NULL | DU: Tx<br>MT: NULL |
| DL-S | When DU resource: IA<br>DU: Tx<br>MT: NULL<br>When DU resource: NA | When DU resource: IA<br>DU: Tx<br>MT: NULL<br>When DU resource: INA | When DU resource: IA<br>DU: Tx<br>MT: NULL<br>When DU resource: NA |

TABLE 6-continued

TDM Operation (Half Duplex)

| DU Configuration | MT configuration | | |
|---|---|---|---|
| | DL | UL | F |
| | DU: NULL<br>MT: Rx | DU: NULL<br>MT: Tx | DU: NULL<br>MT: Tx/Rx |
| UL-H | DU: Rx<br>MT: NULL | DU: Rx<br>MT: NULL | DU: Rx<br>MT: NULL |
| UL-S | When DU resource: IA<br>DU: Rx<br>MT: NULL<br>When DU resource: INA<br>DU: NULL<br>MT: Rx | When DU resource: IA<br>DU: Rx<br>MT: NULL<br>When DU resource: NA<br>DU: NULL<br>MT: Tx | When DU resource: IA<br>DU: Rx<br>MT: NULL<br>When DU resource: INA<br>DU: NULL<br>MT: Tx/Rx |
| F-H | DU: Tx/Rx<br>MT: NULL | DU: Tx/Rx<br>MT: NULL | DU: Tx/Rx<br>MT: NULL |
| F-S | When DU resource: IA<br>DU: Tx/Rx<br>MT: NULL<br>When DU resource: INA<br>DU: NULL<br>MT: Rx | When DU resource: IA<br>DU: Tx/Rx<br>MT: NULL<br>When DU resource: INA<br>DU: NULL<br>MT: Tx | When DU resource: IA<br>DU: Tx/Rx<br>MT: NULL<br>When DU resource: INA<br>DU: NULL<br>MT: Tx/Rx |
| NA | DU: NULL<br>MT: Rx | DU: NULL<br>MT: Tx | DU: NULL<br>MT: Tx/Rx |

TABLE 7

SDM, Assuming Full Duplex Can Happen

| | DL | UL | F |
|---|---|---|---|
| DL-H | DU: Tx<br>MT: NULL | DU: Tx<br>MT: Tx | DU: Tx<br>MT: Tx |
| DL-S | When DU resource: IA<br>DU: Tx<br>MT: NULL<br>When DU resource: INA<br>DU: NULL<br>MT: Rx | When DU resource: IA<br>DU: Tx<br>MT: Tx<br>When DU resource: INA<br>DU: NULL<br>MT: Tx | When DU resource: IA<br>DU: Tx<br>MT: Tx<br>When DU resource: INA<br>DU: NULL<br>MT: Tx/Rx |
| UL-H | DU: Rx<br>MT: Rx | DU: Rx<br>MT: NULL | DU: Rx<br>MT: Rx |
| UL-S | When DU resource: IA<br>DU: Rx<br>MT: Rx<br>When DU resource: INA<br>DU: NULL<br>MT: | When DU resource: IA<br>DU: Rx<br>MT: NULL<br>When DU resource: INA<br>DU: NULL<br>Rx | When DU resource: IA<br>DU: Rx (only if MT is Rx and the DU knows that ahead of time)<br>MT: Rx<br>Tx When DU resource: INA<br>DU: NULL<br>MT: Tx/Rx |
| F-H | DU: Tx/Rx<br>MT: Rx (only if DU is Rx and the parent DU is aware in advance) | DU: Tx/Rx<br>MT: Tx (only if DU is Tx and the parent is aware in advance) | DU: Tx/Rx<br>MT: Tx (only if DU is Tx and the parent DU knows that ahead of time), Rx (only if DU is Rx and the parent DU is aware in advance) |
| F-S | When DU resource: IA<br>DU: Tx/Rx<br>MT: Rx (only if | When DU resource: IA<br>DU: Tx/Rx<br>MT: Tx (only if | When DU resource: IA<br>DU: Tx/Rx<br>MT: Tx (only if |

TABLE 7-continued

SDM, Assuming Full Duplex Can Happen

| DL | UL | F |
|---|---|---|
| DU is Rx and the parent DU is aware in advance) | DU is Tx and the parent DU is aware in advance) | DU is Tx and the parent DU knows that ahead of time), Rx (only if DU is Rx and the parent DU is aware in advance) |
| When DU resource: INA DU: NULL MT: Rx | When DU resource: INA DU: NULL MT: Tx | |
| | | When DU resource: INA DU: NULL MT: Tx/Rx |
| NA DU: NULL MT: Rx | DU: NULL MT: Tx | DU: NULL MT: Tx/Rx |

TABLE 8

DEFINITIONS/NOMENCLAURE/ASSUMPTIONS

"MT: Tx" means that the MT should transmit if scheduled
"DU: Tx" means that the DU may transmit
"MT: Rx" means that the MT should be able to receive (if there is anything to receive)
"DU: Rx" means that the DU may schedule uplink transmissions from child nodes or UEs
"MT: Tx/Rx" means that the MT should transmit if scheduled and should be able to receive, but not simultaneously
"DU: Tx/Rx" means that the DU may transmit and may schedule uplink transmission from child nodes and UEs, but not simultaneously
"IA" means that the DU resource is explicitly or implicitly indicated as available
"INA" means that the DU resource is explicitly or implicitly indicated as not available
"MT: NULL" means that the MT does not transmit and does not have to be able to receive
"DU: NULL" means that the DU does not transmit and does not schedule uplink transmission from child nodes and UEs
"NA" means the resources are "not available."
Tables 1 and 2 assume an JAB not capable of full-duplex operation Table 6 and Table 7 are for one IAB node. For an IAB to work, there needs to be a series of connected nodes, from the RAN "edge" to the backhaul Donor node, e.g., the node directly connectable to a wired (or proprietary wireless) backhaul. Because of that connection of nodes obeying the properties of the Table 6 and Table 7 a well-functioning IAB network will operate according to certain constraints.

Thus, for example, based on Table 6 and Table 7, if a DU configuration is set to "NA," not available, then the MT if configured for DL is in "Rx," receive mode; if the DU configured is set for UL, then if the MT if configured for DL is in "Tx," Transmit mode, and if the DU configuration is "Flexible" the MT can operate in Receive or Transmit modes depending on L1 signaling. Such L1 signaling may include a specific grant for the resources or (more useful as it reduces signaling overhead). The resource grant may use a mechanism similar to semi-persistent scheduling or Type 2 Configured grant. That is, the L1 signaling may be "activation" (or "deactivation" or "release") signaling using potential variations of DCI Formats 0_0, 0_1, for uplink and DCI Formats 1_0, and 1_1 downlink (de)activation, where specific resources are indicated. (Note that deactivation or release would most certainly use "fallback" formats 0_0 and 1_0, as per NR.

Unless otherwise indicated or apparent from the context, the IAB resource configuration controller 36 of donor IAB node 22 and IAB resource configuration manager 38 of IAB node 24 operate in accordance with Table 6 and Table 7. Similarly, subject to Table 6 and Table 7, the resource configuration scheme indicator generator 70 may generate plural resource configuration schemes. Each resource configuration scheme generally indicates which radio resources are to be configured for an IAB node mobile termination (MT) unit 50 of the IAB node 24 on one hand, and which radio resources are to be configured for an IAB node distributed unit (DU) 52 on the other hand. Thus, the resource configuration scheme may be constructed or configured on the basis of node entity as one resource configuration scheme factor. In addition, each resource configuration scheme may be expressed using one or more other scheme factors.

For example, a resource configuration scheme may indicate which of the radio resources of the scheme are to be configured as "uplink" and which radio resources of the scheme are to be configured as "downlink".

As another example, a resource configuration scheme may indicate which of the radio resources of the scheme are to be configured as "hard" and which radio resources of the scheme are to be configured as "soft". The assignment of hard of soft resources either to UL or DL means that these resources are unusable for other purposes. Thus, for example, in a full duplex mode, with a DU configuration of "UL-H," (Uplink "Hard") the corresponding DU configuration "Rx" means the DU may schedule uplink transmissions from child nodes or UEs allowing the DU to receive them as it so schedules, and the MT part of the IAB node is "NULL," indicating that the MT does not transmit and does not have to be able to (or, anthropomorphizing, should not "expect to") receive anything in those resources.

TABLE 9

Supported TDM case

| | TDM Between: | |
|---|---|---|
| Case | Link 1 | Link 2 |
| 1 | $L_{P,DL}$ | $L_{C,DL}$ |
| 2 | $L_{P,UL}$ | $L_{C,UL}$ |
| 3 | $L_{P,DL}$ | $L_{C,UL}$ |
| 4 | $L_{P,UL}$ | $L_{C,DL}$ |
| 5 | $L_{P,DL}$ | $L_{A,DL}$ |
| 6 | $L_{P,UL}$ | $L_{A,UL}$ |
| 7 | $L_{P,DL}$ | $L_{A,UL}$ |
| 8 | $L_{P,UL}$ | $L_{A,DL}$ |
| 9 | $L_{P,DL}$ | $L_{A,DL}$ and $L_{C,DL}$ |
| 10 | $L_{P,UL}$ | $L_{A,UL}$ and $L_{C,UL}$ |
| 11 | $1_{P,DL}$ | $L_{A,UL}$ and $L_{C,UL}$ |
| 12 | $L_{P,UL}$ | $L_{A,DL}$ and $L_{A,DL}$ |
| 13 | $L_{C,DL}$ | $L_{A,DL}$ |
| 14 | $L_{C,UL}$ | $L_{A,UL}$ |
| 15 | $L_{C,DL}$ | $L_{A,UL}$ |
| 16 | $L_{C,UL}$ | $L_{A,DL}$ |

IAB supports TDM, FDM, and SDM between access and backhaul links at an IAB-node, subject to a half-duplex constraint. Mechanisms for efficient TDM/FDM/SDM multiplexing of access/backhaul traffic across multiple hops considering an IAB-node half-duplex constraint are described. For TDM, the supported cases are given in Table 9.

As an example, in case 1, for a given IAB node, link 1 "$L_{P,DL}$" is a backhaul downlink from a parent node to the IAB, and link 2 "$L_{C,DL}$" is a backhaul downlink from the IAB node to a child node. In Table 9, $L_{P,DL}$ is a backhaul link between a parent node and the IAB node, and a parent node transmits downlink signal(s) and/or channel(s) to the IAB node $L_{P,UL}$ is a backhaul link between a parent node and the IAB node, and the IAB node transmits uplink signal(s) and/or channel(s) to the parent node $L_{C,DL}$ is a backhaul link between the IAB node and a child node, and the IAB node transmits downlink signal(s) and/or channel(s) to the child node $L_{C,UL}$ is a backhaul link between the IAB node and a child node, and the child node transmits downlink signal(s) and/or channel(s) to the IAB node $L_{A,DL}$ is an access link between the IAB node and a UE, and the IAB node transmits downlink signal(s) and/or channel(s) to the UE $L_{A,UL}$ is an access link between the TAB node and a UE, and the UE transmits uplink signal(s) and/or channel(s) to the IAB node In case of transmitter-side SDM/FDM, an IAB-node simultaneously transmits in the DL (to an access UE and/or child IAB-node) and transmits in the UL (to a parent IAB-node). In case of receiver-side SDM/FDM, an IAB-node simultaneous receives in the DL (from a parent node) and receives in the UL (from an access UE and/or child IAB-node).

Additionally, an IAB-node can support multiplexing of DL transmissions to access UEs and child IAB-nodes and multiplexing of UL transmissions from access UEs and child IAB-nodes, using existing MU-MIMO or sectorization mechanisms.

FIG. 6A shows a first example resource configuration scheme for IAB radio resources. In the resource configuration scheme of FIG. 6A, a set of resources whose designation includes 6A-DU are to be configured for the IAB node distributed unit (DU) 52, and a set of resources whose designation includes 6A-MT are to be configured for the IAB node mobile termination (MT) unit 50. Thus, the resource configuration scheme of FIG. 6A is characterized by entity factors. In actuality, both MT and DU resources can be described by a grid, with the MT resources are constrained according to the DU configuration, for which reason FIG. 6A depicts in essence a linking of the grids.

Moreover, the resource configuration scheme of FIG. 6A is also characterized by link direction factors. In this regard, of the set of resources 6A-DU which are to be configured for the IAB node distributed unit (DU) 52, a sub-set of resources whose designation includes 6A-DU-UL are to be configured for the uplink for IAB node distributed unit (DU) 52 and a sub-set of resources whose designation includes 6A-DU-DL are to be configured for the downlink for IAB node distributed unit (DU) 52.

Yet further, the resource configuration scheme of FIG. 6A is also characterized by resource dedication factors, e.g., as either "hard" or "soft" or "flexible", for example. In this further regard, sub-sets of the radio resources which are "hard" have designations which include the final suffix "-H", the sub-sets of the radio resources which are "soft" have designations which include the final suffix "-S", and the sub-sets of the radio resources which are "flexible" bear the final suffix "-F". The sets and sub-sets of FIG. 6A and other comparable figures are not intended to be to scale or to depict a certain amount of resources but are provided solely for sake of illustration.

Figure 6B:
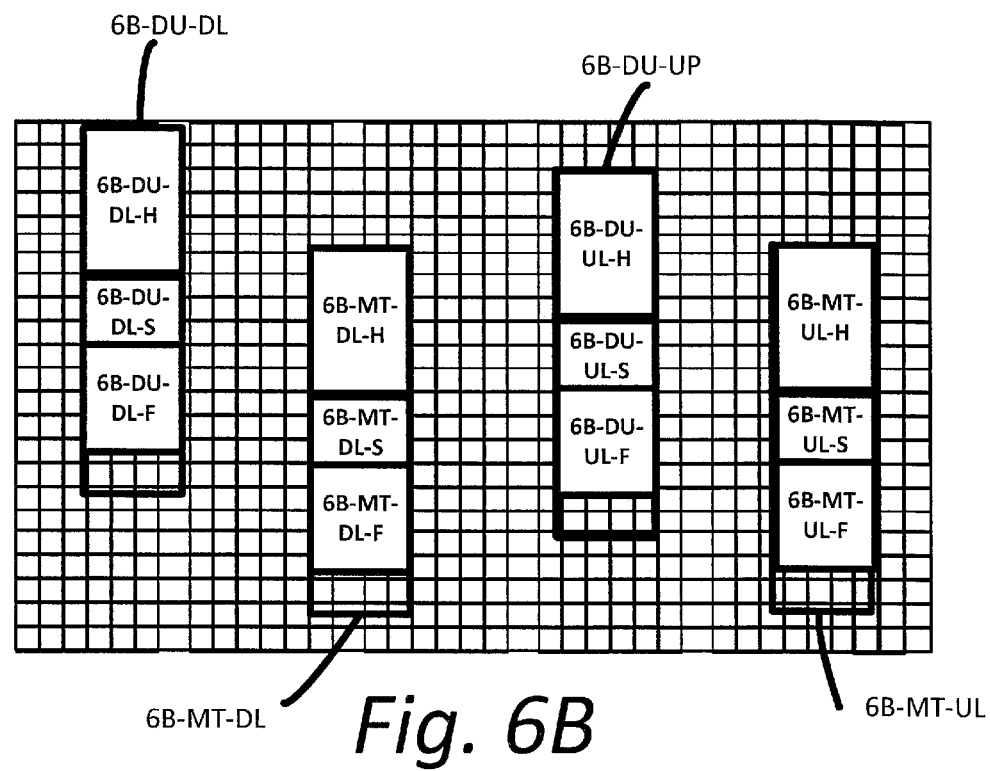
FIG. 6B is a diagrammatic view of differing example grid schemes for IAB resource configuration.

FIG. 6B shows a second example resource configuration scheme for IAB radio resources, with resource designations following a similar convention as FIG. 6A except that the leading prefix of each designator is 6B rather than 6A. The second example resource configuration scheme of FIG. 6B may have a different combination of types of grid factors, and different numbers of radio resources configured for each set or subset. Likewise, as shown in FIG. 7, the resource configuration scheme indicator generator 70 may have several resource configuration schemes from which to choose, such as resource configuration schemes 6A, 6B, 6C, . . . 6J, for example.

Figure 7:
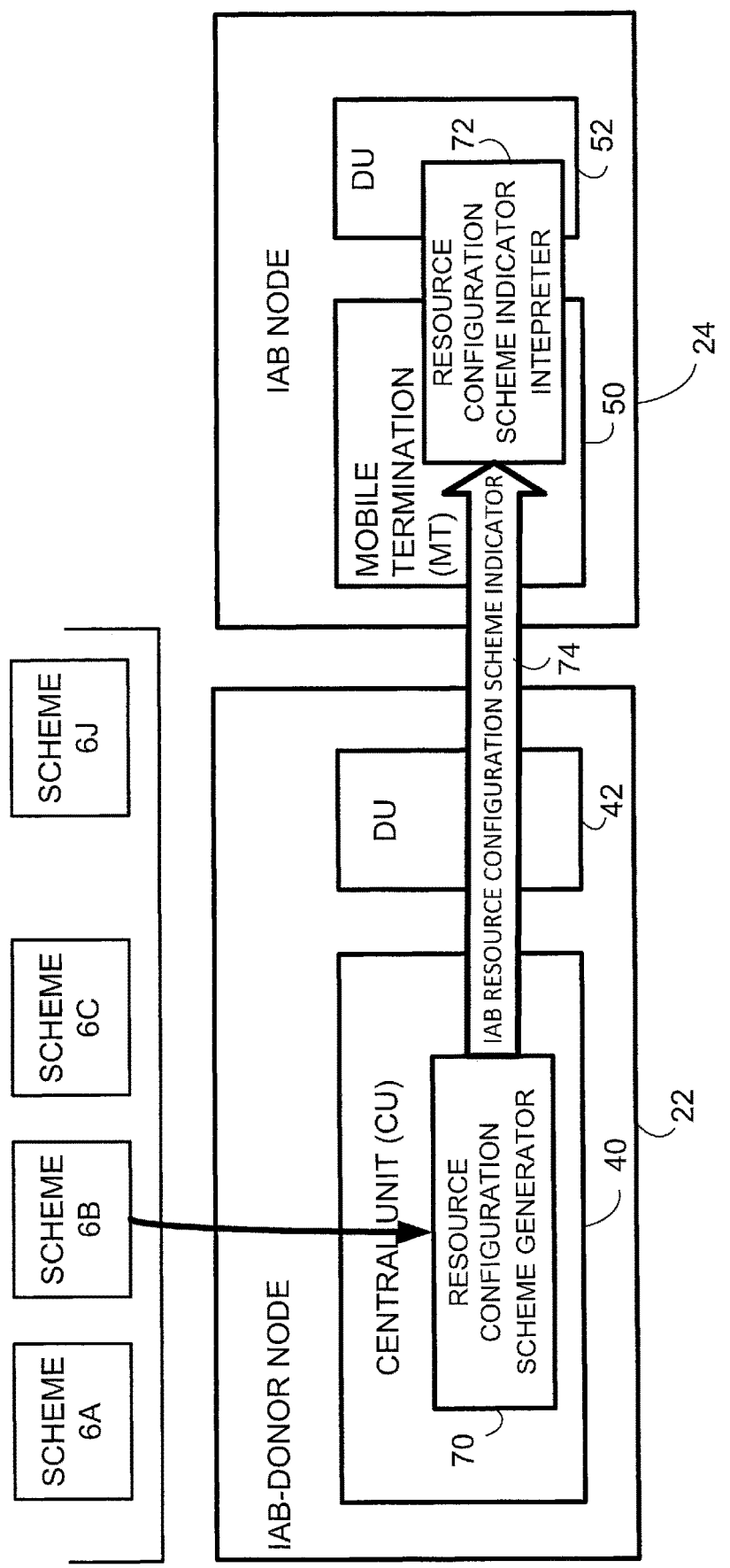
FIG. 7 is a diagrammatic depiction of a resource configuration scheme indicator generator of the resource configuration scheme indicator generator of FIG. 5 which selects and transmits a scheme indicator signal.

FIG. 7 further shows that the resource configuration scheme indicator generator 70 has chosen resource configuration scheme 6B for utilization by IAB node 24, and further depicts that the message or signal 74 bearing a scheme indicator which points to resource configuration scheme 6B is transmitted to the IAB node 24.

FIG. 8 shows example, non-limiting, basic acts or steps that may be performed by a donor IAB node of the example embodiment and mode of FIG. 4. Act 8-1 comprises generating an IAB resource configuration scheme indicator for providing a coded description of how plural IAB radio resources are to be configured at the at least one other IAB node of the network. As used herein, "coded" description means an abbreviated, short-form notation for the set of radio resources encompassed by the selected resource configuration scheme, rather than a detailed cataloging or enumerating of the radio resources that are to be similar configured. The manner of coding may take any appropriate form, such as a mapping or pointer to a predetermined portion of the grid that is commonly understood by both donor IAB node 22 and IAB node 24 to be referenced by the pointer. The configuration of each resource configuration scheme may be pre-configured at each of the donor IAB node 22 and the IAB node 24, or may be configured by network download, e.g., to the IAB node 24. Act 8-2 comprises the donor IAB node 22 transmitting the IAB resource configuration scheme indicator over a radio interface to the at least one other IAB node.

Upon reception of the scheme indicator signal 74, the resource configuration scheme indicator handler 72 processes the scheme indicator signal 74 and ascertains that resource configuration scheme 6B is to be utilized and can configure and use the plural resources encompassed by the resource configuration scheme indicator according to the received indication. Thus, using the coded, short-hand or abbreviated notation comprising the resource configuration scheme indicator, the donor IAB node 22 avoids the need to describe in more detail, e.g., by row and column/resource block designators, each of the plural resources that are to be configured at IAB node 24.

FIG. 9 shows example, non-limiting, basic acts or steps that may be performed by an IAB node of the example embodiment and mode of FIG. 4. Act 9-1 comprises receiving an IAB resource configuration scheme indicator which is configured to provide a coded description of how plural IAB radio resources are to be configured at the IAB node. Act 9-2 comprises configuring the radio resources of the IAB node according to the indication. The resource configuration according to the indication may be performed by node processor(s) 66. The node processor(s) 66 may be configured to interpret the IAB resource configuration scheme indicator in accordance with plural alternative IAB resource configuration schemes configured at the IAB node, as mentioned above. Moreover, the one or more schemes may be characterized by factors including an IAB node entity factor whereby the IAB resource configuration scheme indicator provides an indication of how radio resources are to be configured with respect to a IAB node distributed unit (DU) of the IAB node and how radio resources are to be configured with respect to a IAB node mobile termination (MT) unit of the IAB node. Preferably, the same Resource Configuration Scheme Generator 70 is used for all IAB nodes 24.

In choosing the resource configuration scheme indicator to send to an IAB node 24, the resource configuration scheme indicator generator 70 may base its selection on various factors or constraints. Among such factors or input for the selection of the resource configuration scheme indicator 70 may be one or more of the following: the overall ratio of backhaul to access node traffic, uplink/downlink traffic ratio, site planning considerations (i.e., in order to avoid inter-IAB node interference), etc.

Thus, a resource configuration scheme indicator, also known as an IAB slot format indicator (IAB-SFI), may, e.g., for a given (configured) periodicity, indicate a pattern of DU UL/DL configurations, with the configurations of the IAB node mobile termination (MT) unit 50 following from Table 6 and Table 7. The resource configuration scheme indicator(s) may be particularly applicable to flexible resources. As explained below, the resource configuration scheme indicator may also be useful not only for configuration and/or activation signaling, but also for state transitions or switching in conjunction with other example embodiments and modes described herein.

C.2. IAB Resource Configuration: Mobile Termination (MT) Resource Utilization Override From Table 6 and Table 7 above, understood in light of the nomenclature of Table 8, it is seen that the Mobile-Termination (MT) 50 of an IAB node 24 may be permitted to receive or transmit using a DU resource when a mode of the Distributed Unit (DU) 52 of the IAB node 24 is both "soft" and the DU resource is indicated, either explicitly or implicitly, as not available. For example, with reference to the second row of Table 6, which concerns a soft downlink configuration for the DU, if the DU resource is indicated as unavailable, then the DU does not transmit and does not schedule uplink transmissions from child nodes and UEs using that radio resources. Since the particular DL-S resource is not available to the DU of the IAB node 24, Table 6 gives the Mobile-Termination (MT) 50 of the IAB node 24 an opportunity, when the Mobile-Termination (MT) 50 is configured for downlink, to receive on the downlink using the DL-S resource that otherwise would be configured for the Distributed Unit (DU) 52 [see row 2, second column of Table 6]. Alternatively, when the Mobile-Termination (MT) 50 is configured for uplink, the Mobile-Termination (MT) 50 is given the opportunity to transmit on the downlink using the DU resource that otherwise would be configured for the Distributed Unit (DU) 52 in the soft mode [see row 2, third column of Table 6]. As a further alternative, if the Mobile-Termination (MT) 50 is configured flexibly, the Mobile-Termination (MT) 50 is given the opportunity to transmit or receive on the downlink using the resource that otherwise would be configured for the Distributed Unit (DU) 52 [see row 2, fourth column of Table 6]. Similarly, the Mobile-Termination (MT) 50 is provided with opportunities for receiving and/or transmitting using resources otherwise configured for DU when the DU is configured as UL-S but the DU radio resources are not available, as seen in the fourth row of Table 6. Likewise, Table 7 provides opportunities for the Mobile-Termination (MT) 50 to use certain soft, unavailable-to-the-DU resources as shown in the second and fourth rows thereof. Thus, it is seen from Table 6 and Table 7, for example, that a certain class of radio resources configured for the Distributed Unit (DU) 52 as "soft", but unavailable to the Distributed Unit (DU) 52, are potentially available for use by the Mobile-Termination (MT) 50. Thereby the Mobile-Termination (MT) 50 may advantageously utilize the radio resources of this class, which resources are nominally configured for the Distributed Unit (DU) 52 but, now being unavailable to the DU, would otherwise go unused by the IAB node 24.

Figure 10:
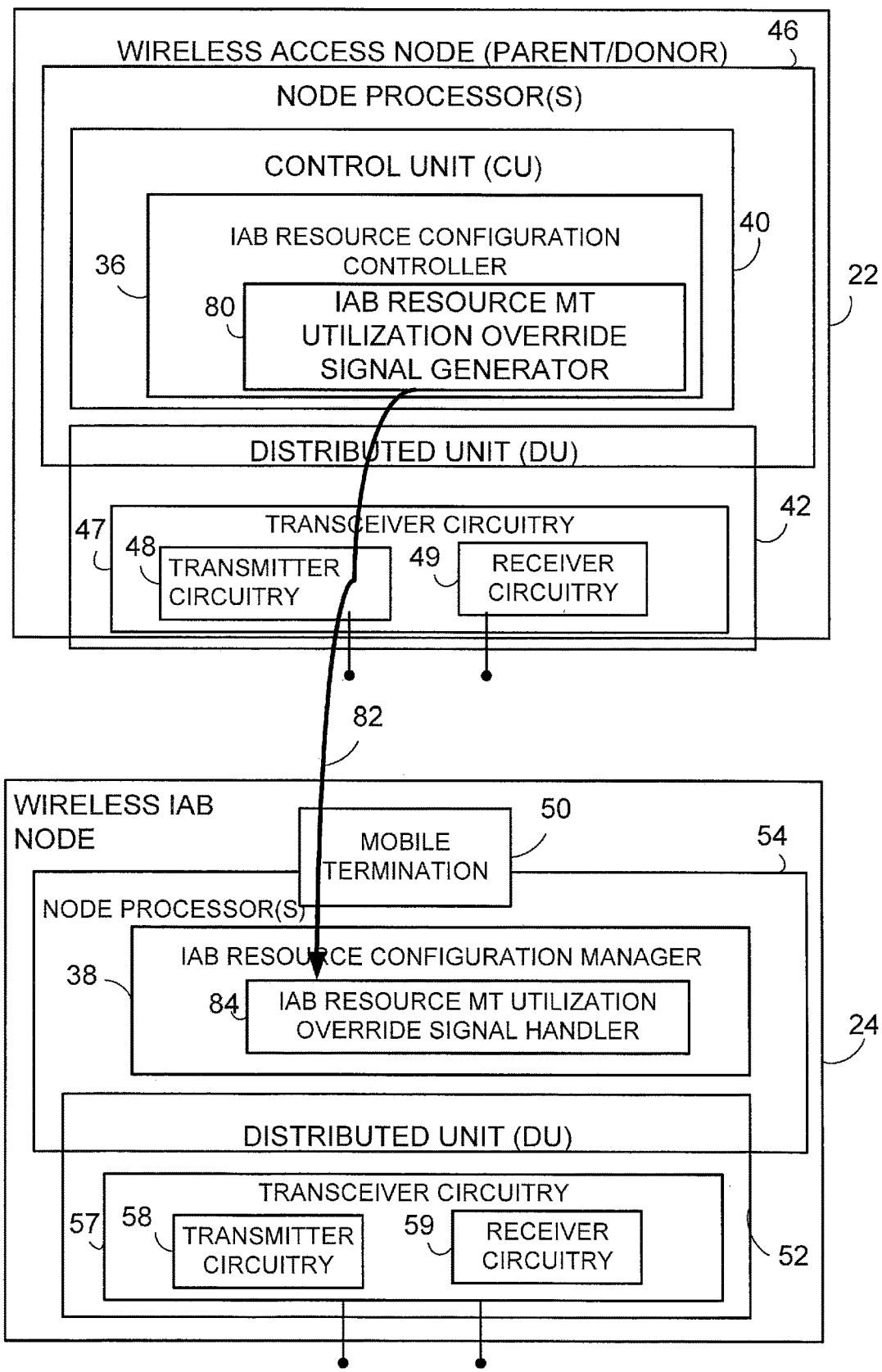
FIG. 10 is a diagrammatic view showing in more detail portions of an example embodiment and mode of a telecommunications system comprising representative donor IAB node which include an IAB resource MT utilization override signal generator and a representative IAB node which includes an IAB resource MT utilization override signal handler.
Figure 11:
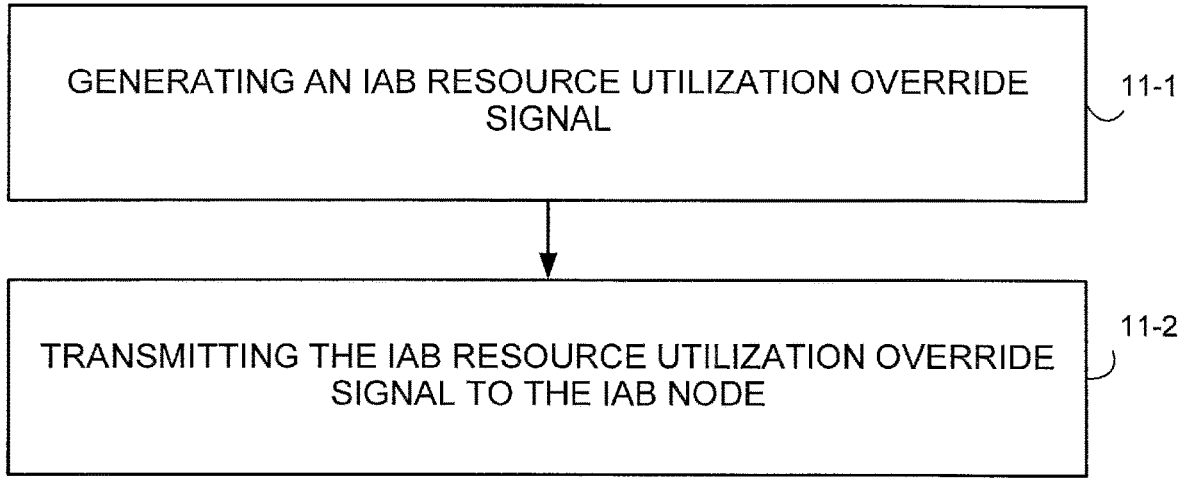
FIG. 11 is a flowchart showing example, non-limiting, basic acts or steps that may be performed by a donor IAB node of the example embodiment and mode of FIG. 10.
Figure 12:
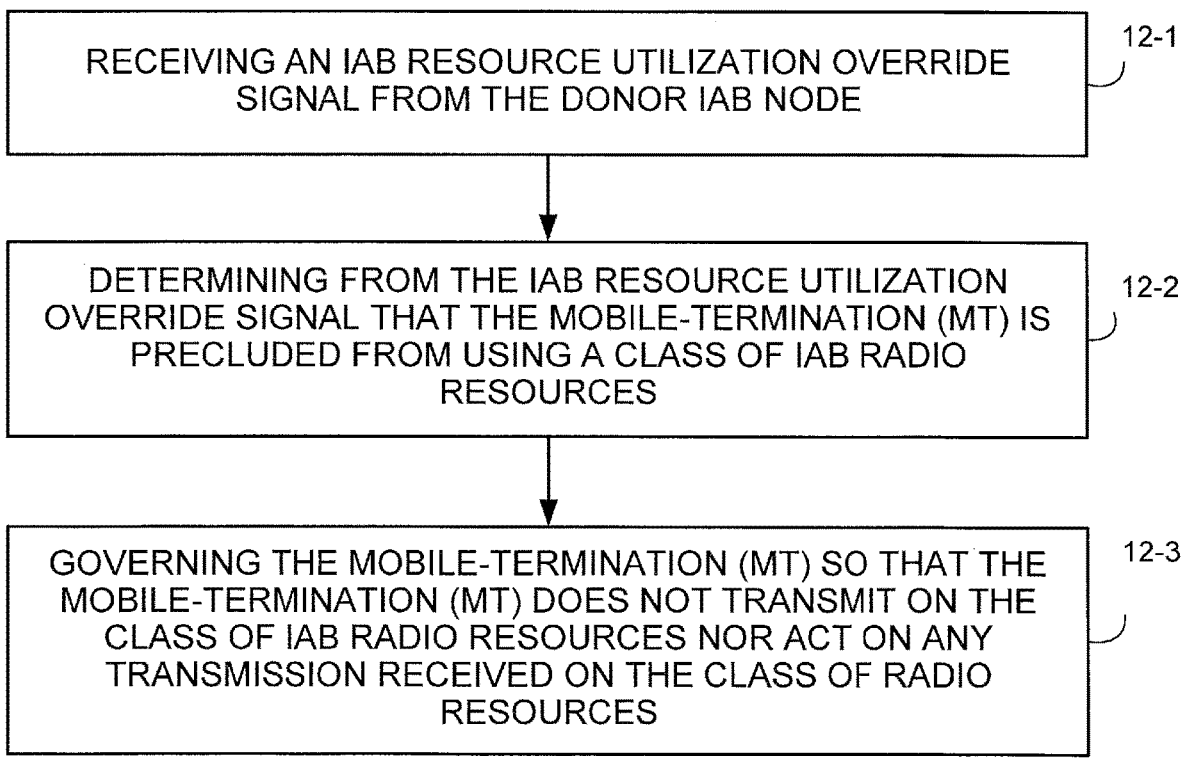
FIG. 12 is a flowchart showing example, non-limiting, basic acts or steps that may be performed by an IAB node of the example embodiment and mode of FIG. 10.

In the example embodiment and mode described herein with reference to FIGS. 10-12, the IAB resource configuration controller 36, although having configured certain radio resources as being potentially available for an IAB node mobile termination (MT) unit 50 when the IAB node distributed unit (DU) 52 is in a "soft configuration", overrides such potential availability. For this purpose FIG. 10 shows the donor IAB node 22, and IAB resource configuration controller 36 in particular, as comprising IAB resource MT utilization override signal generator 80. The IAB resource MT utilization override signal generator 80 generates an IAB resource MT utilization override signal 82 which signals to the Mobile-Termination (MT) 50 that the IAB node mobile termination (MT) unit 50 should not transmit upon certain radio resources or act upon transmissions which the IAB node mobile termination (MT) unit 50 receives over those radio resources, even though those may otherwise be potentially available according to Table 6 or Table 7, for example.

The IAB resource configuration controller 36 may choose to override the availability to the Mobile-Termination (MT) 50 of radio resources associated with a soft mode DU configuration for any of several reasons. For example, the central unit (CU) 40 of the donor IAB node 22 may determine or be notified that interference conditions do or may exist in the network, and for that reason may decide to attempt to reduce transmissions that could cause or exacerbate interference by curtailing the potential activity of, e.g., potential transmissions from, the Mobile-Termination (MT) 50 over the potentially available DU radio resources. Alternatively, the central unit (CU) 40 the central unit (CU) 40 of the donor IAB node 22 may determine or be notified that a certain measurement or series of measurements need to be performed, and reduction of traffic or cessation of at least some further activity from Mobile-Termination (MT) 50 may facilitate the measurement(s). Thus, for these or other reasons the central unit (CU) 40 of donor IAB node 22 may direct the IAB resource MT utilization override signal generator 80 to generate the IAB resource MT utilization override signal 82.

Thus, processor circuitry such as node processor(s) 46 of central unit (CU) 40 may make a determination, or receive an indication of a determination, e.g., from another node or network, of a network condition. In response to the determination or indication, the IAB resource MT utilization override signal generator 80 may generate the IAB resource utilization override signal 82. The IAB resource utilization override signal is configured to preclude a Mobile-Termination (MT) of the IAB node from using a class of IAB radio resources in a situation in which a Distributed Unit (DU) of the IAB node is configured for soft uplink or soft downlink. The class of IAB radio resources is radio resources indicated as unavailable to the Distributed Unit (DU) for a soft configured DU.

In other words, despite the potential availability to the Mobile-Termination (MT) 50 of a certain class radio resources, upon issuance of the IAB resource MT utilization override signal 82 the IAB node 24 of FIG. 10 is precluded from taking advantage of the opportunity to use such radio resources. That class of radio resources comprises radio resources which were configured for use by DU in a soft mode but which are also indicated as unavailable to the DU.

FIG. 11 shows example, non-limiting representative acts performed by the donor IAB node 22 of FIG. 10. Act 11-1 comprises generating an IAB resource utilization override signal. As explained above, the IAB resource utilization override signal is configured to preclude a Mobile-Termination (MT) of the IAB node from using a class of IAB radio resources in a situation in which a Distributed Unit (DU) of the IAB node is configured for soft uplink or soft downlink, the class of IAB radio resources being radio resources indicated as unavailable to the Distributed Unit (DU). Act 11-2 comprises transmitting the IAB resource utilization override signal to the IAB node.

FIG. 10 further shows IAB node processor(s) 54 of the IAB node 24, and in an example embodiment and mode the IAB resource configuration manager 38 in particular, as comprising IAB resource MT utilization override signal handler 84. The IAB resource MT utilization override signal handler 84 is configured to determine from the IAB resource utilization override signal 82 that the Mobile-Termination (MT) is precluded from using a class of IAB radio resources in a situation in which the Distributed Unit (DU) is configured for soft uplink or soft downlink. As mentioned above, that class of IAB radio resources comprises radio resources indicated as unavailable to the Distributed Unit (DU) when configured as soft. In accordance with such interpretation, the IAB resource configuration manager 38 governs the Mobile-Termination (MT) 50 so that the Mobile-Termination (MT) 50 does not transmit on the class of IAB radio resources nor act on any transmission received on the class of radio resources.

FIG. 12 shows example, non-limiting representative acts performed by the IAB node 24 of FIG. 10. Act 12-1 comprises receiving an IAB resource utilization override signal from the donor IAB node. Act 12-2 comprises determining from the IAB resource utilization override signal that the Mobile-Termination (MT) is precluded from using a class of IAB radio resources in a situation in which the Distributed Unit (DU) is configured for soft uplink or soft downlink, the class of IAB radio resources being radio resources indicated as unavailable to the Distributed Unit (DU). Act 12-3 comprises governing the Mobile-Termination (MT) so that the Mobile-Termination (MT) does not transmit on the class of IAB radio resources nor act on any transmission received on the class of radio resources.

Figure 13:
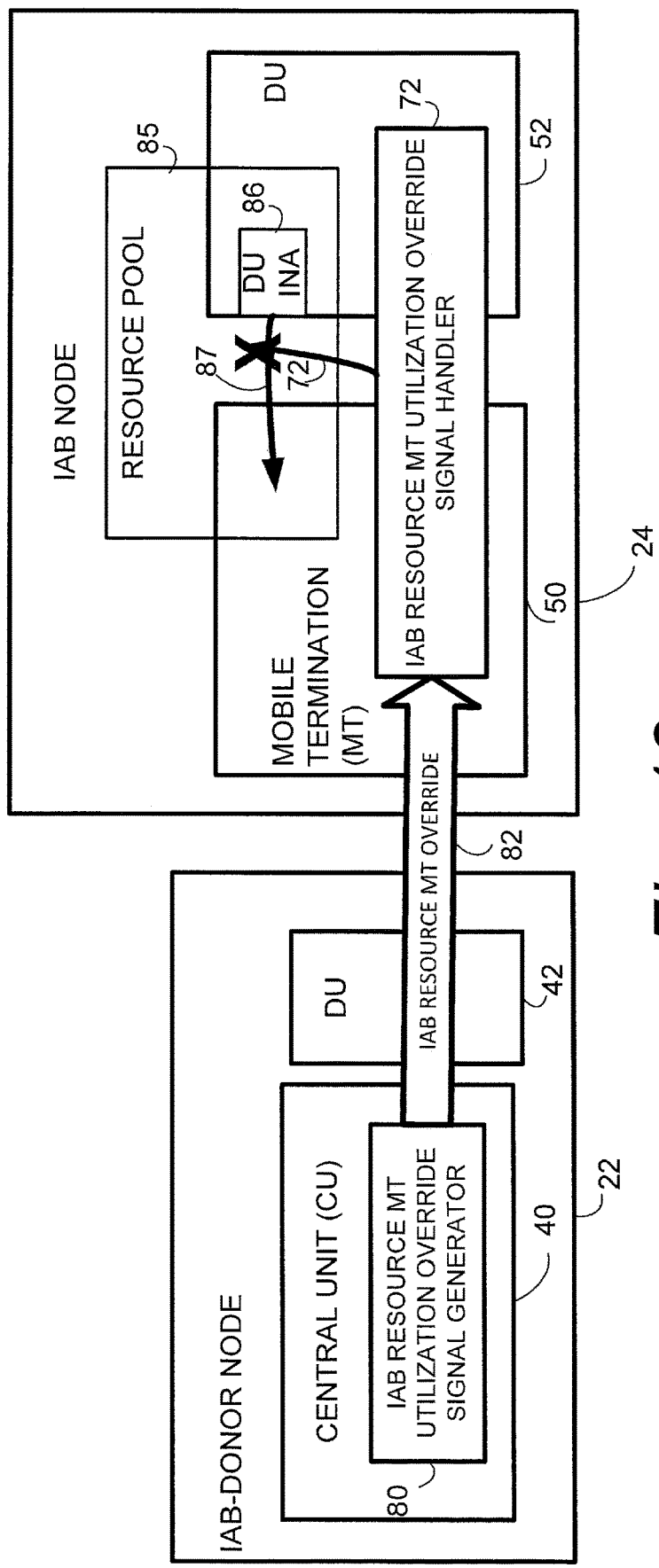
FIG. 13 is a diagrammatic depiction of generation by donor IAB node 22 and use by IAB node 24 of an IAB resource MT utilization override signal.

FIG. 13 depicts generation by donor IAB node 22 and use by IAB node 24 of an IAB resource MT utilization override signal 84. FIG. 13 simply shows that a resource pool 85 is configured for IAB node 24, which portions of the resource pool 85 configured for Distributed Unit (DU) 52 overlapping the Distributed Unit (DU) 52 in FIG. 13 and portions of the resource pool 85 configured for Mobile-Termination (MT) 50 overlapping the Mobile-Termination (MT) 50. The "class" of radio resources which were configured for use by DU in a soft mode but which are also indicated as unavailable to the DU are shown as "class" resource subset 86 in FIG. 13. Arrow 87 in FIG. 13 indicates that ordinarily, according to Table 6 and Table 7, for example, the resources of "class" resource subset 86 could potentially become available for Mobile-Termination (MT) 50. However, arrow 88 indicates that, upon receipt of the IAB resource MT utilization override signal 82, the "class" resource subset 86 now becomes unavailable to Mobile-Termination (MT) 50, illustrated as arrow 87 being crossed out or Xed. Receipt of the IAB resource MT utilization override signal 82 has the result that the Mobile-Termination (MT) does not transmit on the class of IAB radio resources nor act on any transmission received on the class of radio resources.

Thus, the example embodiment and mode of FIG. 10-FIG. 13 introduces and includes a "NA" state for the MT configuration, and appropriate state transitions and "connected" states to IAB nodes on the network. The IAB resource MT utilization override signal 82 described in this example embodiment and mode serves to put the MT, e.g., the Mobile-Termination (MT) 50, in a not available state, with respect to the class of resources depicted as "class" resource subset 86 in FIG. 12. Although the "class" resource subset 86 may be indicated as unavailable to the Distributed Unit (DU) 52, according to the example embodiment and mode of FIG. 10-FIG. 13 such unavailability for the DU should not necessarily result in Tx or Rx configuration for the Mobile-Termination (MT) 50, for which reason the IAB resource MT utilization override signal 82 may be generated. As indicated above, example reasons for the IAB resource MT utilization override signal 82 may be for cross-link interference management, including reduction of cross-link interference as well as having muting patterns across nodes for measurements. Thus, rather than leaving to implementation the existence of an "NA" state for an MT configuration, the example embodiment and mode of FIG. 10-FIG. 13 provides the central unit (CU) 40 with the ability to preclude activity of the Mobile-Termination (MT) 50 using the "class" resource subset 86. The IAB resource MT utilization override signal 82 does not affect any radio resources that are needed for maintaining a connection. Thus, in the NA state for the MT resources, except for those used to maintain connected mode, the corresponding behavior for the MT would be NULL means that the MT does not transmit and does not have to be able to receive any communications. This state would be the default state for resources not associated with receiving an SSB or (at least for a plurality) of RACH resources.

Thus, in an IAB node 24 comprising at least a Distribution Unit (DU) (which behaves in the manner of a gNB to another IAB node) and a Mobile Terminal (MT), (which behaves in the manner of a User Equipment "Mobile Terminal") there exists, for the Mobile Terminal, a series of designatable (by the CU via a DU in connection with the MT) "Not Assignable" time/frequency/space resources which can be so designated by the CU in order to, among other things, minimize cross-link interference and/or provide measurement opportunity.

C.3. IAB Resource Configuration: Hard and Soft Resource Indication

Radio resources and frame structure are discussed in considerable detail above, in a section entitled "B. GENERAL DESCRIPTION OF RADIO RESOURCES". Included in the preceding discussion of radio resources is a sub-section B.5 which concerns an example resource grid. Some aspects of the preceding discussion of radio resources and resource grid are now summarized in preparation for introduction of another example aspect of the technology disclosed herein. The current summary including a frame depiction of FIG. 14 is simplified for sake of brevity and illustration, and is to be construed for consistency with the preceding discussions as referenced.

Figure 14:
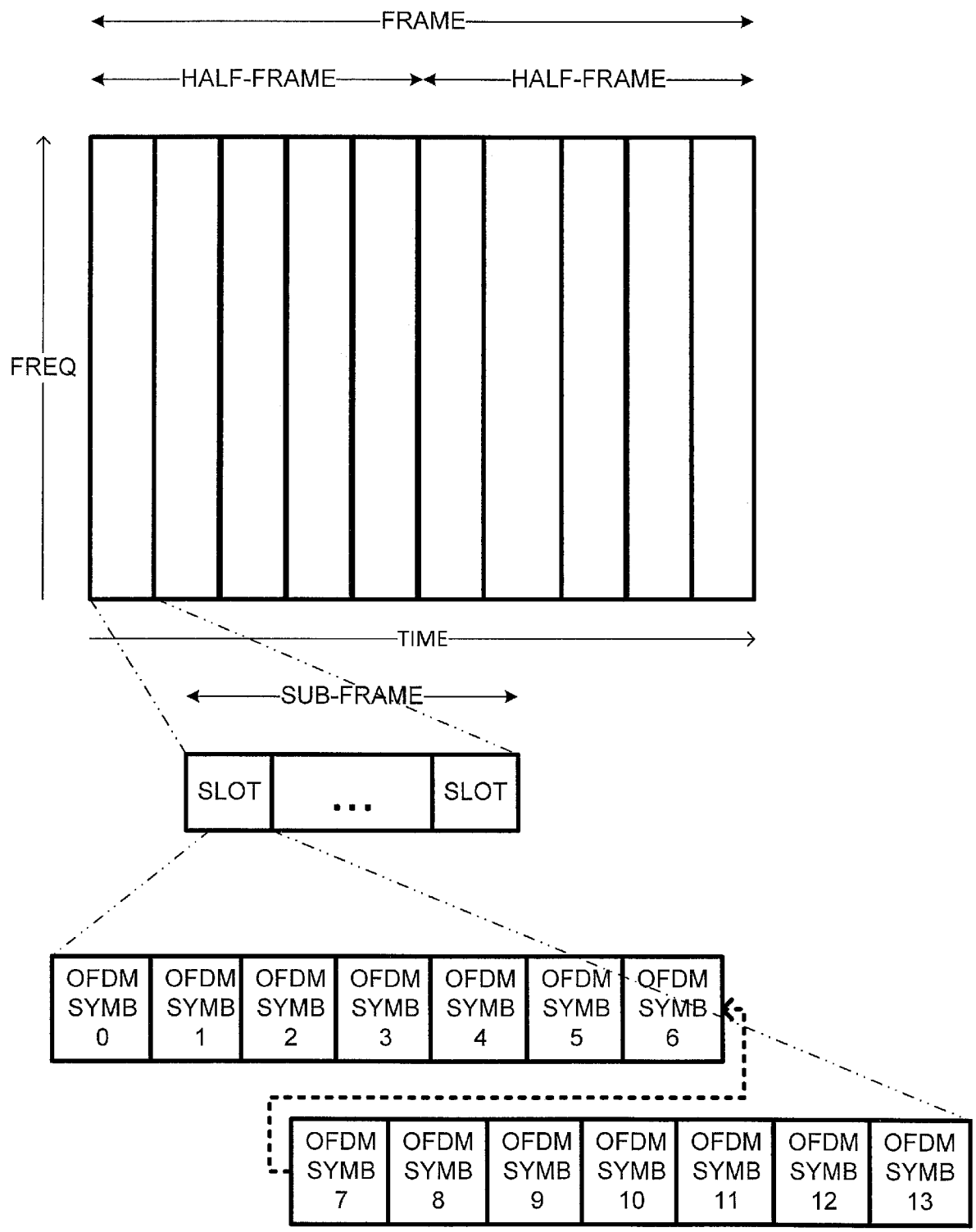
FIG. 14 is a diagrammatic view showing example frame structure which facilitates understanding of the example embodiment and mode of FIG. 15.

FIG. 14 shows an example frame depicted as a two dimensional resource grid, having a time or symbol dimension (along a horizontal axis) and a frequency/carrier dimension (along a vertical axis). The frame of FIG. 14 is divided into two half-frames. In the particular non-limiting example of FIG. 14, each half-frame is shown as comprising six sub-frames. Each sub-frame is shown in turn as comprising plural slots. Further, each slot comprises plural symbols, e.g., for the non-limiting example embodiment shown being fourteen OFDM symbols per slot, e.g., symbols 0-13. It should be understood that the number of sub-frames, slots per sub-frame, and symbols per slot may vary in differing example embodiments and is not critical to the technology disclosed herein.

Figure 15:
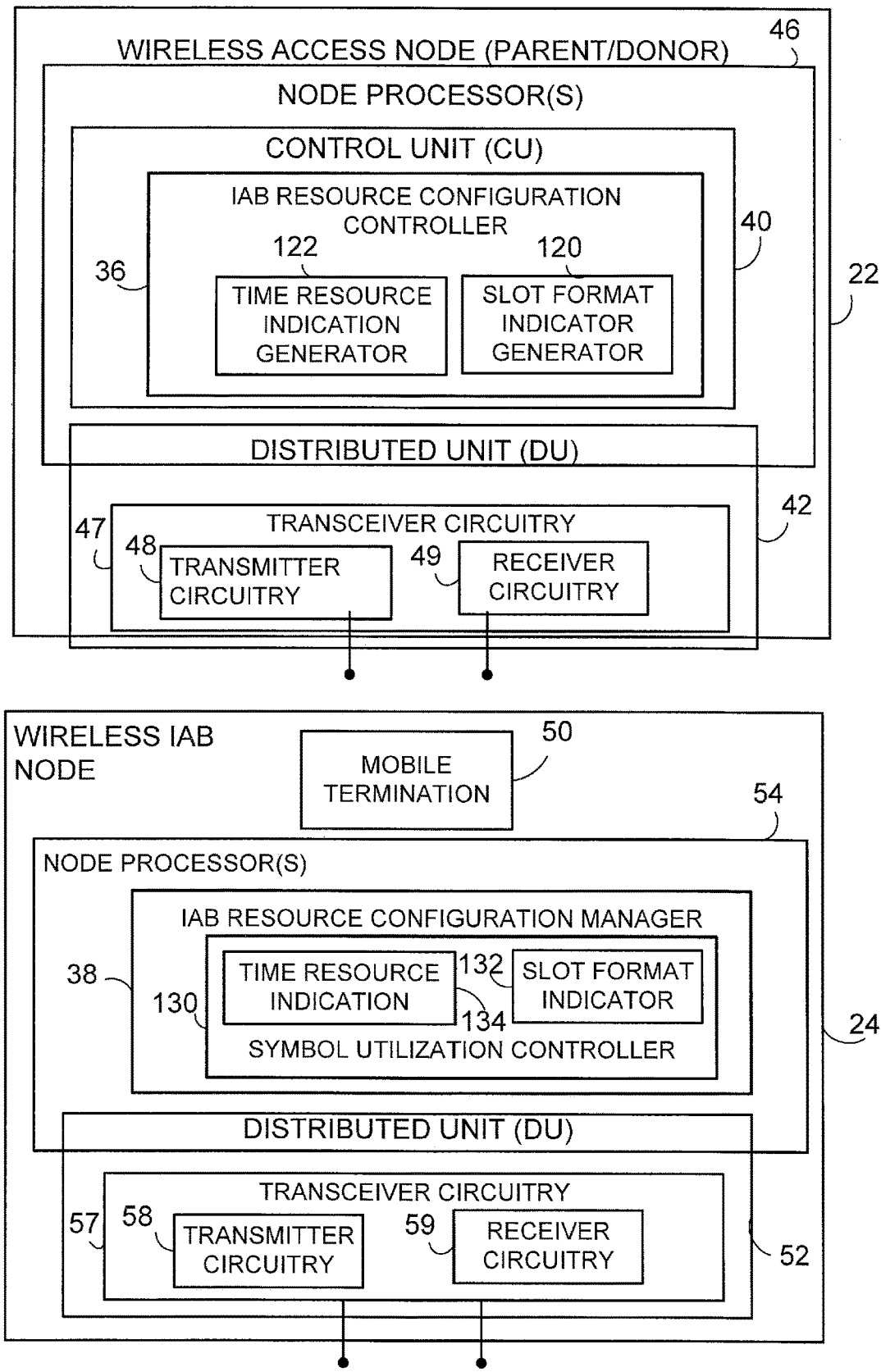
FIG. 15 is a diagrammatic view showing in more detail portions of an example embodiment and mode of a telecommunications system comprising representative donor IAB node which include a time resource indication generator which enables a representative IAB node to determine whether resources for symbols of a slot are hard or soft resources, and thereby facilitate symbol/resource utilization.

In the example embodiment and mode shown in FIG. 15, the IAB resource configuration controller 36 of donor IAB node 22 provides IAB node 24 with time resource indicator information from which the IAB node 24 may determine which of the OFDM symbols of a slot, e.g., which resources of the slot, are "hard" resources and which are "soft" resources. When knowing which resources of a slot are "hard" and which are "soft", the IAB node 24 may determine how the slots/resources may or may not be utilized. For example, if a slot or resource is "hard", the IAB node 24 may allocate a symbol indicated as a hard resource to a child IAB node and/or a user equipment. On the other hand, if a slot or resource is "soft", the IAB node 24 knows that the symbol is allocated by a parent IAB node.

Unless otherwise described herein, the donor IAB node 22 of FIG. 15 and the IAB node 24 of FIG. 15 are essentially similar to those of preceding example embodiments and modes. For brief review, in an example embodiment and mode donor IAB node 22 may comprise central unit (CU) 40 and distributed unit (DU) 42 which may be realized by donor node processor(s) 46. The distributed unit (DU) 42 of donor IAB node 22 may comprise transceiver circuitry 47, which in turn may comprise transmitter circuitry 48 and receiver circuitry 49, as previously described. IAB-node 24, which may also be known as wireless relay node 24, in an example embodiment and mode may comprise IAB node mobile termination (MT) unit 50 and IAB node distributed unit (DU) 52. The IAB node mobile termination (MT) unit 50 and IAB node distributed unit (DU) 52 may be realized by IAB node processor(s) 54. The IAB node distributed unit (DU) 52 may comprise IAB node transceiver circuitry 57, which in turn may comprise IAB node transmitter circuitry 58 and IAB node receiver circuitry 59. Child node 30, shown by way of example as user equipment (UE) 30, may comprise, in an example, non-limiting embodiment and mode, transceiver circuitry 60, which in turn may comprise transmitter circuitry 62 and receiver circuitry 64. FIG. 15 further shows child node 30, which (as indicated before) may be a user equipment or Integrated Access and Backhaul (IAB) node, as also comprising node processor circuitry, e.g., one or more node processor(s) 66, and interfaces 68, including one or more user interfaces. The child node 30 may include frame/message generator/handler 69 which serves to handle messages, signals, and data received from other nodes.

FIG. 15 shows portions of a telecommunications system 20 and particular portions of IAB resource configuration controller 36 of donor IAB node 22 which serve to generate information, known herein as time resource indicator, TRI, which the IAB node 24 may use to ascertain whether a resource of a slot is a hard resource or a soft resource, and thereby determine how the resource has been or may be allocated. In particular, FIG. 15 shows IAB resource configuration controller 36 as comprising both slot format indicator generator 120 and time resource indication generator 122. FIG. 15 also shows that the IAB resource configuration manager 38 of IAB node 24 comprises symbol utilization controller 130, which uses both a received slot format indicator, SFI, 132 and a received time resource indicator, TRI, 134, to control utilization of symbols/resources in a slot. As used herein, "controlling utilization" of a symbol/resource includes allocating or not allocating the respective symbol/resource.

The nature and operation of slot format indicator generator 120 and time resource indication generator 122 of donor IAB node 22, and symbol utilization controller 130 of IAB node 24, are described below after presentation of further explanatory material.

The concept of slot format indicator, SFI, as generated by slot format indicator generator 120, is known. Further, it is understood that resources for a backhaul link and an access link can be multiplexed in a TDM manner. Table 10 depicts a slot format defined in NR. In Table 10, a value in the "format" column corresponds to the slot format indicator, SFI, generated by slot format indicator generator 120 of donor IAB node 22. In Table 10, a letter in each symbol number of a row, e.g., of a format, indicates whether the slot is downlink, "D", uplink, "U", or flexible, "F".

TABLE 10

Slot formats for normal cyclic prefix

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | U | D | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |

TABLE 10-continued

Slot formats for normal cyclic prefix

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 50 | D | D | F | F | U | U | U | D | D | F | F | U | U | U |
| 51 | D | F | F | U | U | U | U | D | F | F | U | U | U | U |
| 52 | D | F | F | F | F | U | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

For unpaired spectrum operation for a UE on a serving cell, the UE is provided by subcarrierSpacing a reference SCS configuration $\mu_{SFI}$ for each slot format in a combination of slot formats indicated by a SFI-index field value in DCI format 2_0. The UE expects that for a reference SCS configuration $\mu_{SFI}$ and for an active DL BWP or an active UL BWP with SCS configuration $\mu$, it is $\mu \geq \mu_{SFI}$. Each slot format in the combination of slot formats indicated by the SFI-index field value in DCI format 2_0 is applicable to $2^{(\mu-\mu_{SFI})}$ consecutive slots in the active DL BWP or the active UL BWP where the first slot starts at a same time as a first slot for the reference SCS configuration $\mu_{SFI}$ and each downlink or flexible or uplink symbol for the reference SCS configuration $\mu_{SFI}$ corresponds to $2^{(\mu-\mu_{SFI})}$ consecutive downlink or flexible or uplink symbols for the SCS configuration $\mu$.

For paired spectrum operation for a UE on a serving cell, the SFI-index field in DCI format 2_0 indicates a combination of slot formats that includes a combination of slot formats for a reference DL BWP and a combination of slot formats for a reference UL BWP of the serving cell. The UE is provided by subcarrierSpacing a reference SCS configuration $\mu_{SFI,DL}$ for the combination of slot formats indicated by the SFI-index field value in DCI format 2_0 for the reference DL BWP of the serving cell. The UE is provided by subcarrierSpacing2 a reference SCS configuration $\mu_{SFI,UL}$ for the combination of slot formats indicated by the SFI-index field value in DCI format 2_0 for the reference UL BWP of the serving cell. If $\mu_{SFI,DL} \geq \mu_{SFI,UL}$ and for each $2^{(\mu_{SFI,UL}-\mu_{SFI,DL})}+1$ values provided by a value of slotFormats, where the value of slotFormats is determined by a value of slotFormatCombinationId in slotFormatCombination and the value of slotFormatCombinationId is set by the value of the SFI-index field value in DCI format 2_0, the first $2^{(\mu_{SFI,UL}-\mu_{SFI,DL})}$ values or the combination of slot formats are applicable to the reference DL BWP and the next value is applicable to the reference UL BWP. If $\mu_{SIF,DL} < \mu_{SFI,UL}$ and for each $2^{(\mu_{SFI,UL}-\mu_{SFI,DL})}+1$ values provided by slotFormats, the first value for the combination of slot formats is applicable to the reference DL BWP and the next $2^{(\mu_{SFI,UL}-\mu_{SFI,DL})}$ values are applicable to the reference UL BWP.

In the example embodiment and mode of FIG. 15, the donor IAB node 22 comprises transmitter circuitry 48 which transmits information concerning a resource allocation of OFDM symbols within one or more slots. The donor IAB node 22 further comprises donor node processor(s) 46, and in particular IAB resource configuration controller 36, which includes in the transmitted information both (1) a slot format indicator, SFI, generated by slot format indicator generator 120 and (2) time resource indicator, TRI, generated by time resource indication generator 122. The slot format indicator, SFI, and time resource indicator, TRI, may be, but do not have to be, transmitted in a same message or signal. The slot format indicator, SFI, indicates, for each OFDM symbol of the slot, whether the symbol is an uplink symbol, a downlink symbol, or a flexible symbol. The time resource indicator, TRI, indicates, e.g., for each OFDM symbol of the slot, whether the symbol is a hard resource or a soft resource, e.g., whether the resource/symbol may be allocated by a parent node (in the case of a soft resource) or by the IAB node (in the case of a hard resource).

Figure 16:
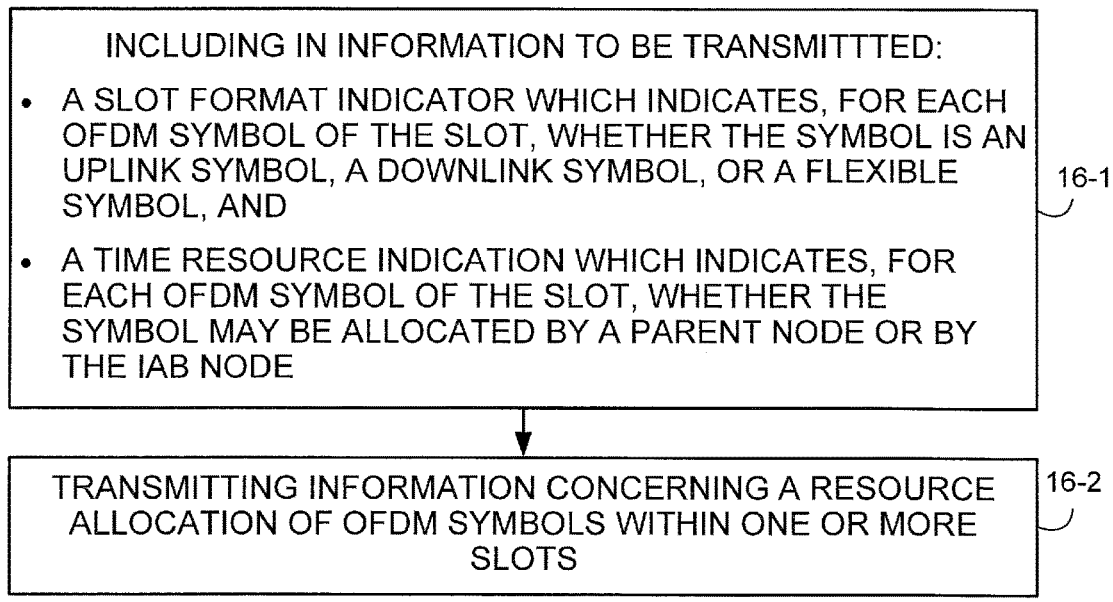
FIG. 16 is a flowchart showing example, non-limiting, basic acts or steps that may be performed by a donor IAB node of the example embodiment and mode of FIG. 15.

FIG. 16 shows basic, representative acts or steps performed by the donor IAB node 22 of FIG. 15 in an example embodiment and mode. Act 16-1 comprises including, in information to be transmitted, both the slot format indicator, SFI, generated by slot format indicator generator 120 and the time resource indicator, TRI, generated by time resource indication generator 122. Act 16-2 comprises transmitting the information concerning a resource allocation of OFDM symbols within one or more slots, the transmitted information including the information mentioned in act 16-1.

Figure 17:
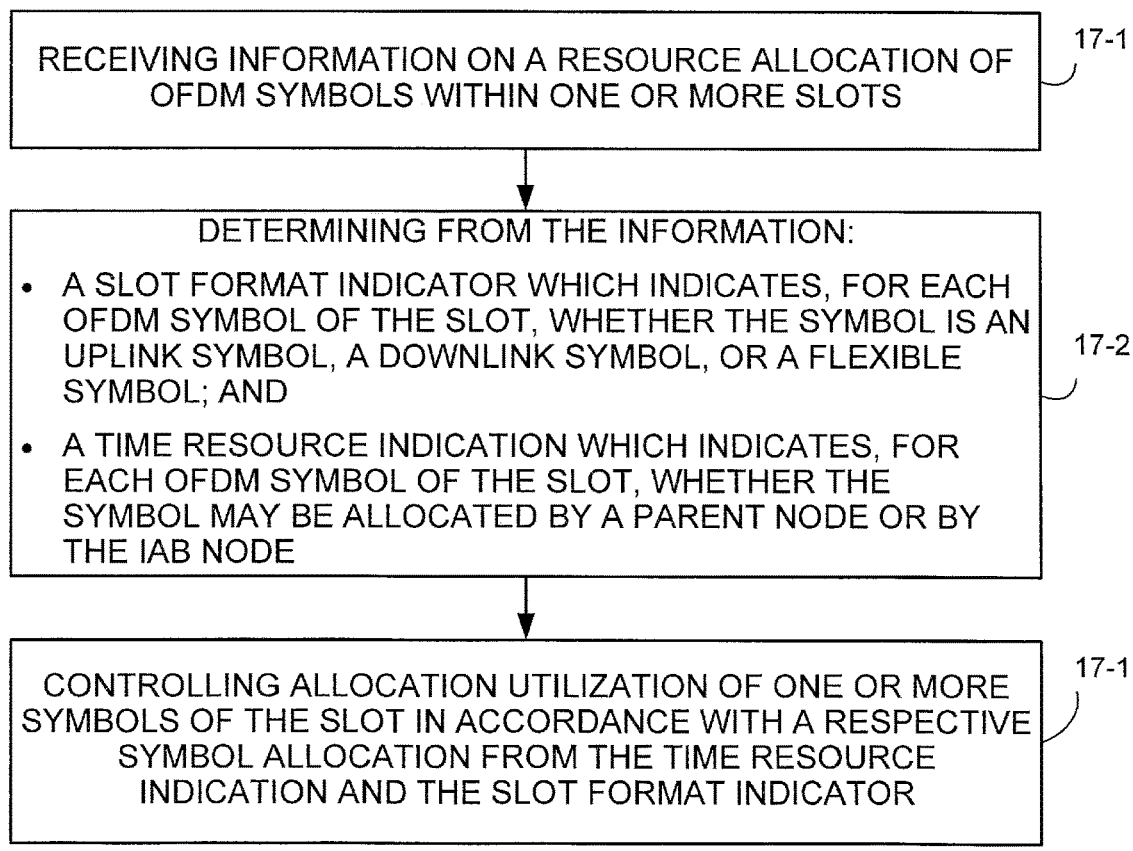
FIG. 17 is a flowchart showing example, non-limiting, basic acts or steps that may be performed by an IAB node of the example embodiment and mode of FIG. 15.

In the example embodiment and mode of FIG. 15, the IAB node 24 comprises receiver circuitry in IAB node mobile termination (MT) unit 50 and IAB node processor(s) 54. FIG. 17 shows basic, representative acts or steps performed by the IAB node 24 of FIG. 15. Act 17-1 comprises the IAB node 24, e.g., IAB node mobile termination (MT) unit 50, receive information on a resource allocation of OFDM symbols within one or more slots. Act 17-2 comprises the IAB node processor(s) 54, and particularly symbol utilization controller 130, determining from the information received as act 17-1 both the slot format indicator, SFI, and the time resource indicator, TRI. Act 17-3 comprises the IAB node processor(s) 54, e.g., symbol utilization controller 130, controlling utilization, e.g., allocation, of one or more symbols of the slot at least in part in accordance with a respective symbol allocation from the time resource indication and the slot format indicator.

The example embodiment and mode of FIG. 15 and the acts of FIG. 16 and FIG. 17 are now described in more detail and in particular context. For example, for a given IAB node 24 with half-duplex constraint, a parent node such as donor IAB node 22 may indicate the time resource constraint to the MT 50 of the IAB node 24. The parent node may indicate the slot format indicator, SFI, by a higher layer (e.g. a system information block or a dedicated RRC signaling) or by DCI format 2_0. The slot format indicator, SFI, may be generated by slot format indicator generator 120 and may have one of the values and meaning shown in Table 10. In addition to generating and/or transmitting the slot format indicator, SFI, the donor IAB node 22 generates the time resource indicator, TRI. That is, to indicate or determine whether each slot is a soft resource or a hard resource for the DU of the IAB node, a parent node may transmit information, e.g., bitmap, on a time domain resource(s) such as the time resource indicator, TRI.

FIG. 18 shows an example slot format indicator, SFI, and time resource indicator, TRI, for an example slot. For each symbol position of the slot, e.g., OFDM symbol 0 through OFDM symbol 13, FIG. 18 shows a respective value in both an example illustrative slot format indicator, SFI, and a respective value of an example illustrative time resource indicator, TRI. The example slot format indicator, SFI, shown in FIG. 18 happens to have the content SFI=32 of Table 10. The time resource indicator, TRI, for this particular, non-limiting example, has content string 10010010010010, wherein "1" indicates a "soft" resource and "0" indicates a "hard" resource. Alternately, "0" may indicate a "soft" resource" and "1" may indicate "hard" resource. As explained below, there are differing implications and consequences of resource utilization for a resource being considered as "soft" or "hard" for the IAB node 24.

As mentioned above, symbol utilization controller 130 controls utilization, e.g., allocation, of one or more symbols of the slot at least in part in accordance with a respective symbol allocation from the time resource indication and the slot format indicator. The phase "at least in part" means that symbol utilization controller 130 uses at least the time resource indicator, TRI, to control symbol/resource utilization, and may use other factors such as slot format indicator, SFI, and/or other information or factors as well. The person skilled in the art understands how slot format indicator, SFI, and other factors may influence a decision of and actual resource utilization through, e.g., various 3GPP standardization teachings. Examples are provided below how the symbol utilization controller 130 uses the time resource indicator, TRI, to control symbol/resource utilization. As employed herein, "utilization" includes allocation or non-allocation by the IAB node 24 of a resource.

For the example of FIG. 18, when the slot format indicator from the parent node is "DDDDDDDDDDFFUU" for each OFDM symbol in a given slot and the time resource indication is "10010010010010" for each OFDM symbol in the slot, the resource for OFDM symbol indicated slot format corresponding to bit "1" of the time resource indication may be allocated by the parent node. As such, the IAB node may regard a "1" bit as corresponding to a "soft resource".

On the other hand, the resource for OFDM symbol indicated by the slot format indicator corresponding to bit "0" of the time resource indication is considered by the IAB node 24 to be a "hard" resource may be allocated by the IAB node 24. The IAB node may allocate a "hard" resource to another child IAB node and/or a UE. However, the IAB node 24 may not monitor PDCCH on the OFDM symbols corresponding to bit "0" of the time resource indicator, TRI, e.g., may not monitor PDCCH on the hard resources.

Figure 19A:
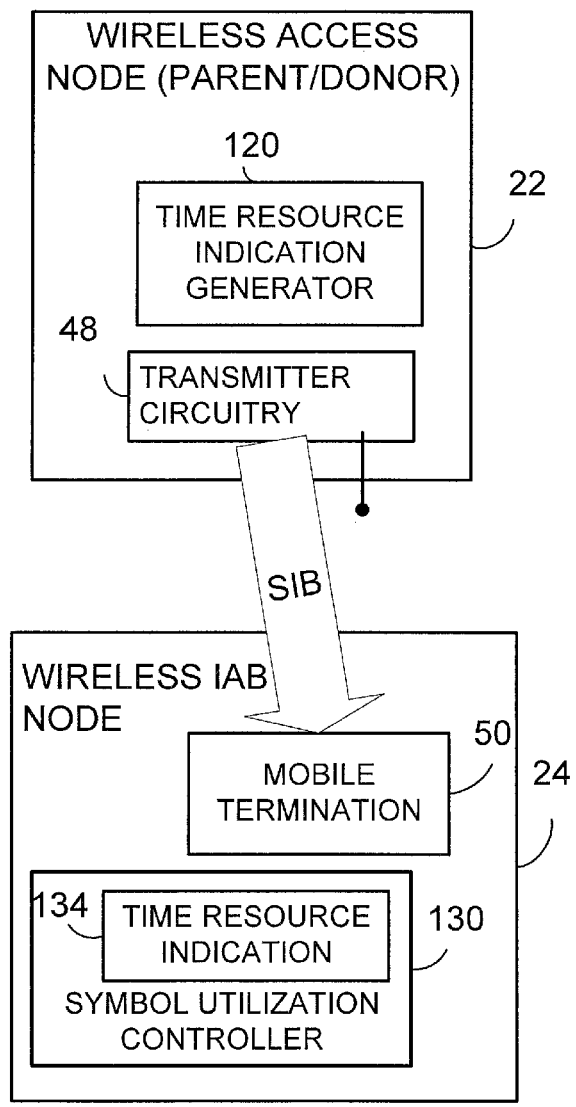
FIG. 19A is a diagrammatic view showing transmission of time resource indicator, TRI, as system information and as dedicated signaling, respectively.
Figure 19B:
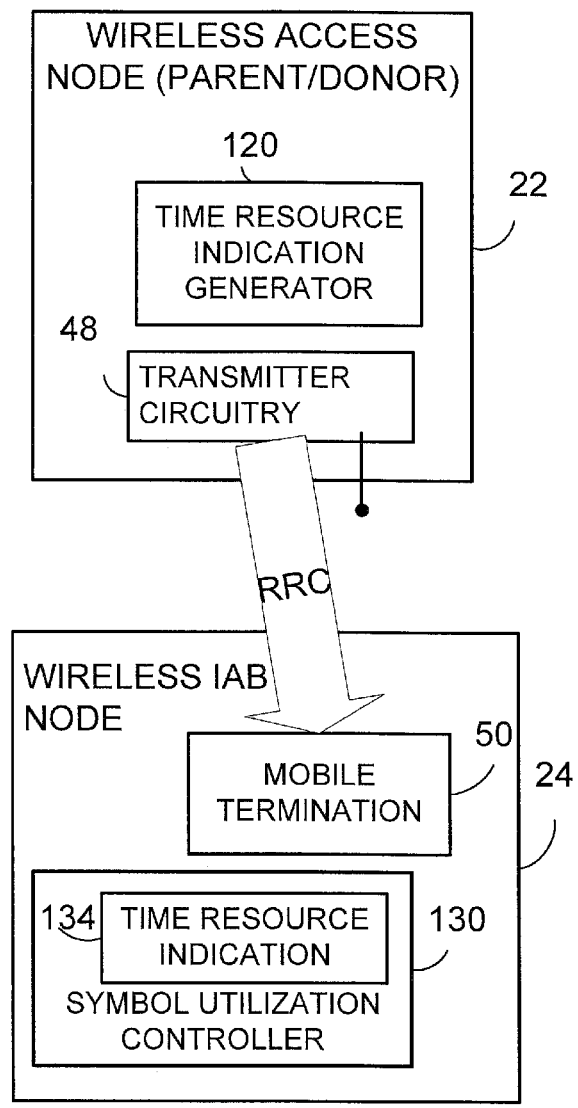
FIG. 19B is a diagrammatic view showing transmission of time resource indicator, TRI, as system information and as dedicated signaling, respectively.

The time resource indicator, TRI, may be transmitted by donor IAB node 22, or any parent node, to IAB node 24 in any of several alternative ways. For example, FIG. 19A shows the time resource indicator, TRI, being transmitted by donor IAB node 22 to IAB node 24 in system information, e.g., in a system information block (SIB) such as SIB1, for example. FIG. 19B shows the time resource indicator, TRI, being transmitted by donor IAB node 22 to IAB node 24 in dedicated signaling, e.g., radio resource control, RRC, signaling. Thus, as can be seen from FIG. 19A and FIG. 19B, the time resource indication may be configured or indicated by the SIB1 or the dedicated RRC signaling. Additionally or alternately, DCI format, e.g. DCI format 2_0, DCI format 1_0 or DCI format 1_1, may be used to indicate the time resource indication. As another example, a MT of IAB node 24 may monitor a new common search space, CSS, and/or a new UE specific search space, USS, which is herein referred to as a IAB-specific search space and is described in more detail below, after presentation of explanatory information.

In general, a set of PDCCH candidates for a UE to monitor is defined in terms of PDCCH search space sets. A search space set can be a common search space, CSS, set or a UE-specific search space, USS, set. In prior art technology, a UE may monitor PDCCH candidates in one or more of the following search spaces sets.

A Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG (Master Cell Group).

A Type0-PDCCH CSS set configured by searchSpaceOtherSystemInformation in PDCCH-ConfigCommon for a DCI format with CRC scrambled by a SI-RNTI on the primary cell of the MCG.

A Type1-PDCCH CSS set configured by ra-SearchSpace in PDCCH-ConfigCommon for a DCI format with CRC scrambled by a RA-RNTI or a TC-RNTI on the primary cell.

A Type2-PDCCH CSS set configured by paging-SearchSpace in PDCCH-ConfigCommon for a DCI format with CRC scrambled by a P-RNTI on the primary cell of the MCG.

A Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s).

A USS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

In monitoring a search space for the PDCCH, the searcher essentially tries to determine CCE index(ices) corresponding to the PDCCH candidate, given by the expression of "L" described herein. That is, for a search space set s associated with CORESET p, the CCE indexes for aggregation level L corresponding to PDCCH candidate $m_{s,n_{CI}}$ of the search space set in slot for an active DL BWP of a serving cell corresponding to carrier indicator field value $n_{CI}$ are given by $$L\left\{\left(Y_{p,n_{s,f}^\mu} + \left\lfloor \frac{m_{s,n_{CI}} \cdot N_{CCE,p}}{L \cdot M_{s,max}^{(L)}} \right\rfloor + n_{CI}\right) \bmod \left\lfloor \frac{N_{CCE,p}}{L} \right\rfloor\right\} + i \ (i = 0, \ldots, L-1),$$

where for any CSS, $Y_{p,n_{s,f}^\mu}=0$ and for a USS, $Y_{p,n_{s,f}^\mu}=(A_p \cdot Y_{p,n_{s,f}^\mu-1}) \bmod D$, $Y_{p,-1}=n_{RNTI}\neq 0$, $A_p=39827$ for p mod 3=0, $A_p=39829$ for p mod 3=1, $A_p=39839$ for p mod 3=2, and D=65537. $N_{CCE,p}$ is the number of CCEs, numbered from 0 to $N_{CCE,p}-1$ in CORESET p and $n_{CI}$ is the carrier indicator field value if the UE is configured with a carrier indicator field by CrossCarrierSchedulingConfig for the serving cell on which PDCCH is monitored; otherwise, including for any CSS, $n_{CI}=0$. For any CSS, $M_{s,max}^{(L)}=M_{s,0}^{(L)}$ and for a USS $M_{s,max}^{(L)}$ is the maximum of $M_{s,n_{CI}}^{(L)}$ over all configured values for a CCE aggregation level L of search space set. The RNTI value used for $n_{RNTI}$ is the C-RNTI.

Figure 20:
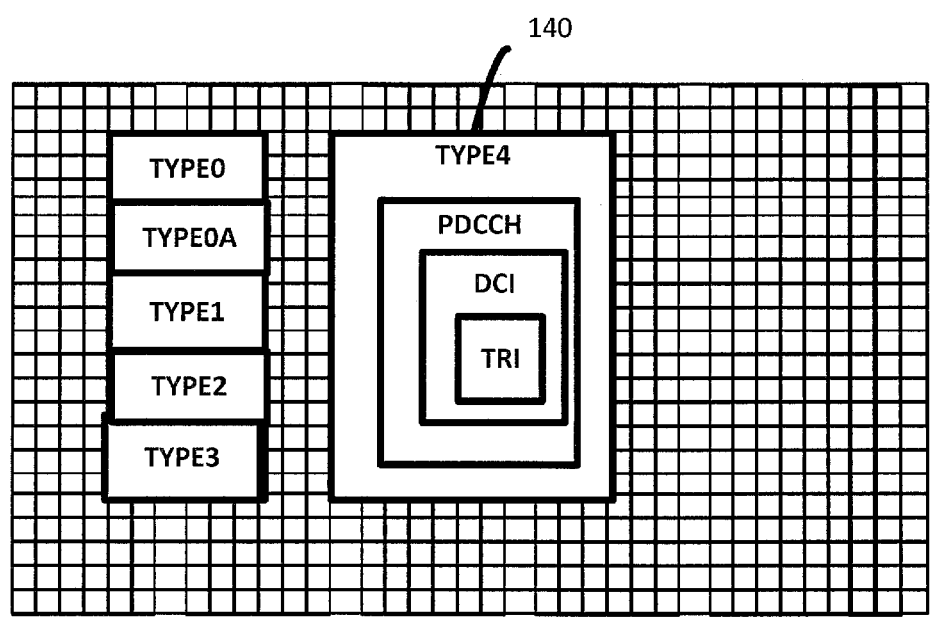
FIG. 20 is a diagrammatic view inclusion of time resource indicator, TRI, in a DCI of a PDCCH of an IAB-specific search space.

FIG. 20 shows, by way of simplified example, various prior art search spaces such as Type0, Type0A, Type1, Type2 and Type3 described above. FIG. 20 is understood to be simplified in that, for example, the amount of resources of the grid utilized by the search spaces are enlarged for sake of visibility, and need not be proximate one another, or in the positions shown, nor necessarily all included in a given grid/frame.

The technology disclosed herein advantageously provides a new search space for a MT of an IAB node, e.g., a new common search space (e.g. A Type4-PDCCH CSS), which is also known herein as the IAB-specific search space and shown as Type4 140 in FIG. 20. Type-4 PDCCH CSS may be configured by, e.g., dependent on, a set of parameters comprising: search space ID, CORESET ID, monitoring slot, the number of consecutive slots for monitoring search space, the number of PDCCH candidates (or aggregation level) and monitoring periodicity. In this case, searchSpace-Type may set to "common".

The set of parameters utilized for the Type4 IAB-specific search space, i.e., Search space ID, CORESET ID, monitoring slot, the number of consecutive slots for monitoring search space, the number of PDCCH candidates (or aggregation level) and monitoring periodicity, is an entirely different set of parameters than utilized by prior art search spaces, e.g., by Type0-PDCCH, Type0A-PDCCH CSS, Type1-PDCCH CSS, Type2-PDCCH CSS and Type3-PDCCH CSS. Some of the parameters utilized for the prior art search spaces may be utilized by the new Type4 IAB-specific search space, but the set of parameters for the new Type4 IAB-specific search space is not identical to any prior art search space set of parameters.

The CCE index(es) for the new Type4 IAB-specific search space may be found or determined using the methodology for determining "L" as described above.

FIG. 20 further shows that within the new Type4 IAB-specific search space the IAB node 24 finds the physical downlink control channel, which in turn comprises or includes a Downlink Control Indicator (DCI), which in turn may include the time resource indicator, TRI. Thus, including the time resource indicator, TRI, in a PDCCH located in a new IAB-specific search space is another way for the IAB node 24 to obtain the time resource indicator, TRI. In addition, the slot format indicator, SFI, may be similarly indicated.

Information sent to the IAB node that conveys one or more of the slot format indicator, SFI, and the time resource indicator, TRI, e.g., information that may be utilized to locate the Integrated Access and Backhaul (IAB)-associated search space, may be at least partially encoded with an identifier of the IAB node to which the information is directed. For example, check bits or CRC of the transmitted information may be enclosed with an identifier of the IAB node, such as an IAB-specific identifier which may be known as an IAB-RNTI, e.g., an IAB radio network temporary identifier.

An IAB node such as IAB node 24 may operate essentially concurrently or simultaneously in two modes. For example, the IAB node 24 may receive both the Type4 IAB-specific search space information, which may be encoded with the IAB-RNTI, and prior art search space information, which may be encoded differently, as with a SFI-RNTI. A DCI format of the Type4-PDCCH may include the slot format indicator and/or the time resource indication, but a prior art type search space does not include the time resource indicator, TRI. When a new RNTI, e.g. IAB-RNTI, is configured to an IAB node (or a MT in the IAB node), the IAB node may monitor Type4-PDCCH CSS by using the IAB-RNTI and monitor Type3-PDCCH CSS by using the SFI-RNTI. DCI format. A DU of the IAB node may transmit PDCCH with DCI format 2_0 by using SFI-RNTI to a child node or a UE. The SFI-RNTI is a RNTI configured to a UE who camps on the IAB node. A MT of the IAB node may be configured with a SFI-RNTI to receive the slot format indicator from a parent node.

As an example of the dual mode usage, an IAB node may transmit PDCCH using Type 4 PDCCH to another IAB node and transmit PDCCH using Type 3 PDCCH search space using Type 3 PDCCH (SFI indication).

Time resource indication is included in the DCI format only when a MT or a UE monitors PDCCH with Type4-PDCCH. The IAB node may have two separate SFI-RNTIs for a DU and a MT. The SFI-RNTI for the DU may be used to receive the slot format indicator from a parent node and the SFI-RNTI for the DU may be used to receive the slot format indicator from a parent node and the SFI-RNTI may be used to indicate the slot format to another IAB node (e.g. a child node or a UE) For a USS case, one or more MT specific search space(s) may also be defined and a MT may monitor the DCI format by the new RNTI (e.g. IAB-RNTI). IAB-group common search space and/or IAB specific search space may also be defined. IAB-RNTI may be used for blind decoding for PDCCH reception and/or DCI decoding.

As one of its aspects, the technology disclosed herein encompasses an IAB node 24 which determines when to monitor an Integrated Access and Backhaul (IAB)-associated search space. In one example implementation, the IAB node 24 may make the determination to monitor when an explicit notification that the IAB-specific search space exists is received from the donor IAB node 22. Such explicit notification may comprise, for example, an addressing of information to the IAB node 24 using an encoding of an identifier of the IAB node 24. In an alternative or additional implementation, the IAB node 24 may make the determination to monitor for the IAB-specific search space upon reception of a particular set of parameters that are collectively associated with the IAB-specific search space. That is, upon realizing that a IAB-specific search space indicative set of parameters have been received, the IAB node 24 realizes that the IAB node 24 may operate in a mode which utilizes the time resource indicator, TRI.

D. Muting Indication to Avoid Cross Link Interference

Figure 21A:
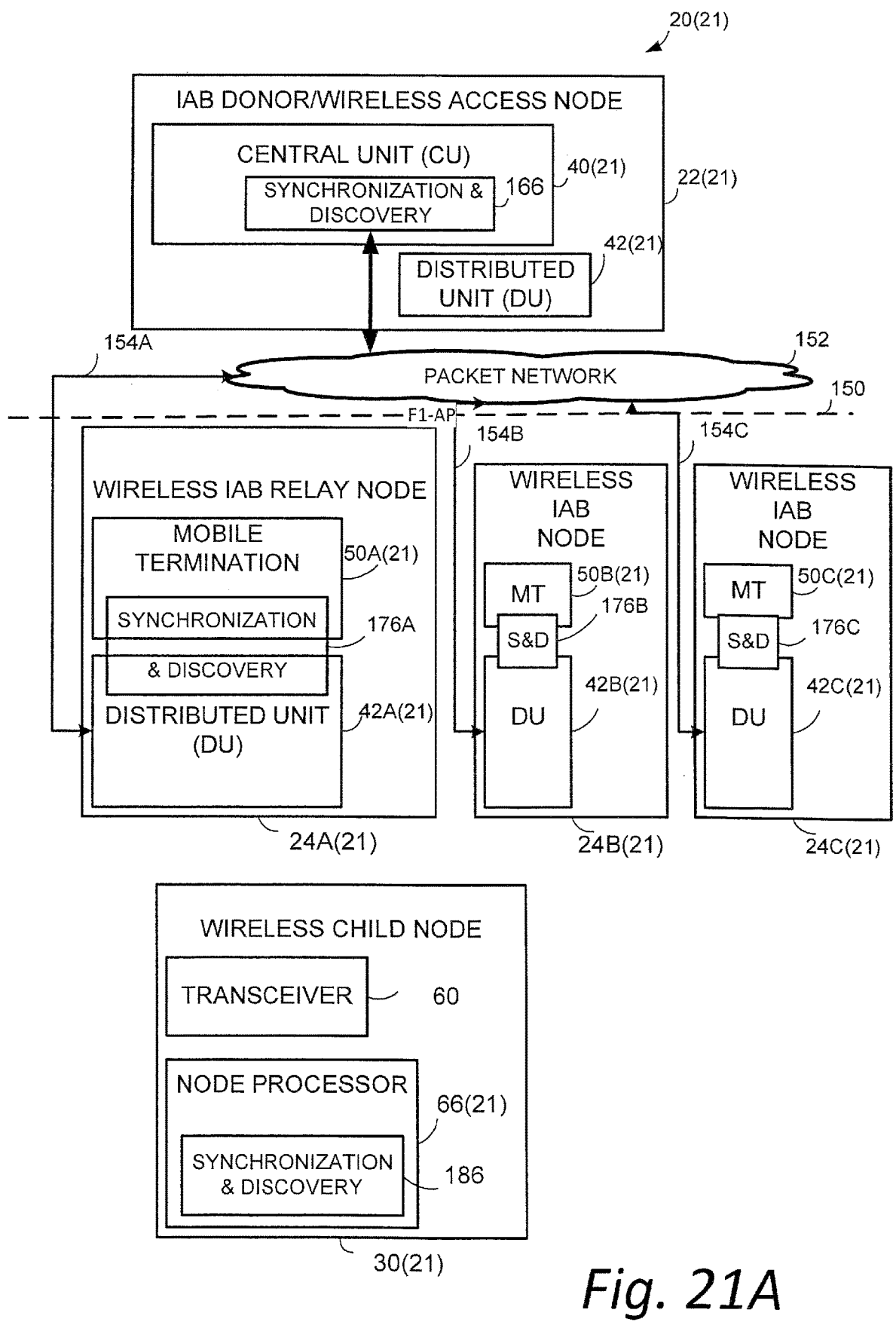
FIG. 21A is a diagrammatic view showing an example communications system with Integrated Access and Backhaul (IAB), including an access node which hosts a control unit (CU) which communicates over an F1-AP interface with distributed units (DUs) of plural IAB nodes, and wherein, for sake of a discovery process, one or more of the nodes may mute certain synchronization signals.
Figure 21B:
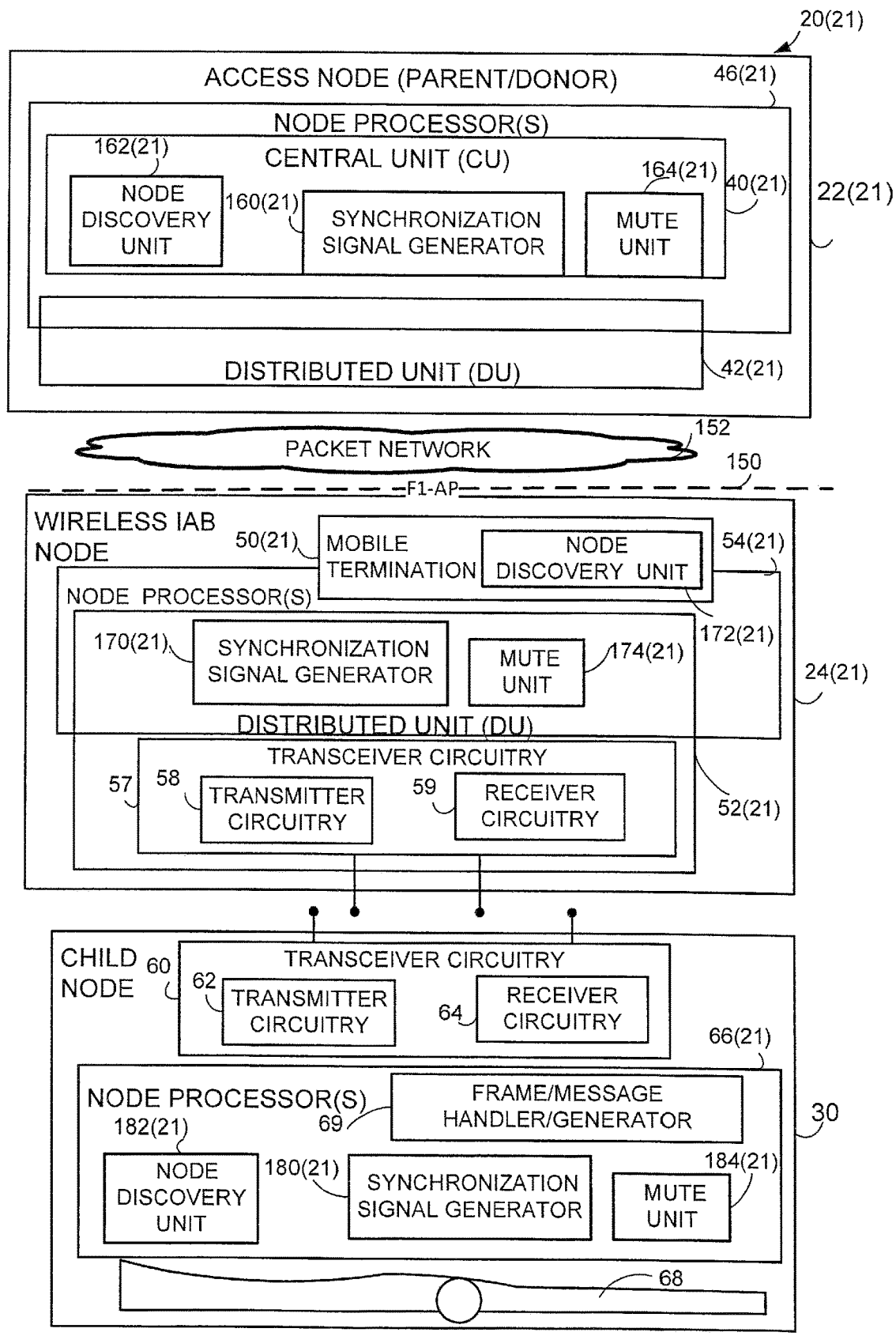
FIG. 21B is a diagrammatic view showing an example communications system with Integrated Access and Backhaul (IAB), including an access node which hosts a control unit (CU) which communicates over an F1-AP interface with distributed units (DUs) of plural IAB nodes, and wherein, for sake of a discovery process, one or more of the nodes may mute certain synchronization signals.

FIG. 21A and FIG. 21B show an example communications system 20(21) with Integrated Access and Backhaul (IAB), including an IAB donor or access node 22(21) which hosts a central unit (CU) 40(21). In the example embodiment and mode of FIG. 21A and FIG. 21B, central unit (CU) 40(21) communicates over an F1-AP interface with distributed units (DUs) of plural IAB nodes 24(21), e.g., IAB node 24A(21), IAB node 24B(21), and IAB node 24C(21). For sake of simplified, example representation FIG. 21A shows three IAB nodes; a greater or lesser number of IAB Nodes may be involved and or connected to central unit (CU) 40(21). Example structural details of example implementations of nodes of FIG. 21A are further described below with reference to FIG. 21B.

In FIG. 21A and FIG. 21B the F1-AP interface is represented by broken line 150, so that the F1-AP interface is herein also referred to as F1-AP interface 150. Over F1-AP interface 150 the distributed units of the respective IAB nodes 24(21) communicate through wired links with the central unit (CU) 40(21), via packet network 152. For example, distributed unit 42A(21) of IAB node 24A(21) communicates over wired link 154A and packet network 152 to central unit (CU) 40(21); IAB node 24B(21) communicates over wired link 154B and packet network 152 to central unit (CU) 40(21); and IAB node 24C(21) communicates over wired link 154C and packet network 152 to central unit (CU) 40(21).

Each IAB node IAB node 24(21) may discover other IAB nodes by receiving synchronization signal (SS)/primary broadcast channel (PBCH) blocks, SS/PBCH blocks. A SS/PBCH block may also be referred to as "SS Block (SSB)", which is understood to refer to Synchronization/PBCH block because a synchronization signal and PBCH channel are packed as a single block that always moves together. The SS/BPCH blocks are received within a configured synchronization signal (SS)/primary broadcast channel (PBCH) Block Measurement time Configurations (SMTCs) to discover other IAB node(s). An SMTC comprises plural synchronization signal (SS)/primary broadcast channel (PBCH) Block Transmission Configurations (STCs). For each IAB node, one or more STCs (SS/PBCH block transmission configuration) may be provided.

Figure 23:
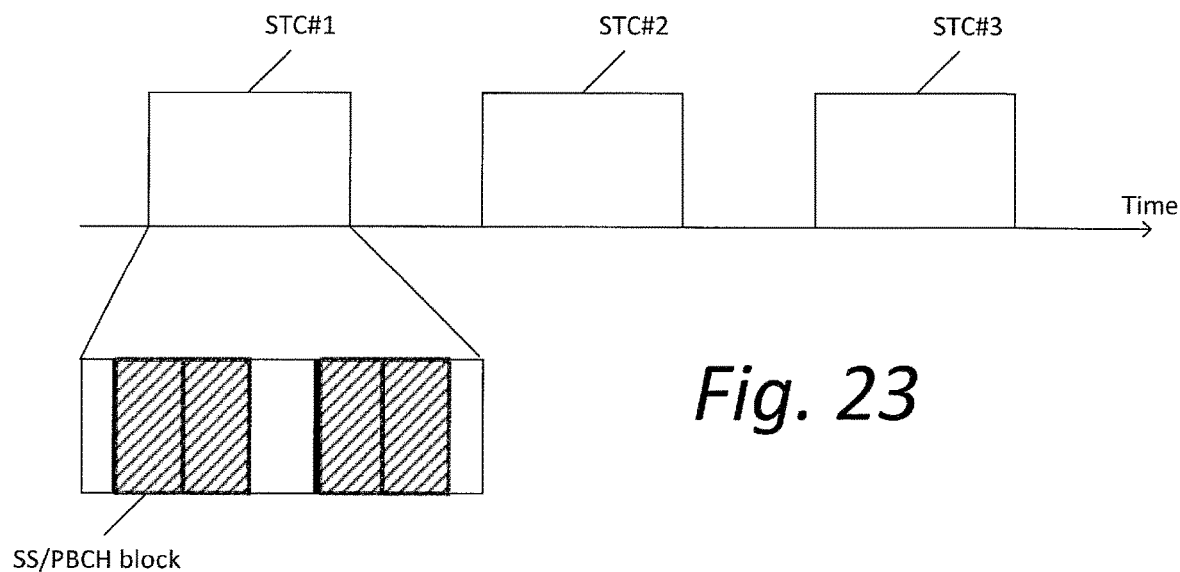
FIG. 23 is a diagrammatic view showing plural synchronization signal (SS)/primary broadcast channel (PBCH) Block Transmission Configurations (STCs), each STC comprising plural synchronization signal (SS)/primary broadcast channel (PBCH) blocks, SS/PBCH blocks.

FIG. 23 illustrates one example of a STC configuration for an IAB node. In the example of FIG. 23, three STCs, e.g., STC#1, STC#2, and STC#s are configured and each STC includes one or more SS/PBCH blocks. A STC configuration may be configured by the number of STCs and its periodicity. Each STC may be defined within a half-frame, i.e. 0.5 ms. In the particular non-limiting example of FIG. 23, each STC may include four SS/PBCH blocks.

When multiple IAB nodes are deployed, each IAB node may transmit SS/PBCH block(s) in configured STC(s). In doing so, however, cross-link interference may occur between IAB nodes. The technology disclosed herein provides apparatus and method for avoiding cross-link interference between IAB nodes by muting one or more of the STC(s). By muting STC(s), each IAB node or each UE can discover each IAB node and measure SS/PBCH block(s) from each IAB node.

FIG. 21B shows in more detail a generic example embodiment and mode of arrangement and composition of certain functionalities and components of access node 22(21), an example, representative IAB node 24(21); and an example, representative user equipment (UE) 30(21). It should be understood that each of the nodes of FIG. 21B may comprise additional components and functionalities known to the person skilled in the art, and that primarily those pertinent to the technology disclosed herein are illustrated for sake of simplicity.

As understood from the foregoing, FIG. 21B shows that donor IAB node 22(21) comprises central unit (CU) 40(21) and distributed unit (DU) 42(21). The central unit (CU) 40(21) and distributed unit (DU) 42(21) may be realized by, e.g., be comprised of or include, one or more processor circuits, e.g., donor node processor(s) 46(21). The one or more node processor(s) 46(21) may be shared by central unit (CU) 40(21) and distributed unit (DU) 42(21), or each of central unit (CU) 40 and distributed unit (DU) 42(21) may comprise one or more node processor(s) 46(21). Moreover, central unit (CU) 40(21) and distributed unit (DU) 42(21) may be co-located at a same node site, or alternatively one or more distributed units may be located at sites remote from central unit (CU) 40(21) and connected thereto by a packet network such as packet network 152. The distributed unit (DU) 42(21) of donor IAB node 22(21) may comprise transceiver circuitry.

As also shown in FIG. 21B the IAB-nodes 24(21) in an example embodiment and mode comprises the IAB node mobile termination (MT) unit 50(21) and IAB node distributed unit (DU) 52(21). The IAB node mobile termination (MT) unit 50(21) and IAB node distributed unit (DU) 52(21) may be realized by, e.g., by comprised of or include, one or more processor circuits, e.g., IAB node processor(s) 54(21). The one or more IAB node processor(s) 54(21) may be shared by IAB node mobile termination (MT) unit 50(21) and IAB node distributed unit (DU) 52(21), or each of IAB node mobile termination (MT) unit 50(21) and IAB node distributed unit (DU) 52(21) may comprise one or more IAB node processor(s) 54(21). The IAB node distributed unit (DU) 52(21) may comprise IAB node transceiver circuitry 57, which in turn may comprise IAB node transmitter circuitry 58 and IAB node receiver circuitry 59. The IAB node transceiver circuitry 57 includes antenna(e) for the wireless transmission. IAB node transmitter circuitry 58 may include, e.g., amplifier(s), modulation circuitry and other conventional transmission equipment. IAB node receiver circuitry 59 may comprise, e.g., amplifiers, demodulation circuitry, and other conventional receiver equipment.

FIG. 21B shows child node 30(21), shown by way of example as user equipment (UE) 30(21), as comprising, in an example, non-limiting embodiment and mode, transceiver circuitry 60. The transceiver circuitry 60 in turn may comprise transmitter circuitry 62 and receiver circuitry 64. The transceiver circuitry 60 includes antenna(e) for the wireless transmission. Transmitter circuitry 62 may include, e.g., amplifier(s), modulation circuitry and other conventional transmission equipment. Receiver circuitry 64 may comprise, e.g., amplifiers, demodulation circuitry, and other conventional receiver equipment. FIG. 21B further shows child node 30(21), which (as indicated before) may be a user equipment or Integrated Access and Backhaul (IAB) node, as also comprising node processor circuitry, e.g., one or more node processor(s) 66(21), and interfaces 68, including one or more user interfaces. Such user interfaces may serve for both user input and output operations, and may comprise (for example) a screen such as a touch screen that can both display information to the user and receive information entered by the user. The user interface 68 may also include other types of devices, such as a speaker, a microphone, or a haptic feedback device, for example.

In an example, non-limiting embodiment and mode shown in FIG. 21B, the child node 30(21) may include frame/message generator/handler 69. As is understood by those skilled in the art, in some telecommunications system messages, signals, and/or data are communicated over a radio or air interface using one or more "resources", e.g., "radio resource(s)". The frame/message generator/handler 69 serves to handle messages, signals, and data received from other nodes.

As mentioned above, the example embodiments and modes of FIG. 21A, FIG. 22-FIG. 21B-FIG. 26 avoid cross-link interference and/or collision of SSBs between IAB nodes by muting one or more of the STC(s), and thereby facilitating discovery by each IAB node or each UE of other IAB node(s) and measuring SS/PBCH block(s) from each IAB node. For this purpose, each of the nodes of FIG. 21B are shown as comprising a synchronization signal generator/processor, a STC muting unit, and an IAB node discovery unit at a MT side; which are collectively illustrated in FIG. 21A as a synchronization and discovery processor (S&D). In particular, FIG. 21B shows the access node processor 46(21) of access node 22(21) as comprising synchronization signal generator/processor 160(21), IAB node discovery unit 162(21), and STC muting unit 164(21), collectively illustrated as synchronization and discovery processor 166(21) in FIG. 21A. FIG. 21B also shows each the node processor 54(21) of an IAB node 24(21) as comprising synchronization signal generator/processor 170(21), IAB node discovery unit 172(21), and STC muting unit 174(21), collectively illustrated as synchronization and discovery processor 176(21) in FIG. 21A. For the IAB node 24(21), the synchronization signal generator/processor 170 (21) and STC muting unit 174(21) may be provided by the distributed unit 52(21), while the IAB node discovery unit 172(21) may be provided by the mobile termination part 50(21). FIG. 21B also shows each the terminal processor 66(21) of UE 30(21) as comprising synchronization signal generator/processor 180(21), IAB node discovery unit 182 (21), and STC muting unit 184(21), collectively illustrated as synchronization and discovery processor 186(21) in FIG. 21A.

Figure 22:
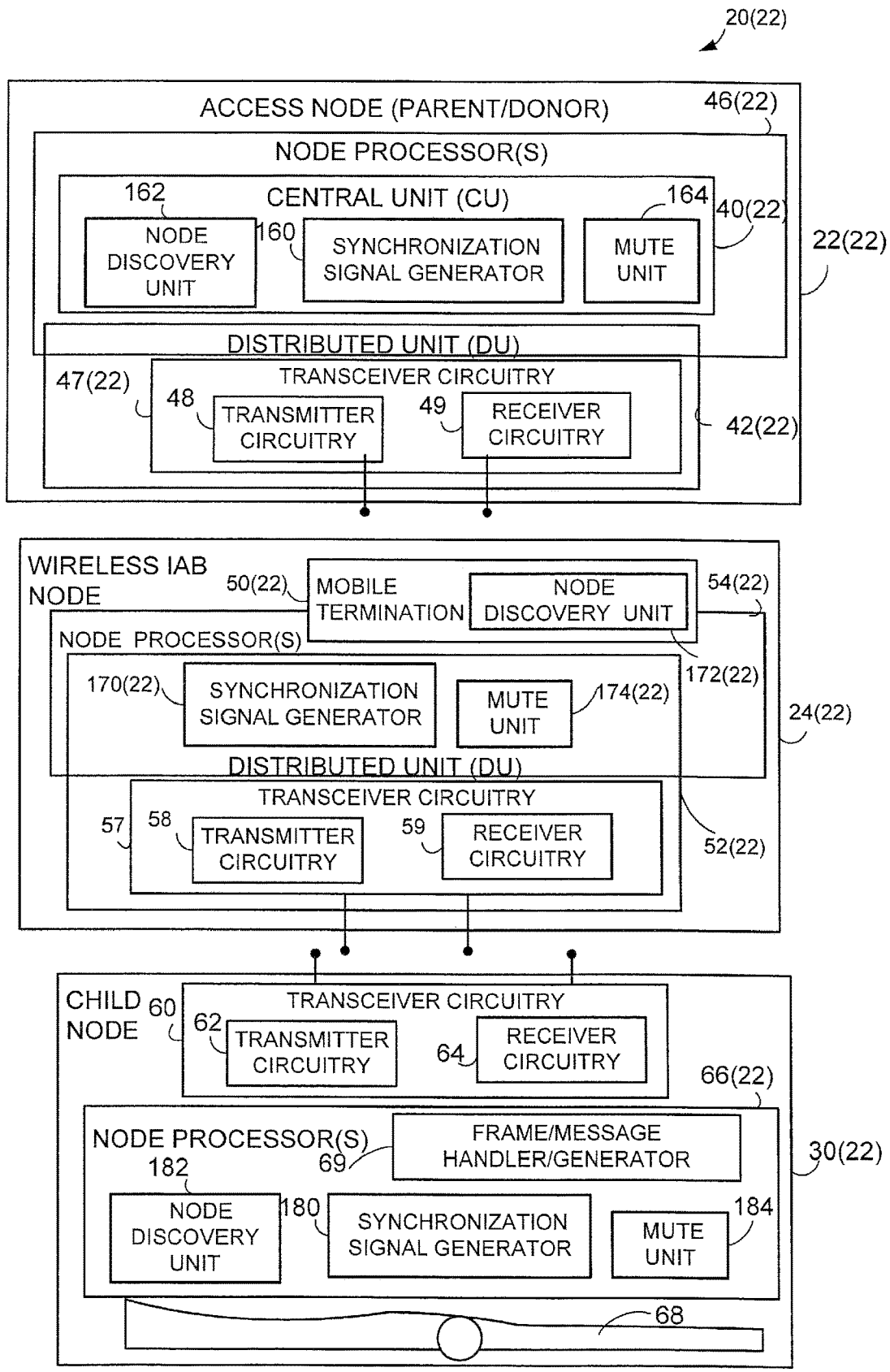
FIG. 22 is a diagrammatic view showing an example communications system with Integrated Access and Backhaul (IAB), including an access node which hosts a control unit (CU) which communicates over a radio or wireless interface, and wherein, for sake of a discovery process, one or more of the nodes may mute certain synchronization signals.

In the example embodiment and mode of FIG. 21A and FIG. 21B, the distributed units of the IAB nodes 24(21) communicate over the F1-AP interface 150 with the central unit 40(21) of access node 22(21), and discovery is performed between the access node 22(21) on the one hand at the IAB nodes 42(21) on the other hand. By contrast, FIG. 22 shows another example embodiment and mode wherein the IAB nodes 24(22) may wirelessly communicate with and discover one another. Units and functionalities of the example embodiment and mode of FIG. 22 that are similar to those of FIG. 21A and FIG. 21B have same reference numbers but a suffix (22) to indicate the wireless nature of the STC transmission and IAB node discovery. Unless otherwise noted, the ensuing discussion of STC muting applies to both the example embodiment and mode of FIG. 21A and FIG. 21B and the example embodiment and mode of FIG. 22. Accordingly, mention of reference number suffix may be omitted for sake of generalization.

Each of the synchronization signal generator/processors, e.g., synchronization signal generator/processor 160, synchronization signal generator/processor 170, and preamble transmission controller 180, serve to generate the synchronization signal (SS)/primary broadcast channel (PBCH) blocks, SS/PBCH blocks such as those shown in FIG. 23.

As understood in the art, plural SS/PBCH blocks are included in and configured by a STC, e.g., a synchronization signal (SS)/primary broadcast channel (PBCH) Block Transmission Configurations (STC); and plural STCs are included in and are configured by a SMTC, e.g., a synchronization signal (SS)/primary broadcast channel (PBCH) Block Measurement time Configuration (SMTC). For SMTC, the SMTC is a reception configurations of SSB(s) and independently configured with SSB periodicity. Multiple STCs are included in a SS burst set (SSB periodicity). As shown in the listings of FIG. 25 and FIG. 26, STC and SMTC are different configurations (periodicity of SMTC (SSB-MTC) is separately configured from SSB periodicity (ssb-periodicity-ServingCell)).

The SS/PBCH blocks have different content for each IAB node and the differing content serves as an identifier for each node in the node discovery process. The synchronization signal generator/processors also serve to decipher or decode the SS/PBCH blocks received from other nodes, and work in conjunction with the IAB node discovery unit of the node in order to identify the node(s) for which SS/PBCH blocks are received. For example, the IAB node discovery unit may have a table or other means for matching signals in the SS/PBCH blocks with other IAB nodes in order to discover the identity of nodes for which SS/PBCH blocks are received.

The STC muting unit of each IAB node serves to mute selected synchronization signal (SS)/primary broadcast channel (PBCH) Block Transmission Configurations (STCs) before transmission by the IAB node which transmits its SS/PBCH blocks. The muting performed by the STC muting unit of a STC-transmitting IAB node may be different for different other STC-receiving IAB nodes in communication with the STC-transmitting IAB node in order to avoid the cross-link interference.

Figure 24:
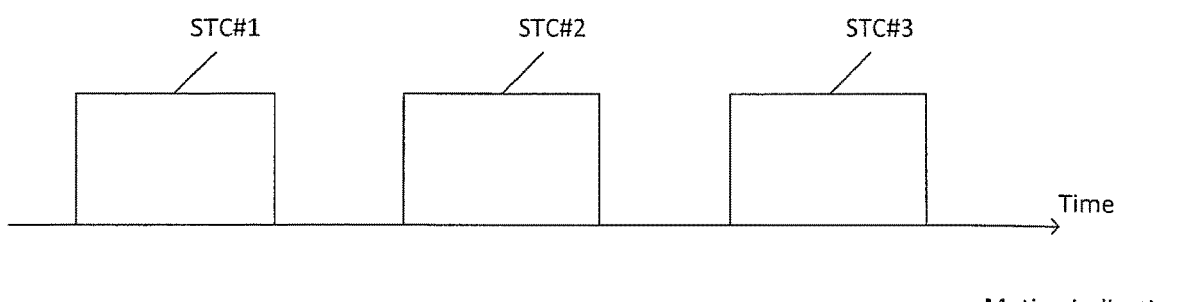
FIG. 24 is a diagrammatic view showing muting of STCs according to an example embodiment and mode.

In order to advise other IAB nodes of which STC a particular transmitting IAB node may mute, the STC-receiving IAB node is provided with a muting indication respecting the STC-transmitting IAB node. FIG. 24 illustrates an example of a muting indication of STC for one particular STC-receiving IAB node. In the example of FIG. 24, an IAB node may receive a muting indication as a bitmap and each bit of the bitmap indicates which SCT is muted. In the example of FIG. 24, the three STCs are configured, e.g., STC#1, STC#2, and STC#3, and a 3-bit bitmap is additionally configured/indicated to the IAB node. For example, the 3-bit bitmap of FIG. 24 indicates "010", which means that the second STC (STC#2) is muted. As mentioned above, the muting indication, e.g., the bitmap, utilized by the STC-transmitting IAB node is preferably different for each STC-receiving IAB node with which the STC-transmitting IAB node communicates.

The muting indication need not necessarily be expressed in bitmap form, as other ways of expressing or conveying the muting indication may be utilized.

The muting indication may be pre-configured at an IAB node or provided by the network. In the latter regard, for example, a special information element may be included in any appropriate signaling to express the muting indication. The muting indication may be indicated via RRC signaling, MAC layer, or DCI on PDCCH. But in RRC, MAC-CE, and DCI cases, the radio interface can be signaled for mutual discovery and each IAB node can indicates other IAB nodes. Additionally, one more bitmap may be indicated to indicate which SS/PBCH block is muted. The muted indication may be indicated by an index of STC or SS/PBCH block in a STC.

As mentioned above, FIG. 21A and FIG. 21B particularly show an example situation in which the STC muting indication, also known as the "muted indication", is applicable to transmissions of STCs over the F1-AP interface 150.

As explained above and known in the art, the F1-AP interface 150 is an interface between CU and DU(s). As described herein, the STC and SMTC configuration itself may be indicated via a F1-AP between a CU and DU of each IAB node and a different bitmap may be indicated for each IAB node, for example (in case that 3 STCs are configured within SS/PBCH block periodicity):

Bitmap content "1 1 0" in STC-level bitmap may indicate to an IAB node #1, e.g., IAB node 24A(21), via interface between CU and DU of IAB node #1.

Bitmap content "1 0 1" in STC-level bitmap may indicate to an IAB node #2, e.g., IAB node 24B(21) via interface between CU and DU of IAB node #2.

Bitmap content "0 1 1" in STC-level bitmap may indicate to an IAB node #3, e.g., IAB node 24C(21), via interface between CU and DU of IAB node #3.

It should be understood that the muting indication described herein may also be employed over other interfaces, such as communications of STCs over an air or radio interface, e.g., over a wireless link, as shown in the example embodiment and mode of FIG. 22, for example.

Figure 27:
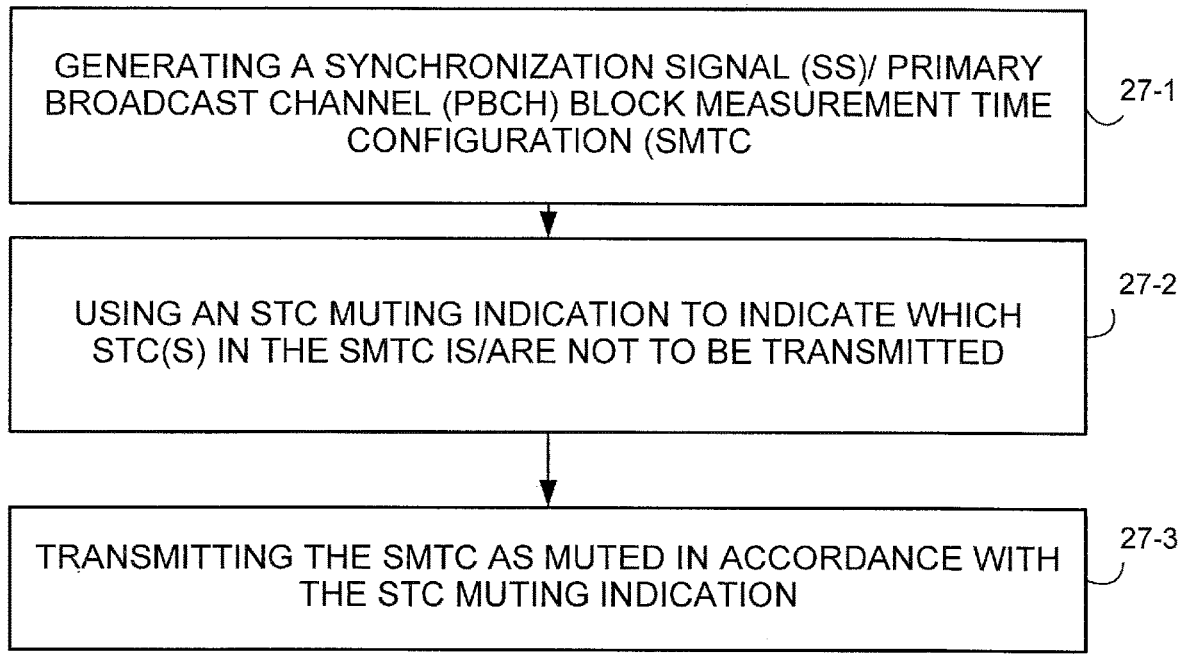
FIG. 27 is a flowchart showing example, non-limiting, basic acts or steps that may be performed by a donor IAB node of the example embodiment and mode of FIG. 21.

FIG. 27 shows example, representative, basic acts or steps that may be performed by an IAB node that transmits STCS. Act 27-1 comprises generating a synchronization signal (SS)/primary broadcast channel (PBCH) Block Measurement time Configuration (SMTC). As indicated above, the SMTC is configured with plural STCs, and the STCs are configured distinctly from the SMTCs with plural SS/PBCHs. Act 27-2 comprises using an STC muting indication to indicate which STC(s) in the SMTC is/are not to be transmitted. Act 27-3 comprises transmitting the SMTC as muted in accordance with the STC muting indication. The SMTC may be transmitted via an interface with which is included in or accessible to the central unit 40 of an access node, or via distributed circuitry of an IAB node, or transmitter circuitry of a wireless terminal.

Figure 28:
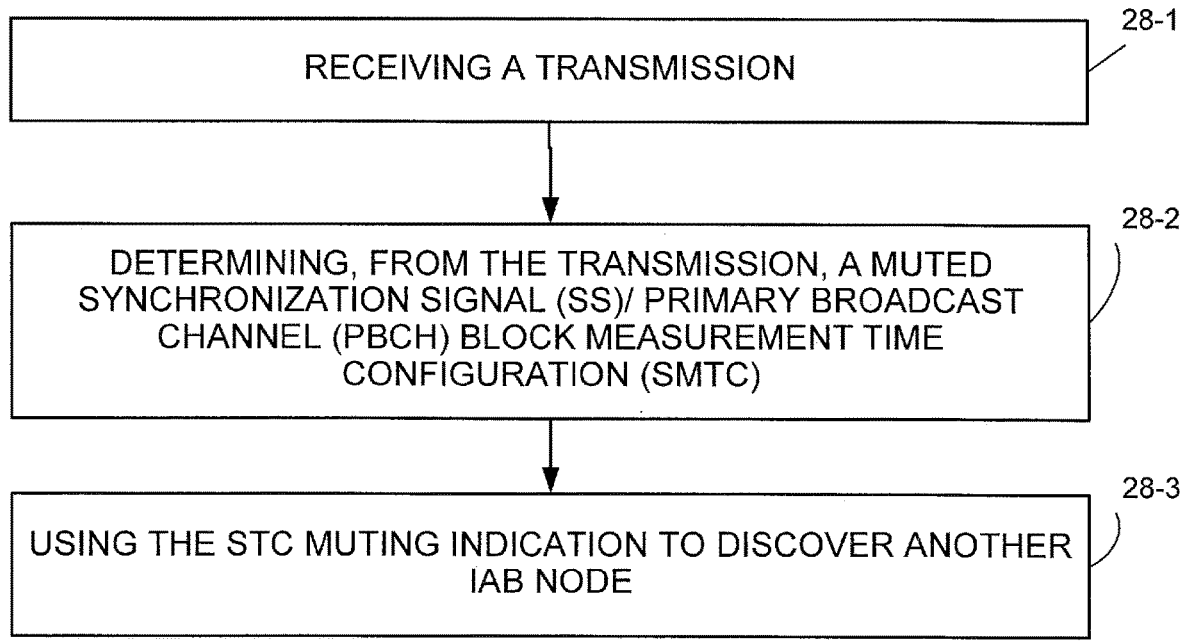
FIG. 28 is a flowchart showing example, non-limiting, basic acts or steps that may be performed by an IAB node of the example embodiment and mode of FIG. 22.

FIG. 28 shows example, representative, basic acts or steps that may be performed by an IAB node that receives STCS. Act 28-1 comprises receiving a STC-including transmission. The STC-including transmission may be received over an appropriate interface, such as via distributed circuitry of an IAB node, or transmitter circuitry of a wireless terminal. Act 28-2 comprises determining, from the transmission, a muted synchronization signal (SS)/primary broadcast channel (PBCH) Block Measurement time Configuration (SMTC). Act 28-3 comprises the optional act of using the STC muting indication to discover another IAB node.

Figure 29:
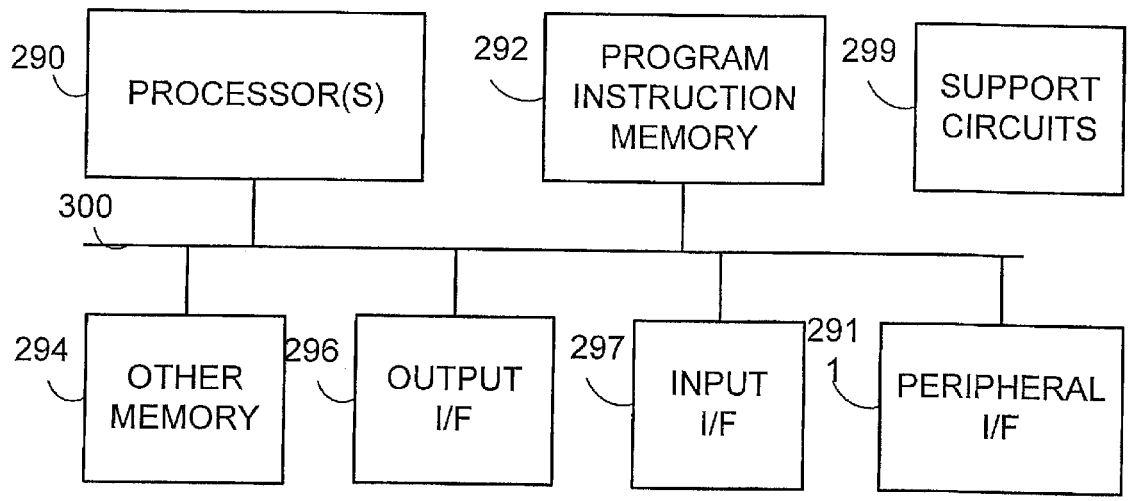
FIG. 29 is a diagrammatic view showing example elements comprising electronic machinery which may comprise a wireless terminal, a radio access node, and a core network node according to an example embodiment and mode.
Figure 30:
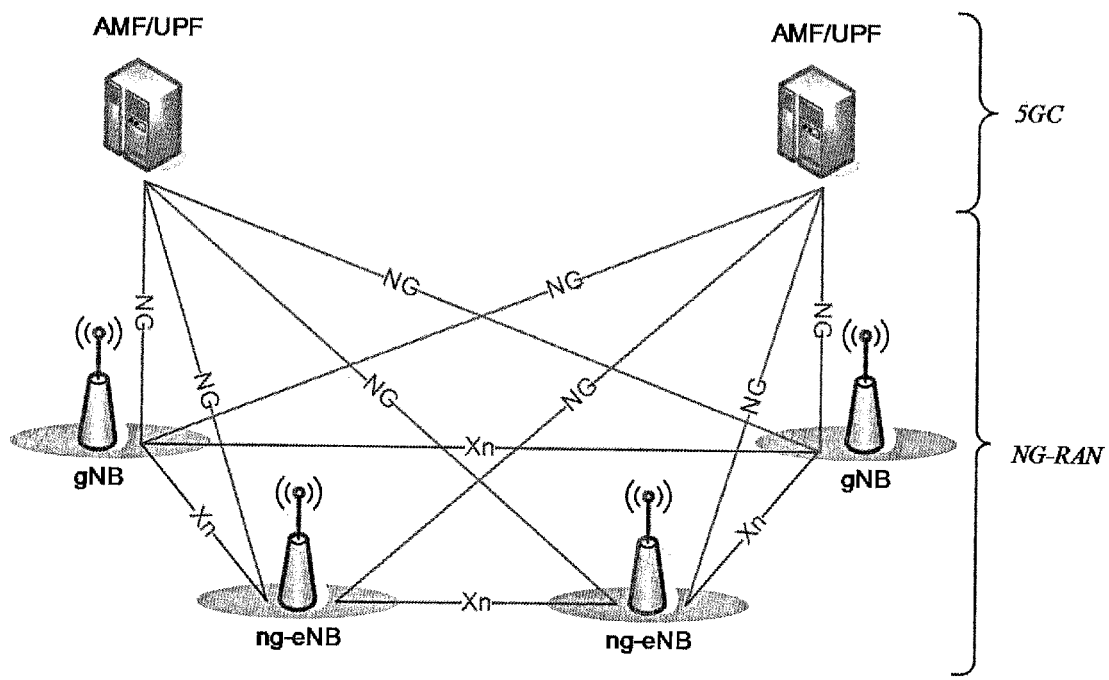
FIG. 30 is a diagrammatic view of overall architecture for a 5G New Radio system.

Certain units and functionalities of the systems 20 may be implemented by electronic machinery. For example, electronic machinery may refer to the processor circuitry described herein, such as node processor(s) 46, IAB node processor(s) 54, and node processor(s) 66. Moreover, the term "processor circuitry" is not limited to mean one processor, but may include plural processors, with the plural processors operating at one or more sites. Moreover, as used herein the term "server" is not confined to one server unit but may encompasses plural servers and/or other electronic equipment and may be co-located at one site or distributed to different sites. With these understandings, FIG. 29 shows an example of electronic machinery, e.g., processor circuitry, as comprising one or more processors 290, program instruction memory 292; other memory 294 (e.g., RAM, cache, etc.); input/output interfaces 296 and 297, peripheral interfaces 298; support circuits 299; and busses 300 for communication between the aforementioned units. The processor(s) 290 may comprise the processor circuitries described herein, for example, node processor(s) 46, IAB node processor(s) 54, and node processor(s) 66.

An memory or register described herein may be depicted by memory 294, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 299 are coupled to the processors 290 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminal 30 and radio access network 24 used in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves basic function of an IAB network, e.g., methods and procedures to deal with cross-interference and/or collisions of SSBs, for example.

The technology disclosed herein encompasses a node comprising: a mobile terminal circuitry configured to receive a physical downlink control channel (PDCCH), and a distributed unit circuitry configured to transmit downlink signals/channels, wherein the mobile terminal monitors the PDCCH for a common search space by a first RNTI, and the distributed terminal transmits the PDCCH for a second common search space by using a second RNTI The technology disclosed herein encompasses one or more of the following non-limiting, non-exclusive example embodiments and modes:

Example Embodiment 1: An Integrated Access and Backhaul (IAB) node comprising: processor circuitry configured: to generate a synchronization signal (SS)/primary broadcast channel (PBCH) Block Measurement time Configuration (SMTC), the SMTC comprising plural synchronization signal (SS)/primary broadcast channel (PBCH) Block Transmission Configurations (STCs), each STC comprising plural synchronization signal (SS)/primary broadcast channel (PBCH) blocks (SS/PBCHs); to use an STC muting indication to moot STC(s) in the SMTC which is/are not to be transmitted; interface circuitry configured to transmit the SMTC as muted in accordance with the STC muting indication.

Example Embodiment 2: The node of Example Embodiment 1, wherein the processor circuitry is further configured to generate the STC muting indication and the interface circuitry is configured to transmit the STC muting indication.

Example Embodiment 3: The node of Example Embodiment 1, wherein the interface circuitry is configured to transmit the STC muting indication over a radio interface.

Example Embodiment 4: The node of Example Embodiment 1, wherein transmitter circuitry configured to transmit the STC muting indication in radio resource control signaling, in a medium access control layer signaling, or in a downlink control information (DCI) on a Physical Downlink Control Channel (PDCCH).

Example Embodiment 5: The node of Example Embodiment 1, wherein the IAB node comprises a distributed unit, and wherein the interface comprises an F1-AP interface which connects the distributed unit to a central unit of another IAB node.

Example Embodiment 6: The node of Example Embodiment 1, wherein transmitter circuitry configured to transmit the STC muting indication as a bitmap, a selected bit value in the bit map indicating which STC(s) in the SMTC is not to be transmitted.

Example Embodiment 7: A method in an Integrated Access and Backhaul (IAB) node comprising: generating a synchronization signal (SS)/primary broadcast channel (PBCH) Block Measurement time Configuration (SMTC), the SMTC comprising plural signal (SS)/primary broadcast channel (PBCH) Block Transmission Configurations (STCs), each STC comprising plural synchronization signal (SS)/primary broadcast channel (PBCH) blocks (SS/PBCHs); using an STC muting indication to moot STC(s) in the SMTC which is/are not to be transmitted; transmitting the SMTC as muted in accordance with the STC muting indication.

Example Embodiment 8: The method of Example Embodiment 7, further comprising generating the STC muting indication.

Example Embodiment 9: The method of Example Embodiment 8, further comprising transmitting the STC muting indication (to another IAB node).

Example Embodiment 10: The method of Example Embodiment 7, further comprising transmitting the STC muting indication to another IAB node over the radio interface.

Example Embodiment 11: The method of Example Embodiment 7, further comprising transmitting the STC muting indication over an F1-AP interface which connects a distributed unit of the IAB node with a central unit of another IAB node.

Example Embodiment 12: The method of Example Embodiment 7, further comprising transmitting the STC muting indication in radio resource control signaling, in a medium access control layer signaling, or in a downlink control information (DCI) on a Physical Downlink Control Channel (PDCCH).

Example Embodiment 13: The method of Example Embodiment 7, further comprising transmitting the STC muting indication as a bitmap, a selected bit value in the bit map indicating which STC(s) in the SMTC is not to be transmitted.

Example Embodiment 14: An Integrated Access and Backhaul (IAB) node comprising: interface circuitry configured to receive a transmission; processor circuitry configured to determine, from the transmission, a muted synchronization signal (SS)/primary broadcast channel (PBCH) Block Measurement time Configuration (SMTC), the SMTC comprising plural signal (SS)/primary broadcast channel (PBCH) Block Transmission Configurations (STCs), each STC comprising plural synchronization signal (SS)/primary broadcast channel (PBCH) blocks (SS/PBCHs), the SMTC having been muted in accordance with the STC muting indication.

Example Embodiment 15: The node of Example Embodiment 14, wherein the interface circuitry is configured to receive the STC muting indication.

Example Embodiment 16: The node of Example Embodiment 14, wherein the interface comprises receiver circuitry for receiving the muted SMTC over a radio interface.

Example Embodiment 17: The node of Example Embodiment 15, wherein IAB node comprises a distributed unit, and the interface circuitry comprises an F1-AP interface which connects the distributed unit with a central unit of another IAB node.

Example Embodiment 18: The node of Example Embodiment 14, wherein interface circuitry is configured to receive the STC muting indication in radio resource control signaling, in a medium access control layer signaling, or in a downlink control information (DCI) on a Physical Downlink Control Channel (PDCCH).

Example Embodiment 19: The node of Example Embodiment 14, wherein interface circuitry configured to receive the STC muting indication as a bitmap, a selected bit value in the bit map indicating which STC(s) in the SMTC was not transmitted.

Example Embodiment 20: The node of Example Embodiment 14, further comprising the processor circuitry using the STC muting indication to discover another IAB node.

Example Embodiment 21: A method in an Integrated Access and Backhaul (IAB) node comprising: receiving a transmission over a radio interface; determining, from the transmission, a muted synchronization signal (SS)/primary broadcast channel (PBCH) Block Measurement time Configuration (SMTC), the SMTC comprising plural signal (SS)/primary broadcast channel (PBCH) Block Transmission Configurations (STCs), each STC comprising plural synchronization signal (SS)/primary broadcast channel (PBCH) blocks (SS/PBCHs), the SMTC having been muted in accordance with the STC muting indication.

Example Embodiment 22: The method of Example Embodiment 22, further comprising receiving the STC muting indication over the radio interface.

Example Embodiment 23: The method of Example Embodiment 21, further comprising receiving the STC muting indication in radio resource control signaling, in a medium access control layer signaling, or in a downlink control information (DCI) on a Physical Downlink Control Channel (PDCCH).

Example Embodiment 24: The method of Example Embodiment 21, further comprising receiving the STC muting indication over an F1-AP interface which connects a central unit and a distributed unit of the IAB node.

Example Embodiment 25: The method of Example Embodiment 21, further comprising receiving the STC muting indication as a bitmap, a selected bit value in the bit map indicating which STC(s) in the SMTC was not transmitted.

Example Embodiment 26: The method of Example Embodiment 21, further comprising using the STC muting indication to discover another IAB node.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

Cross Reference

This Nonprovisional application claims priority under 35 U.S.C. § 119 on provisional Application No. 62/842,415 on May 2, 2019, the entire contents of which are hereby incorporated by reference.

The invention claimed is:

1. An Integrated Access and Backhaul (IAB) node comprising:
processor circuitry configured:
to generate a plurality of synchronization signal block transmission configurations (STCs), each of the plurality of STCs comprising information of one or more synchronization signal blocks (SSBs); and
to use an STC of the plurality of STCs for a synchronization signal block measurement and discovery of at least one other IAB node; and
interface circuitry configured to transmit the plurality of STCs, wherein
the information included in each of the plurality of STCs indicates, using a bitmap
form, whether each of the corresponding one or more SSBs is transmitted or not in a half-frame.

2. An Integrated Access and Backhaul (IAB) node comprising:
interface circuitry configured to receive a plurality of synchronization signal block transmission configurations (STCs), each of the plurality of STCs comprising information of one or more synchronization signal blocks (SSBs), wherein
an STC of the plurality of STCs is used for a synchronization signal block measurement and discovery of at least one other IAB node, and
the information included in each of the plurality of STCs indicates, using a bitmap form, whether each of the corresponding one or more SSBs is transmitted or not in a half-frame.

3. A method in an Integrated Access and Backhaul (IAB) node comprising:
generating a plurality of synchronization signal block transmission configurations (STCs), each of the plurality of STCs comprising information of one or more synchronization signal blocks (SSBs);
using an STC of the plurality of STCs for a synchronization signal block measurement and discovery of at least one other IAB node; and
transmitting the plurality of STCs, wherein
the information included in each of the plurality of STCs indicates, using a bitmap form, whether each of the corresponding one or more SSBs is transmitted or not in a half-frame.

* * * * *